United States Patent
Ma et al.

(10) Patent No.: US 9,068,046 B2
(45) Date of Patent: Jun. 30, 2015

(54) SULFUR-CONTAINING OLIGOMER AND DENDRIMER OF ACRYLATE AND PREPARATION METHODS THEREOF

(71) Applicant: Eternal Chemical Co., Ltd., Kaohsiung (TW)

(72) Inventors: Xiu-Xia Ma, Hefei (CN); Wen-Fang Shi, Hefei (CN); Jing Jiang, Shanghai (CN); Sheng-Yao Hsueh, Kaohsiung (TW); Chih-Kang Chou, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 105 days.

(21) Appl. No.: 14/040,576

(22) Filed: Sep. 27, 2013

(65) Prior Publication Data

US 2014/0171597 A1 Jun. 19, 2014

(30) Foreign Application Priority Data

Dec. 17, 2012 (TW) ............... 101147813 A

(51) Int. Cl.
*C08G 75/02* (2006.01)
(52) U.S. Cl.
CPC ..................... *C08G 75/02* (2013.01)
(58) Field of Classification Search
CPC ........... C08G 18/3876; C08G 18/3863; C08G 75/045; C08G 2261/1642
USPC ........................................ 525/535
See application file for complete search history.

(56) References Cited

U.S. PATENT DOCUMENTS 5,411,776 A * 5/1995 Schmidt et al. .................. 428/34
6,008,296 A * 12/1999 Yang et al. ..................... 525/123

(Continued)

OTHER PUBLICATIONS

Zolek-Tryznowska et al. Flexographic printing ink modified with hyperbranched polymers: Boltorn P500 and Boltorn P1000. Dyes and Pigments 96(2013) 602-608.*

(Continued)

*Primary Examiner* — Mike M Dollinger
(74) *Attorney, Agent, or Firm* — Blakely, Sokoloff, Taylor & Zafman LLP

(57) ABSTRACT

Sulfur-containing oligomer and dendrimer of acrylate and preparation methods thereof are provided. The sulfur-containing oligomer and dendrimer of acrylate are prepared by reacting monomers A and B in Michael addition reaction.

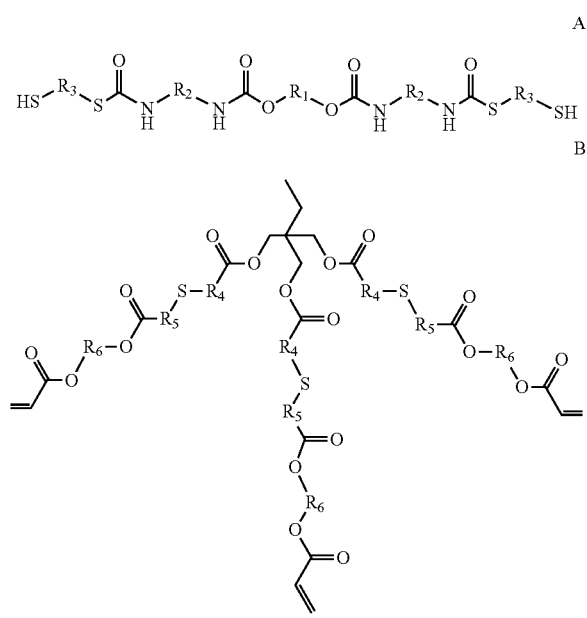

20 Claims, 8 Drawing Sheets

(56) References Cited

U.S. PATENT DOCUMENTS

| | | | |
|---|---|---|---|
| 7,897,718 B2 * | 3/2011 | Chang et al. | 528/49 |
| 7,939,577 B2 * | 5/2011 | Chen et al. | 522/104 |
| 2002/0022713 A1 * | 2/2002 | Tanaka et al. | 528/374 |
| 2005/0119366 A1 * | 6/2005 | Moy et al. | 522/173 |
| 2007/0270548 A1 * | 11/2007 | Bojkova et al. | 525/123 |
| 2011/0034660 A1 * | 2/2011 | Ryu et al. | 528/80 |

OTHER PUBLICATIONS

Yong Zhang, et al., "Synthesis and Photopolymerization Properties of Self-initiated Photopolymerized Acrylate Oligomers", Chemical Journal of Chinese Universities, vol. 33, No. 3, pp. 635-639, (Mar. 2012).

* cited by examiner

SULFUR-CONTAINING OLIGOMER AND DENDRIMER OF ACRYLATE AND PREPARATION METHODS THEREOF

RELATED APPLICATIONS

This application claims priority to Taiwan Application Serial Number 101147813, filed Dec. 17, 2012, which is herein incorporated by reference.

BACKGROUND

1. Technical Field

The disclosure relates to an optical resin having a high refractive index and a preparation method thereof. More particularly, the disclosure relates to a sulfur-containing resin having a high refractive index and a preparation method thereof.

2. Description of Related Art

Recently, since organic optical resins have advantages of small density, breaking resistance, and handle easiness, the organic optical resins are used as a substitute of glass and widely used for optical lenses, spectacle lenses, fiber optics, windows, and other transparent objects field. However, conventional organic optical resins also have many defects, such as a low refractive index, a large birefringence, and a higher chromatic dispersion, poor heat resistance, and poor impact resistance. For overcoming these defects, many researchers try to develop monomers and resins having a high refractive index (>1.49), optical transparency, high hardness, and high impact toughness.

An optical resin with a high refractive index is prepared mainly by introducing a functional group having a higher molar refractive index to increase the refractive index of the optical resin. Introducing a sulfur atom into monomers of optical resins is an effective way to increase the refractive index and decrease the chromatic dispersion of the optical resin.

SUMMARY

In one aspect, the present invention is directed to a sulfur-containing acrylate oligomer having a high refractive index. The sulfur-containing acrylate oligomer having a chemical structure of $B^1$-$A^2$-$B^1$, wherein $A^2$ and $B^1$ respectively have chemical structures below:

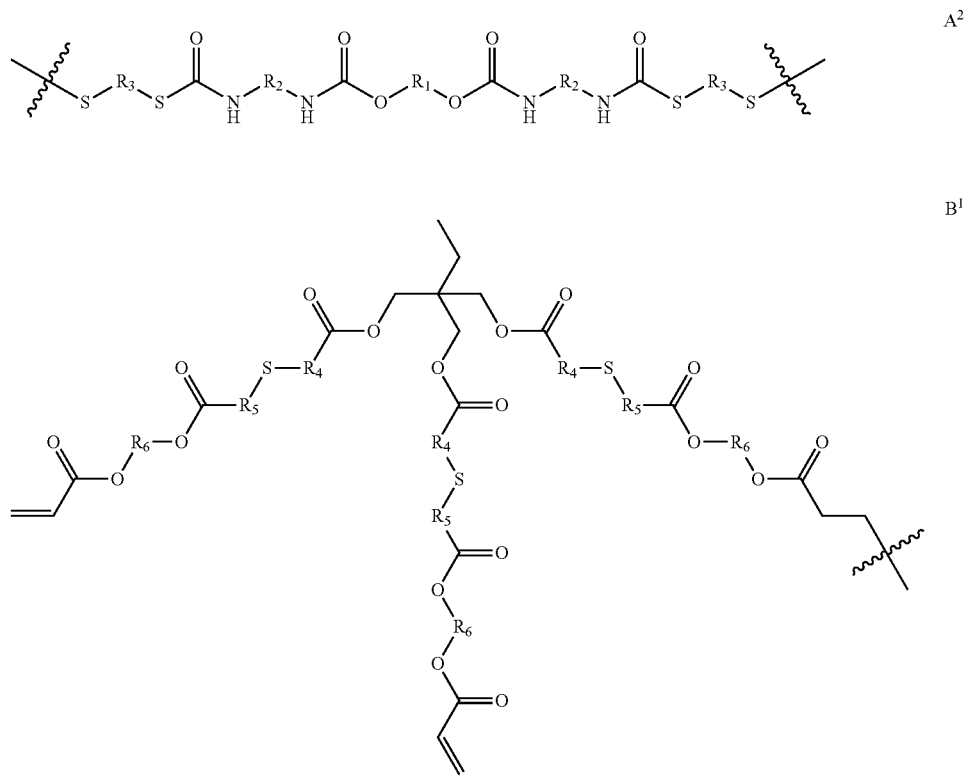

and wherein $R_1$, $R_4$, $R_5$ and $R_6$ are respectively an alkyl group with 1-6 carbons, and $R_2$ and $R_3$ are respectively an aromatic or a cycloalkyl group.

In another aspect, the present invention is direct to a modified sulfur-containing acrylate oligomer having a high refractive index and a chemical structure of $B^{1\prime}$-$A^2$-$B^{1\prime}$, $B^{1\prime}$-$A^2$-$B^{1\prime\prime\prime}$, wherein $A^2$, $B^{1\prime}$ and $B^{1\prime\prime\prime}$ respectively have the chemical structures below:

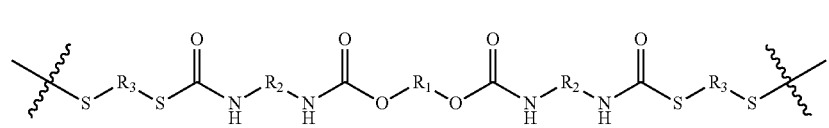
A²
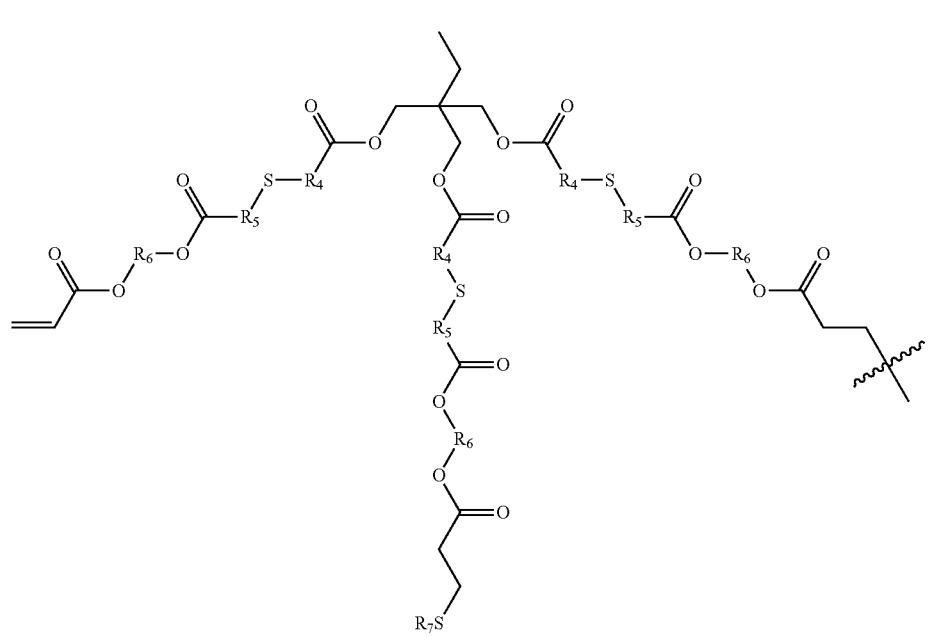
B¹'
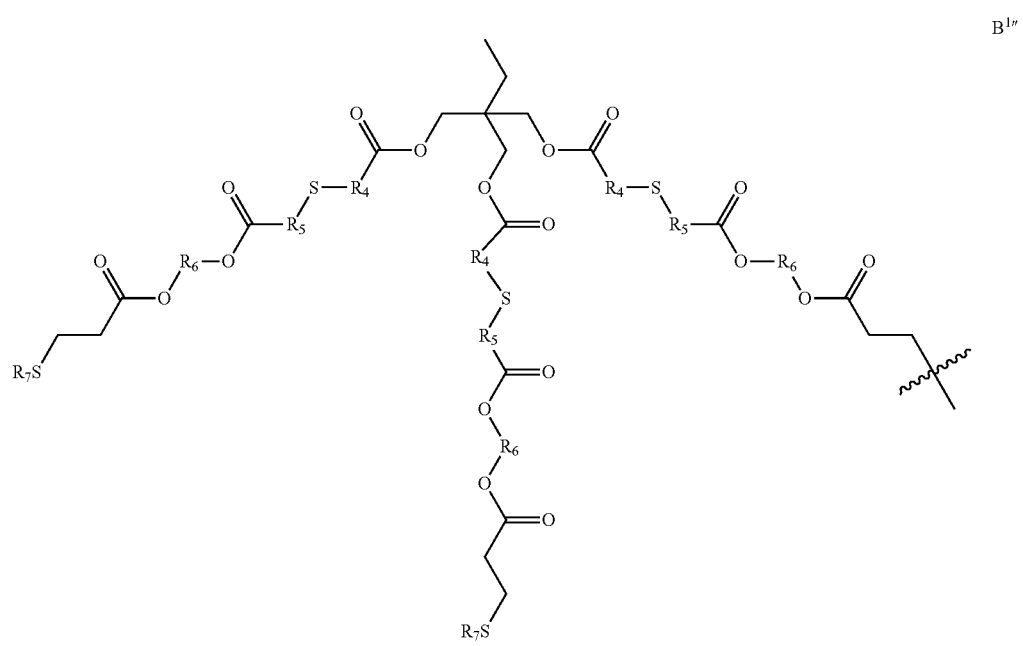
B¹'' and wherein $R_1$, $R_4$, $R_5$ and $R_6$ are respectively an alkyl group with 1-6 carbons, $R_2$ and $R_3$ are respectively an aromatic or a cycloalkyl group, and $R_7$ is an aromatic group or a heterocylic group having at least a double bond.

In yet another aspect, the present invention also provides a sulfur-containing acrylate dendrimer having a chemical structure of

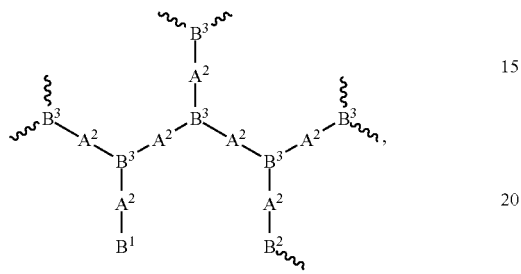

wherein $B^1$ and $B^2$ randomly distributed on terminals of the sulfur-containing acrylate dendrimer, and the chemical structures of $A^2$, $B^1$, $B^2$, and $B^3$ are shown below:

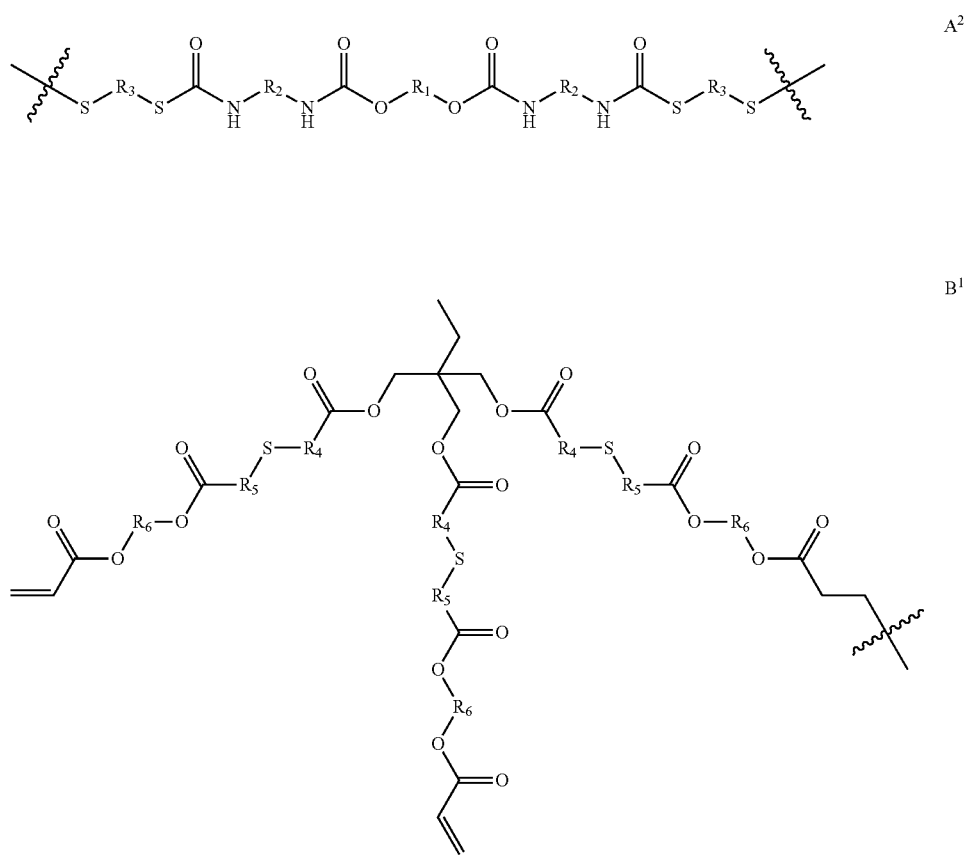

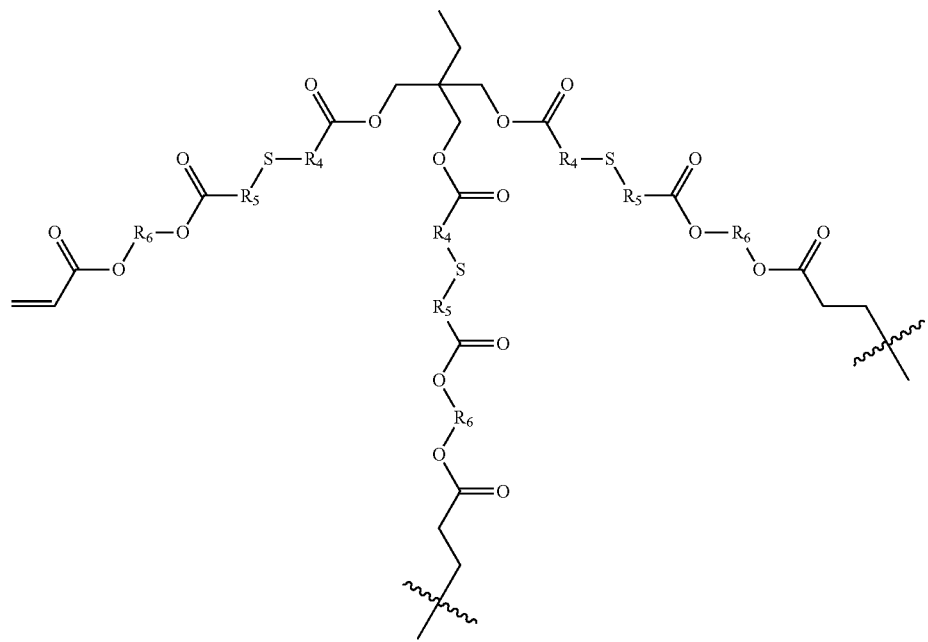
B²
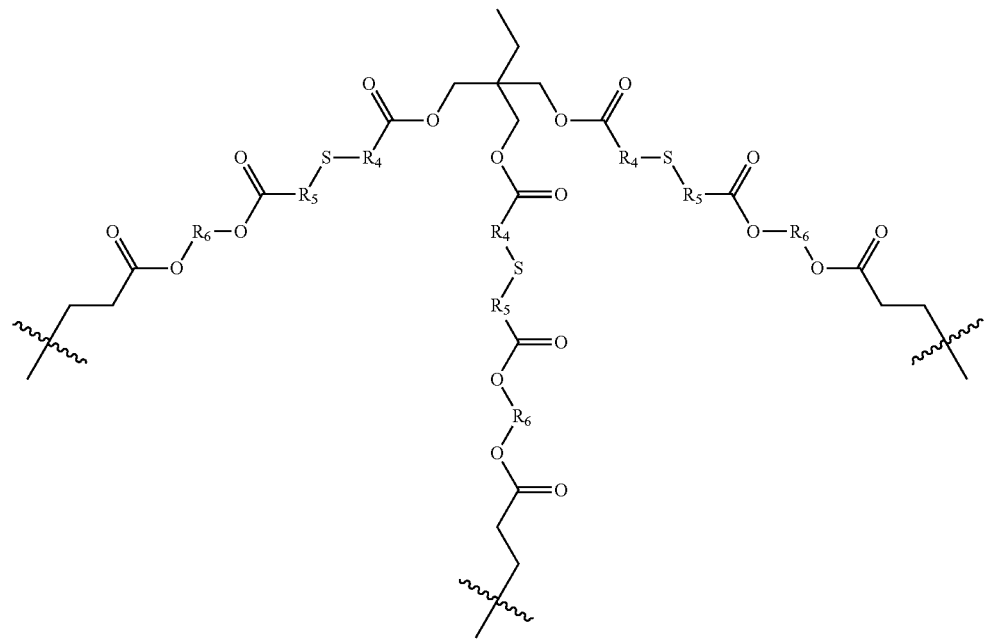
B³ and wherein $R_1$, $R_4$, $R_5$ and $R_6$ are respectively an alkyl group with 1-6 carbons, and $R_2$ and $R_3$ are respectively an aromatic or a cycloalkyl group.

In yet another aspect, the present invention also provides a modified sulfur-containing acrylate dendrimer having a chemical structure of

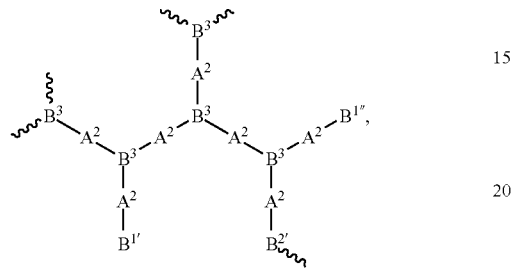

wherein $A2$, $B^{1'}$, $B^{1'''}$, $B^{2'}$, and $B^3$ respectively have chemical structures below:

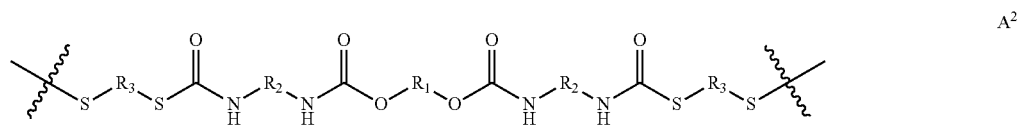

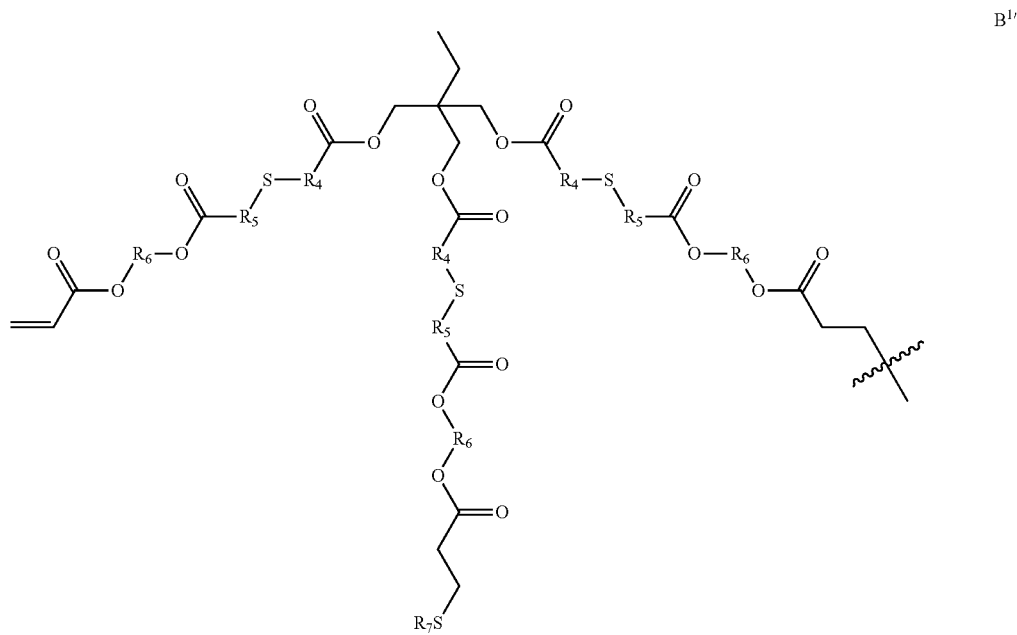

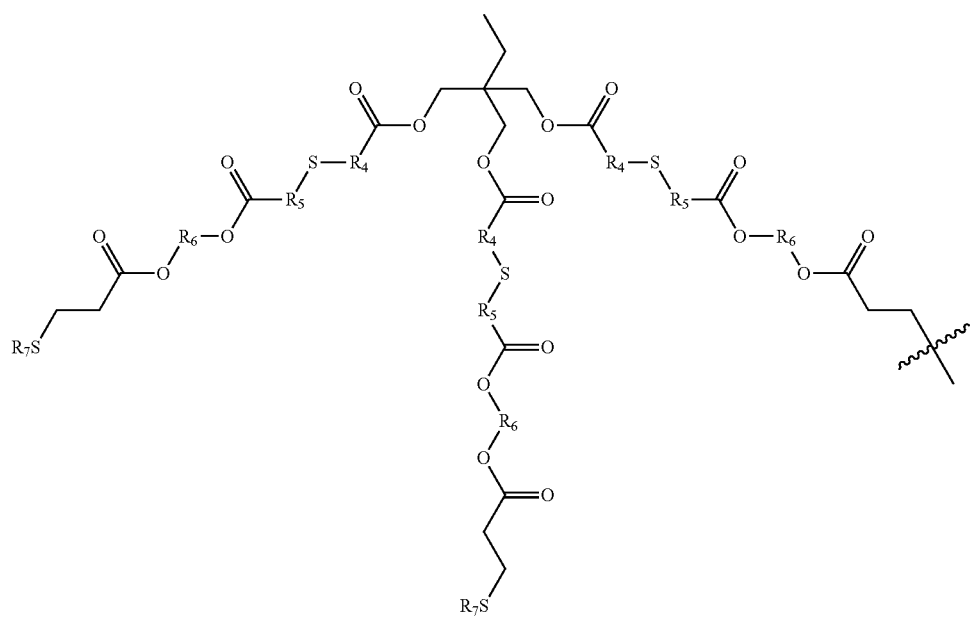
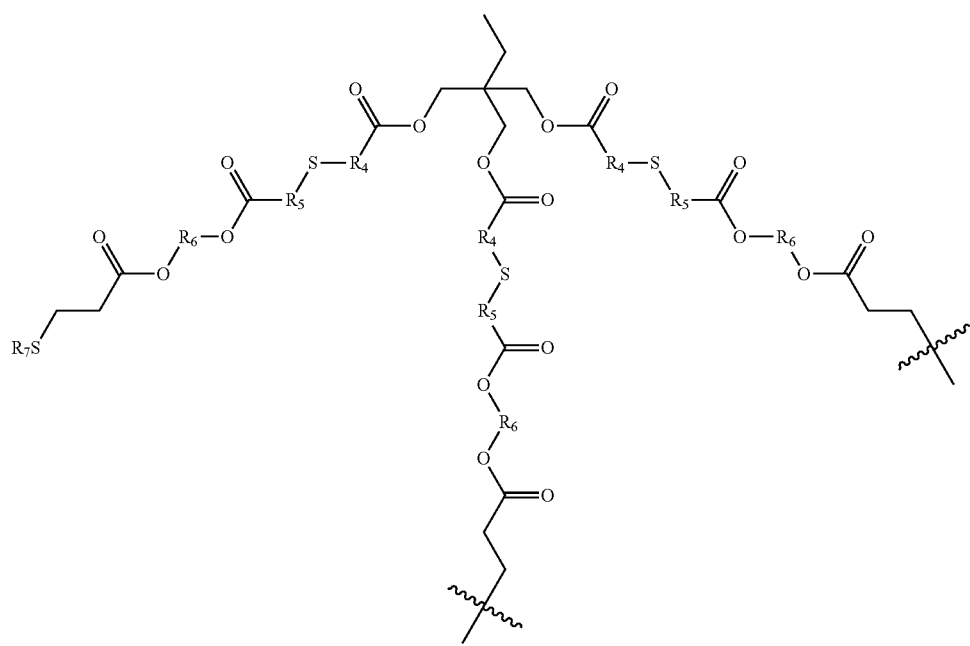

-continued

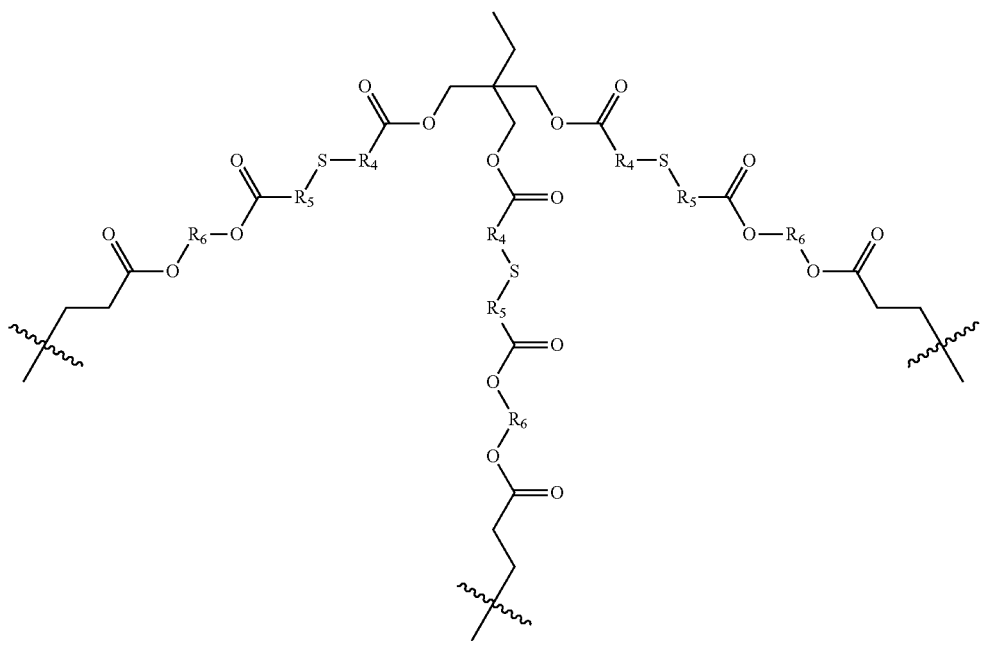

and wherein $R_1$, $R_4$, $R_5$ and $R_6$ are respectively an alkyl group with 1-6 carbons, $R_2$ and $R_3$ are respectively an aromatic or a cycloalkyl group, and $R_7$ is an aromatic group or a heterocyclic group having at least a double bond.

Furthermore, the present invention also provides preparation methods o the modified and unmodified sulfur-containing acrylate oligomer and dendrimer.

Accordingly, this invention provides a novel sulfur-containing acrylate oligomer and dendrimer, which can be fast crosslinked by UV light. The crosslinked product has a high refractive index, and a thin film thereof has excellent optical property and high light transparency. The preparation methods of the sulfur-containing acrylate oligomer and dendrimer have advantages of using cheap and easily obtained raw materials, easy operation, and mild and easy controlling reaction conditions, so that the preparation methods can be easily practice in industry.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

DETAILED DESCRIPTION

Figure 1:
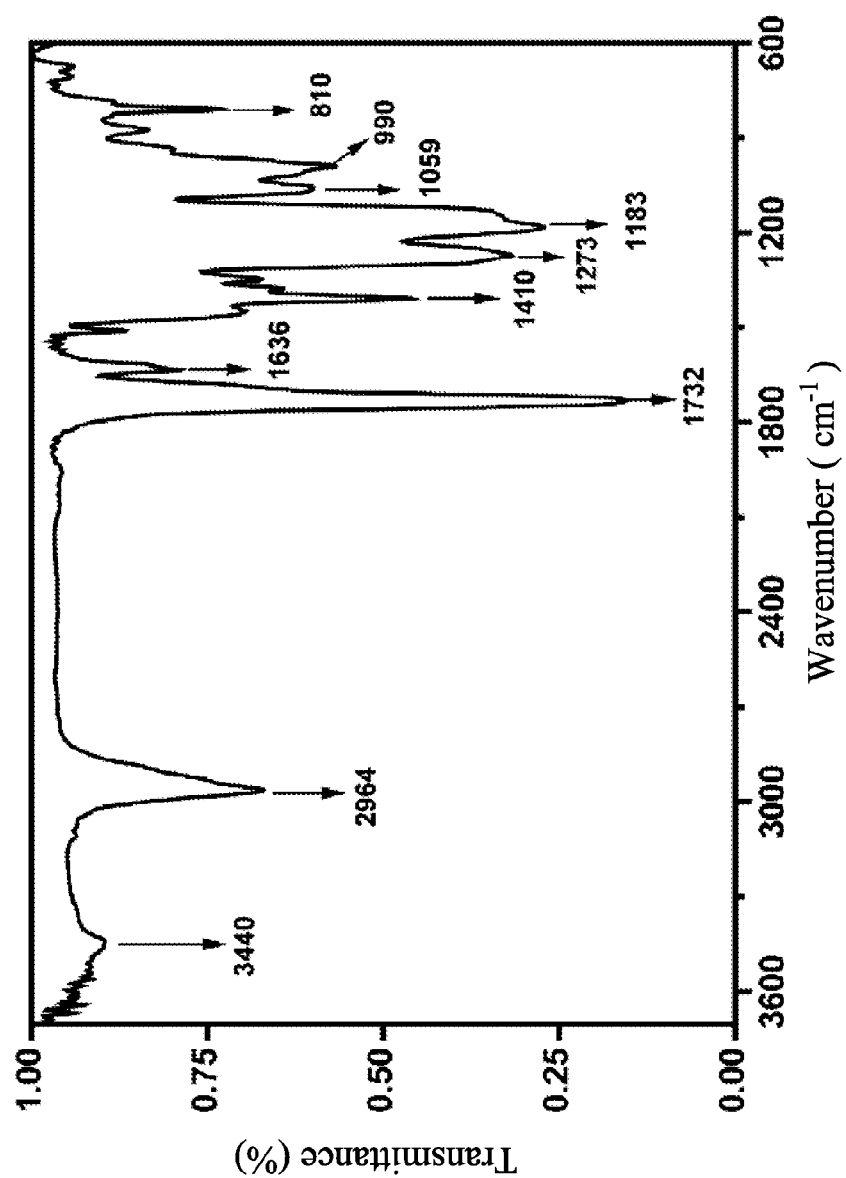
FIG. 1 is an infrared vibration spectrum of the monomer B1.

Accordingly, a sulfur-containing acrylate oligomer and dendrimer having a high refractive index and preparation methods thereof are provided. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Sulfur-Containing Acrylate Oligomer and Preparation Method Thereof

In one aspect, a sulfur-containing acrylate oligomer having a high refractive index is provided. The sulfur-containing acrylate oligomer having a chemical structure of $B^1$-$A^2$-$B^1$, wherein $A^2$ and $B^1$ respectively have chemical structures below:

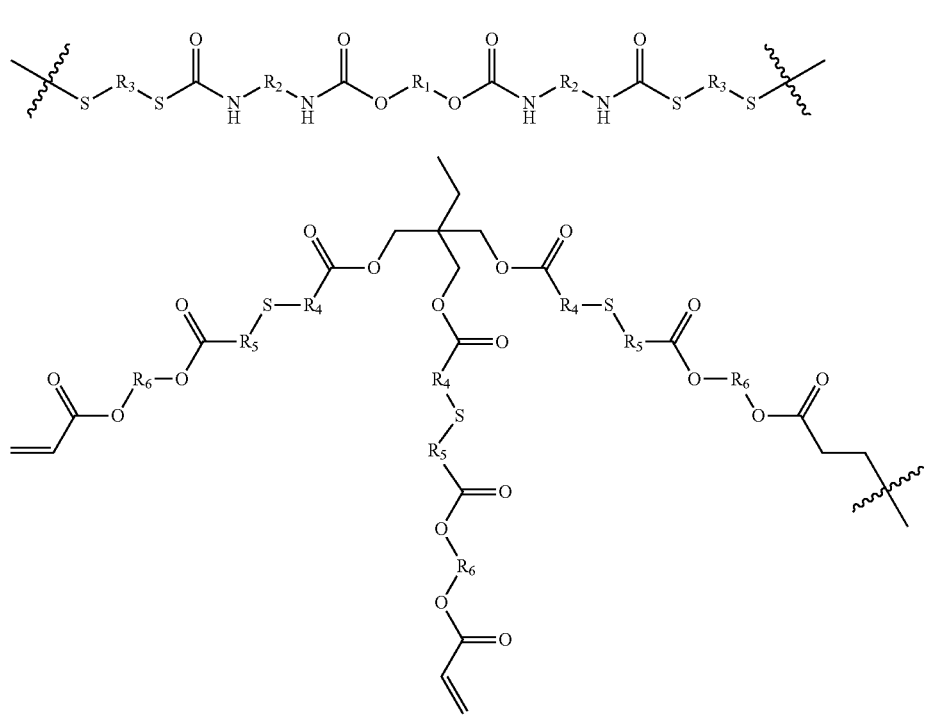

A²

B¹

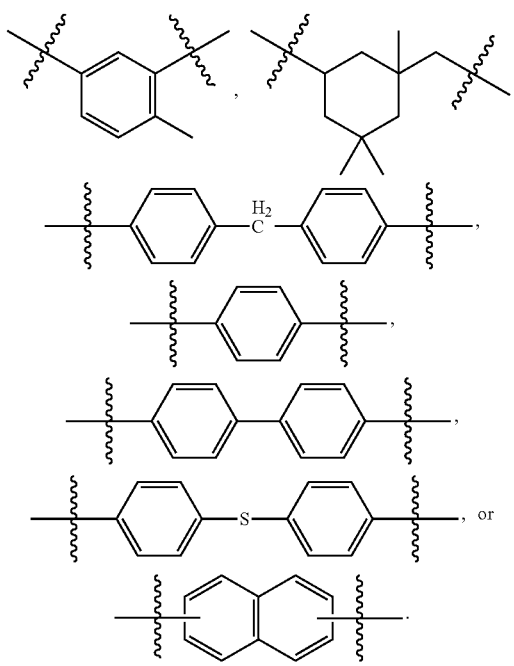

The $R_1$, $R_4$, $R_5$ and $R_6$ above are respectively an alkyl group with 1-6 carbons. For examples, the $R_1$ and $R_4$ are respectively a straight chain alkyl group having 1-4 carbons, and the $R_5$ and $R_6$ are respectively a straight chain alkyl group having 2, 4, or 6 carbons.

The $R_2$ and $R_3$ above are respectively an aromatic or a cycloalkyl group, such as

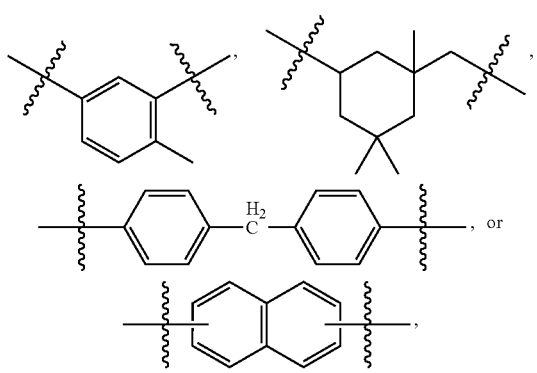

According to an embodiment, the $R_2$ can be and the $R_3$ can be

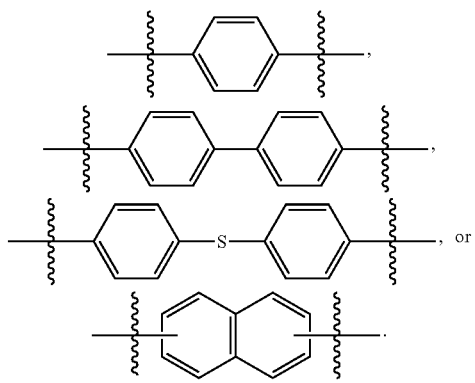

According to another embodiment, the A² can be

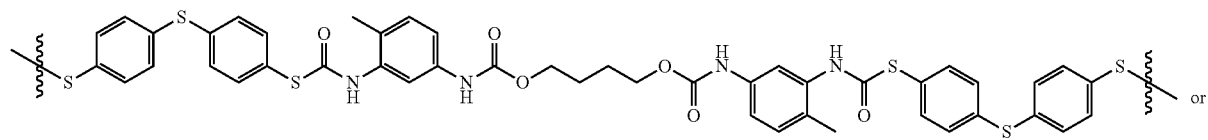 or

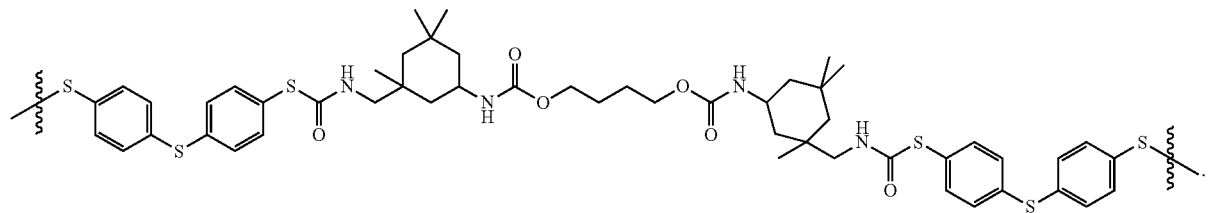

According to yet another embodiment, the B¹ can be

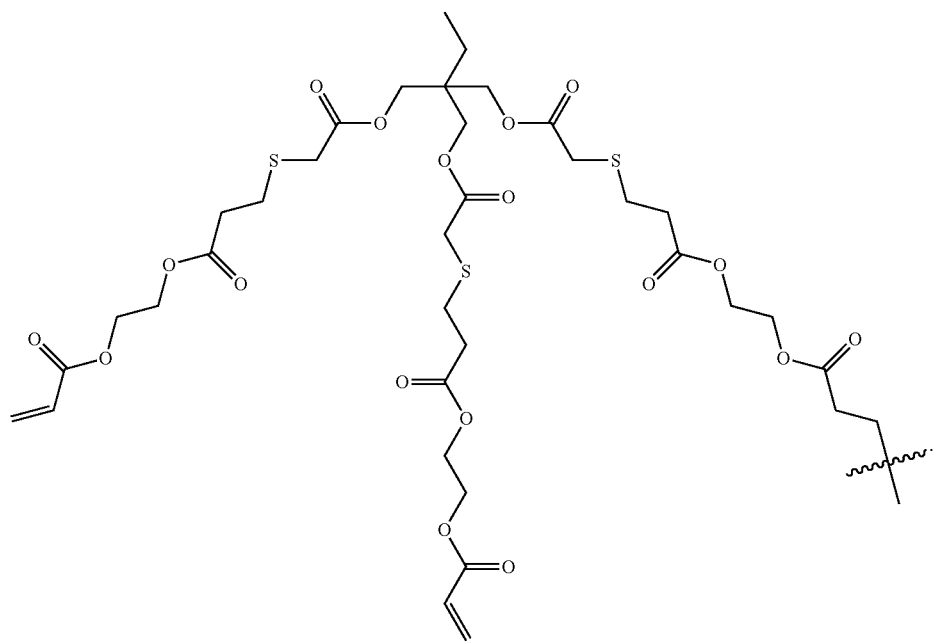

In another aspect, a method of preparing the sulfur-containing acrylate oligomer above is also provided. The method comprises dropwise adding a monomer A into an aprotic solvent containing a monomer B (denoted by A→B) to perform Michael addition until the thiol vibration group (—SH) disappear from the infrared (IR) spectrum, such that the sulfur-containing acrylate oligomer can be obtained. The monomers A and B respectively have chemical structures below:

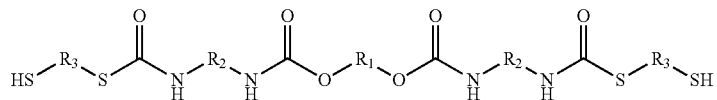

A

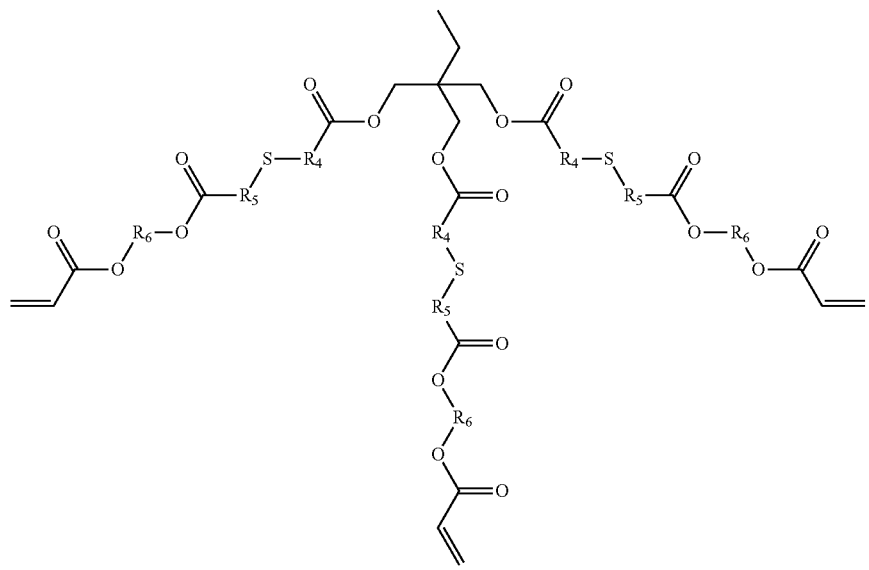

According to an embodiment, the molar ratio of the monomer A to the monomer B is 1:2.

According to another embodiment, the aprotic solvent can be ether, dichloromethane, chloroform, ethyl acetate, butyl acetate, acetone, methyl ethyl ketone, methyl isobutyl ketone, toluene, xylene, ethylbenzene, methyl ethyl ketone, cyclohexanone, butyl acetate, tetrahydrofuran, or N-methylpyrrolidone.

According to yet another embodiment, the method further comprises adding a catalyst to the aprotic solvent to catalyze the Michael addition. The catalyst can be an organic base, such as ethylamine, diethylamine, dimethylamine, triethylamine, tributylamine, triethanolamine, amino ethanol, N, N-diethyl amino ethanol, pyridine, morpholine, imidazole, or aniline.

Sulfur-Containing Acrylate Dendrimer and Preparation Method Thereof

In one aspect, a sulfur-containing acrylate dendrimer having a high refractive index is provided. The sulfur-containing acrylate dendrimer is polymerized by monomers A and B having chemical structures shown below:

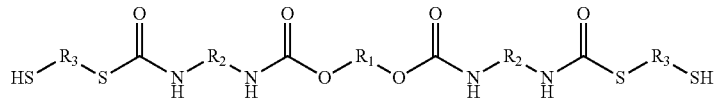

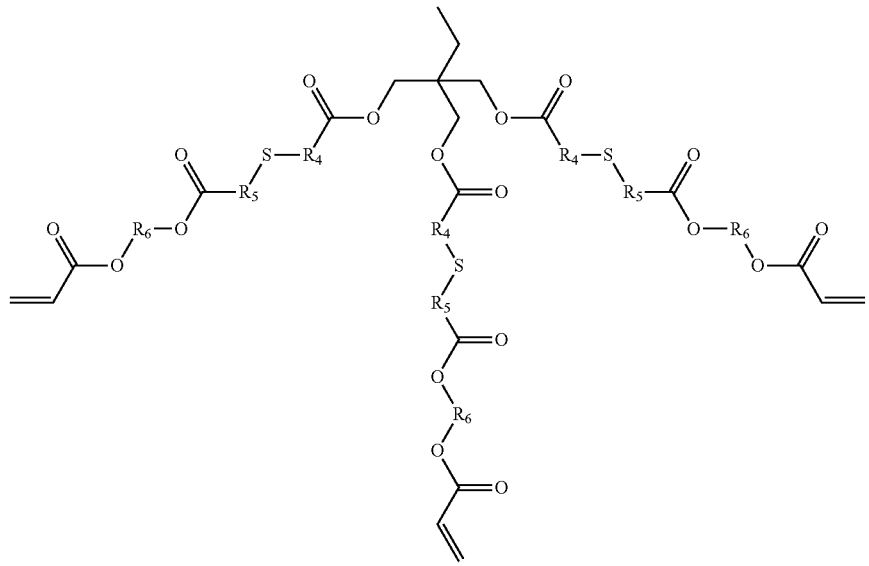

The sulfur-containing acrylate dendrimer has a chemical structure shown below:
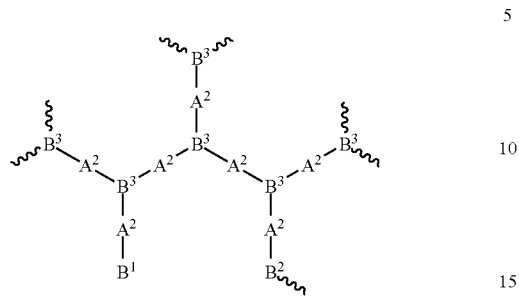
Sulfur-Containing Acrylate Dendrimer
The $B^1$ and $B^2$ in the chemical structure are randomly distributed on terminals of the sulfur-containing acrylate dendrimer. The chemical structures of $A^2$, $B^1$, $B^2$ and $B^3$ are shown below:
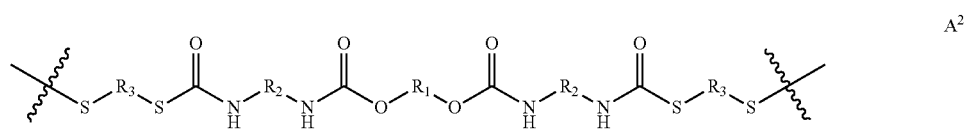
$A^2$
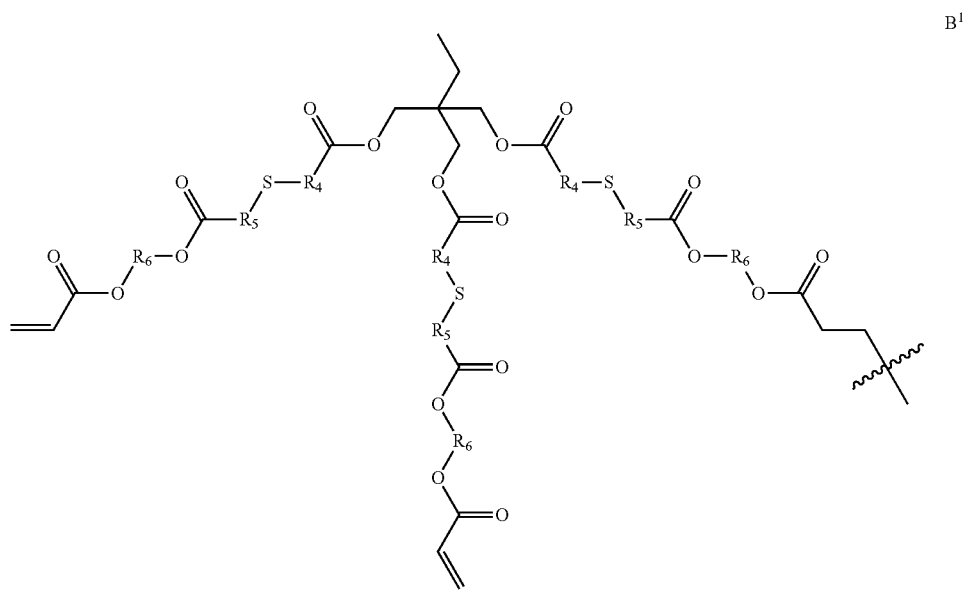
$B^1$

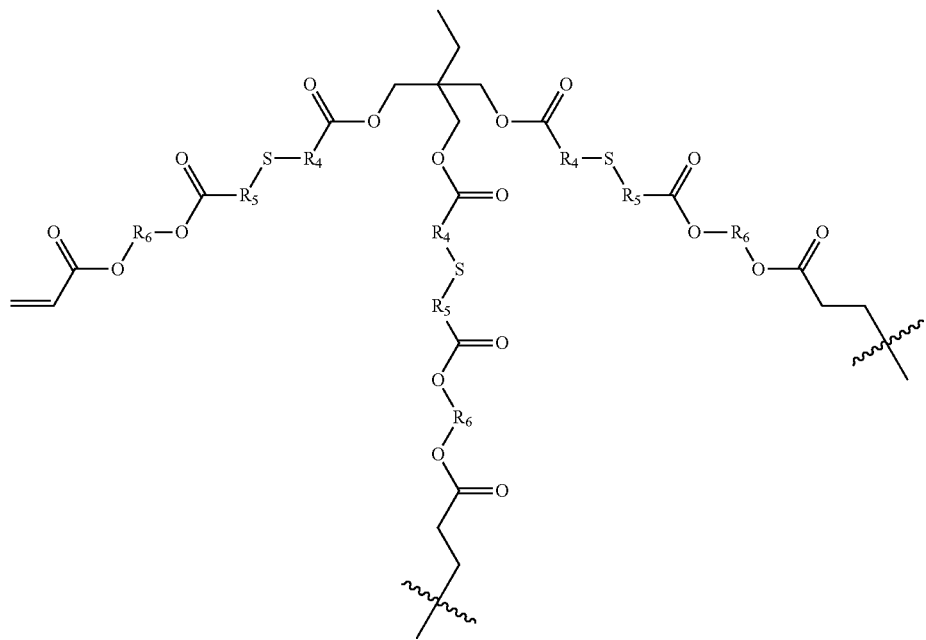
B²
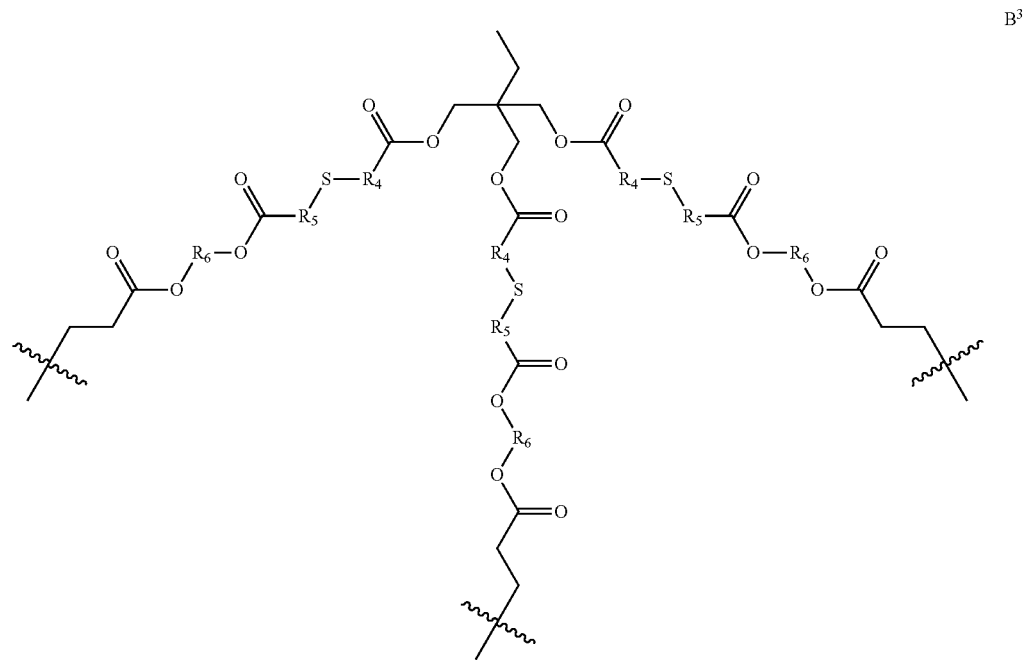
B³
The $R_1$, $R_4$, $R_5$ and $R_6$ in the chemical structures above are respectively an alkyl group with 1-6 carbons. For examples, the $R_1$ and $R_4$ are respectively a straight chain alkyl group having 1-4 carbons, and the $R_5$ and $R_6$ are respectively a straight chain alkyl group having 2, 4, or 6 carbons.
The $R_2$ and $R_3$ above are respectively an aromatic or a cycloalkyl group, such as
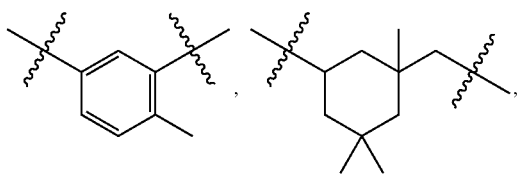
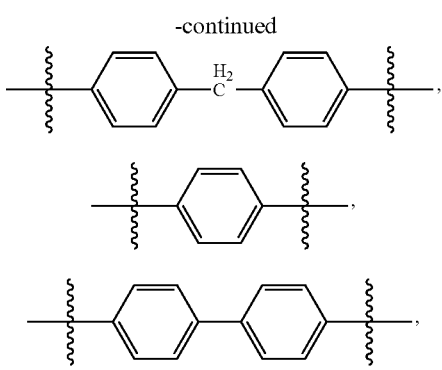

-continued

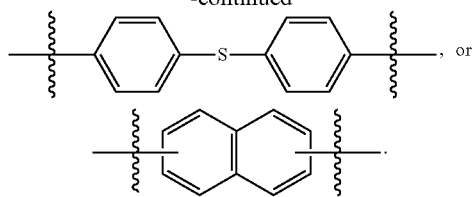, or

According to an embodiment, the $R_2$ can be

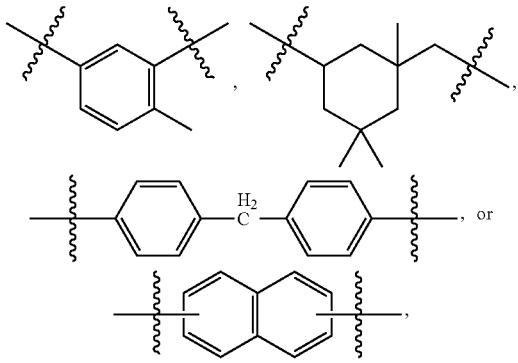, or and the $R_3$ can be

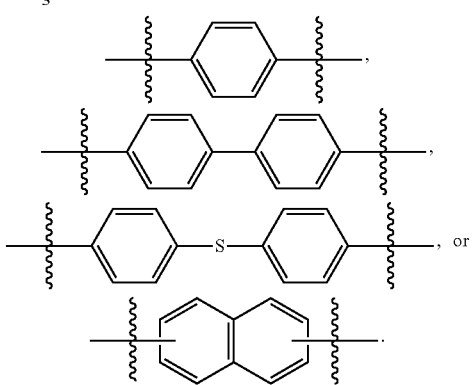, or

According to an embodiment, the molecular weight of the sulfur-containing acrylate dendrimer above can be 1,000-100,000, preferably 2,000-70,000, and more preferably 3,000-50,000. For example, the molecular weight of the sulfur-containing acrylate dendrimer above can be 3,000, 5,000, 10,000, 15,000, 20,000, 25,000, 30,000, 35,000, 40,000, 45,000 or 50,000.

According to another embodiment, the $A^2$ can be

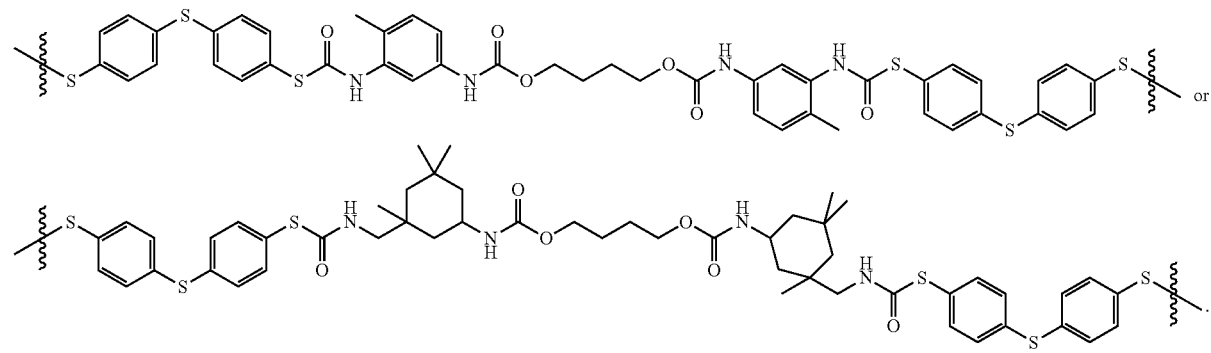

According to yet another embodiment, the $B^1$, $B^2$ and $B^3$ respectively can be

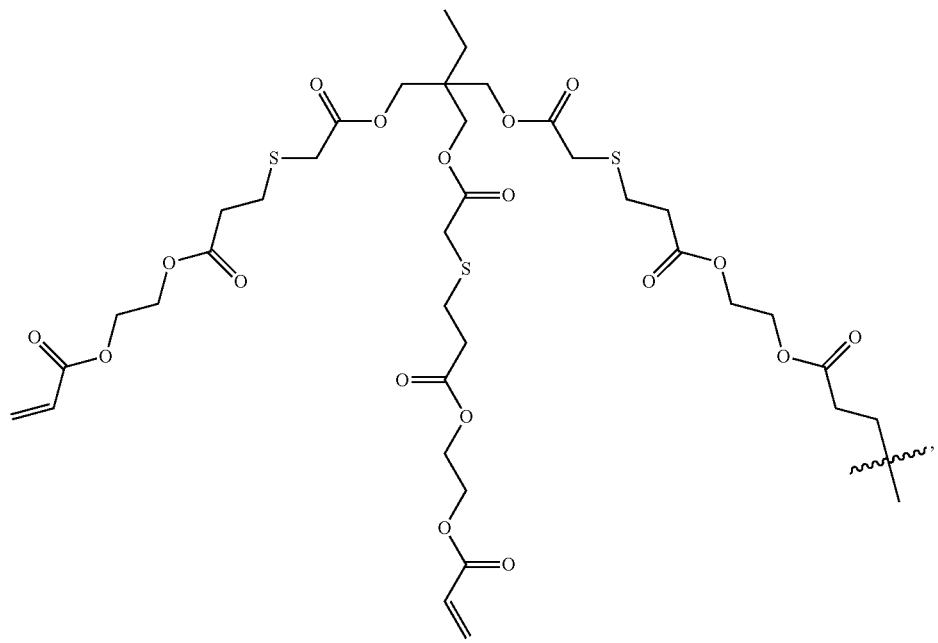 [SMILES: *CCC(=O)OCCOC(=O)CCSCC(=O)OCC(CC)(COC(=O)CSCCC(=O)OCCOC(=O)C=C)COC(=O)CSCCC(=O)OCCOC(=O)C=C]

-continued

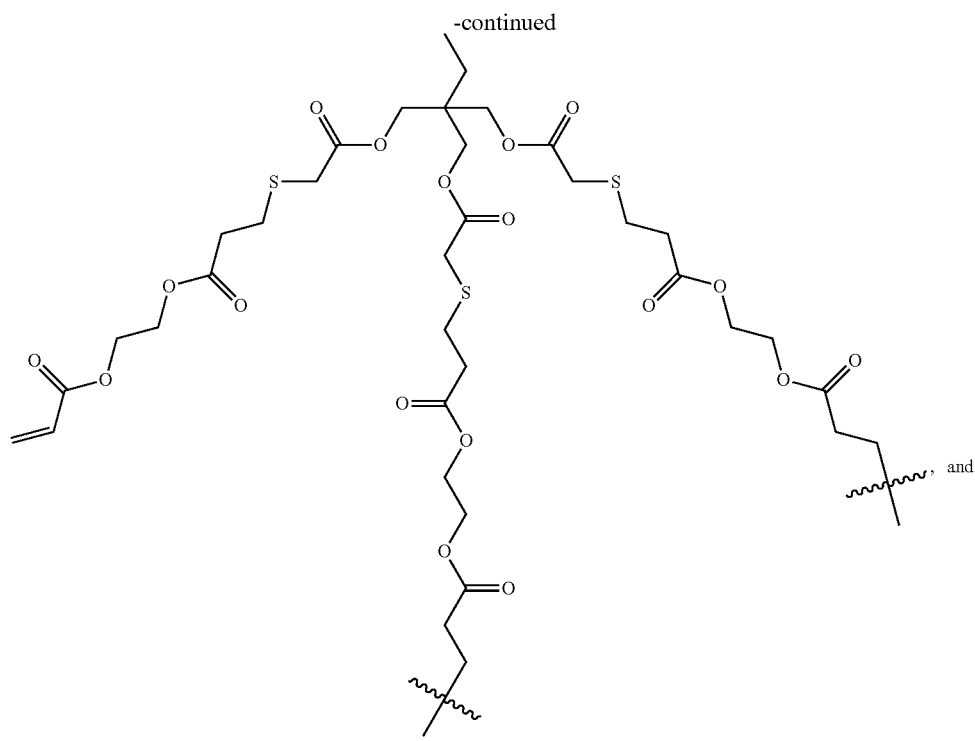

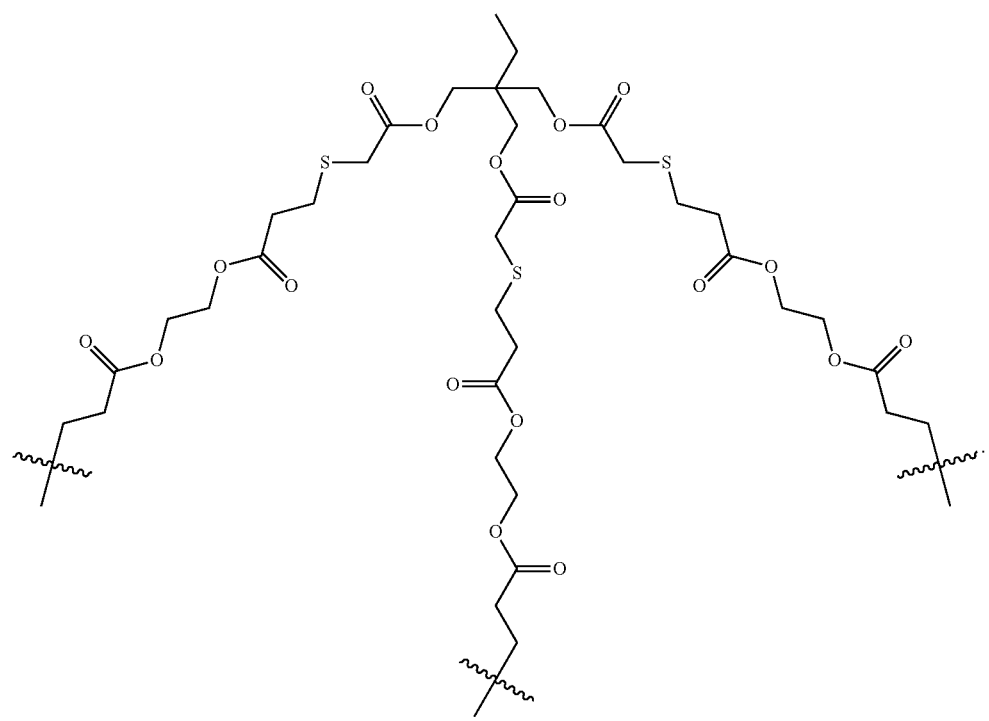 [SMILES: *CCC(=O)OCCOC(=O)CCSCC(=O)OCC(CC)(COC(=O)CSCCC(=O)OCCOC(=O)CC*)COC(=O)CSCCC(=O)OCCOC(=O)CC*]

As understood by persons skilled in the art, there must be some unreacted functional groups existed in the terminals of the sulfur-containing acrylate dendrimer, which represents by the symbols of $B^1$ and $B^2$ above for the monomer B. In the chemical structures of the $B^1$ and $B^2$ above, there are unreacted acrylate groups.

When the molar ratio of the monomer A to the monomer B is 1:0.25 to 1:0.67, the monomer A in the sulfur-containing acrylate dendrimer may also exist in a form as $A^1$ having a chemical structure shown below. In the chemical structure of $A^1$ below, there is one unreacted thiol group.

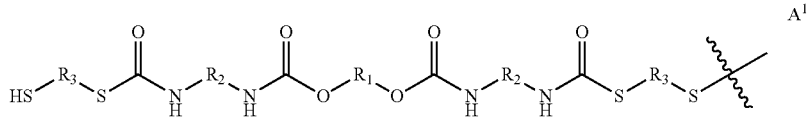

In another aspect, a method of preparing the sulfur-containing acrylate dendrimer above is also provided. The method comprises dropwise adding the monomer A into an aprotic solvent containing the monomer B (denoted by A→B) or dropwise adding the monomer B into the aprotic solvent containing the monomer A (denoted by B→A) to perform Michael addition until the thiol vibration group (—SH) disappear from the IR spectrum, such that the sulfur-containing acrylate dendrimer can be obtained.

The molar ratio of the monomers A to B can be 1:0.25 to 1:4, such as 1:0.5 to 1:2, or 1:1 to 1:2. However, when the monomer A is dropwise added into the aprotic solvent containing the monomer B, the molar ratio of the monomers A to B cannot be 1:2. If the molar ratio of the monomers A to B is 1:2, the obtained product will be the sulfur-containing acrylate oligomer above, rather than the sulfur-containing acrylate dendrimer. According to an embodiment, the molar ratio of the monomers A to B can be 1:0.5, 1:0.6, 1:0.7, 1:0.8, 1:0.9, 1:1, 1:1.1, 1:1.2, 1:1.3, 1:1.4, 1:1.5, 1:1.6, 1:1.7, 1:1.8, or 1:1.9.

According to another embodiment, the aprotic solvent can be ether, dichloromethane, chloroform, ethyl acetate, butyl acetate, acetone, methyl ethyl ketone, methyl isobutyl ketone, toluene, xylene, ethylbenzene, methyl ethyl ketone, cyclohexanone, butyl acetate, tetrahydrofuran, or N-methylpyrrolidone.

According to yet another embodiment, the method further comprises adding a catalyst to the aprotic solvent to catalyze the Michael addition. The catalyst can be an organic base, such as ethylamine, diethylamine, dimethylamine, triethylamine, tributylamine, triethanolamine, amino ethanol, N,N-diethyl amino ethanol, pyridine, morpholine, imidazole, or aniline.

In light of forgoing, the sulfur-containing acrylate oligomer and dendrimer both are obtained by performing at least one Michael addition. Preferably, the sulfur-containing acrylate oligomer and dendrimer both are obtained by performing two Michael addition reactions with the monomer, which is molecular weight (M.W.) less than 500. The monomer could, for example, be selected from tri-mercaptoacetate (M1), diisocyanate-capped urethane (M2), diisocyanate-capped urethane (M3), diacrylate (ethylene glycol diacrylate) or dithio compound (4,4'-dimercapto-diphenyl sulfide) in the embodiments.

Modification of Sulfur-Containing Acrylate Oligomer and Dendrimer

A thiol-containing modifier ($R_7SH$) can be further added into the sulfur-containing acrylate oligomer and dendrimer containing unreacted acrylate groups to react with the unreacted acrylate groups thereof, and thus modify the sulfur-containing acrylate oligomer and dendrimer. Therefore, the common structural feature of the sulfur-containing acrylate oligomer and dendrimer is that some terminal acrylate groups are capped with —$SR_7$ structure.

For example, the $B^1$ moiety of the sulfur-containing acrylate oligomer, $B^1$-$A^2$-$B^1$, has two unreacted acrylate groups, which can react with the thiol group of the modifier. The obtained product can be $B^{1'}$-$A^2$-$B^{1'}$, $B^{1'}$-$A^2$-$B^{1'''}$, or $B^{1'''}$-$A^2$-$B^{1'''}$, and the moieties $B^{1'}$ and $B^{1'''}$ respectively have the chemical structure shown below.

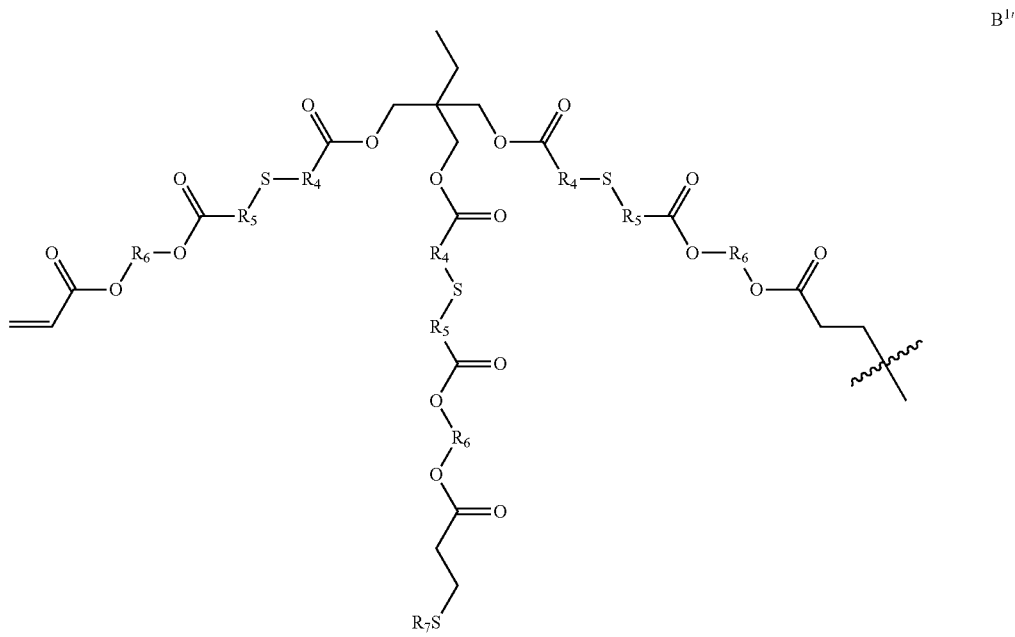

-continued

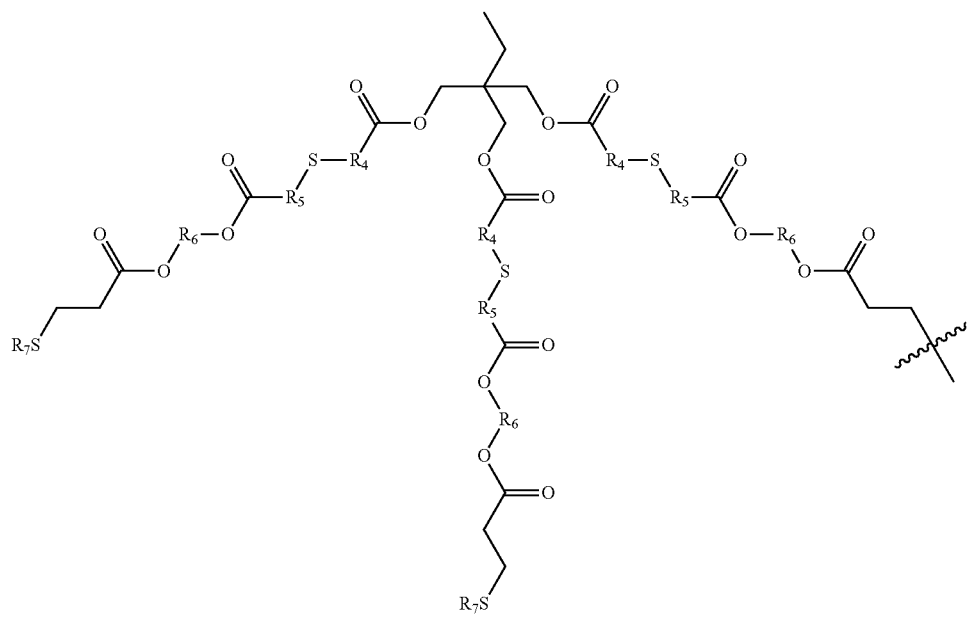

Similarly, for the sulfur-containing acrylate dendrimer, the $B^1$ and $B^2$ moieties both have unreacted acrylate groups, which can react with the thiol group of the modifier. For example, the obtained product may have the chemical structure below.

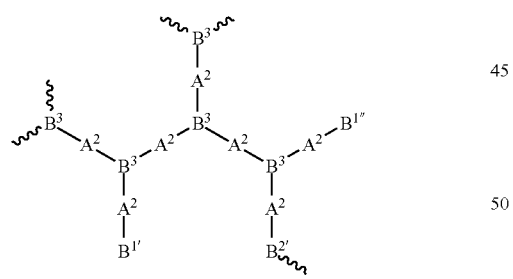

Modified sulfur-containing acrylate dendrimer

In the chemical structure of the modified sulfur-containing acrylate dendrimer above, the moiety $B^{1'}$, $B^{1'''}$, and $B^{2't}$ are randomly distributed on terminals of the modified sulfur-containing acrylate dendrimer. The chemical structures of the $A^2$, $B^{1't}$, $B^{1'''}$, and $B^3$ have been shown above. The chemical structure of $B^{2't}$ is shown below.

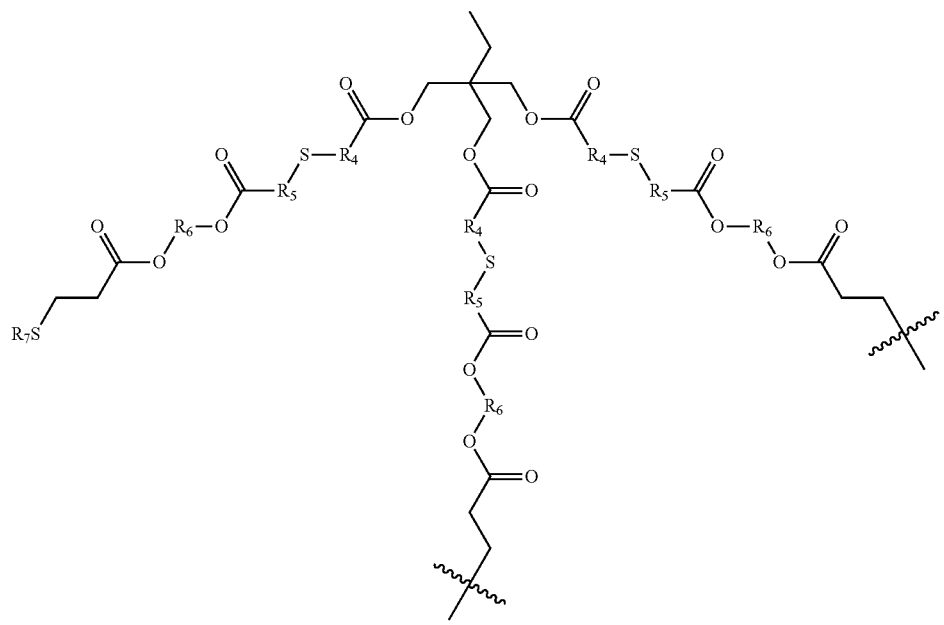

The added equivalent number of the thiol-containing modifier has better to be less than the equivalent number of the unreacted acrylate groups of the sulfur-containing acrylate oligomer or dendrimer. For example, if the sulfur-containing acrylate oligomer has 4n equivalent number of acrylate groups, the added equivalent number of the thiol-containing modifier can be 2n equivalent number. For example, if the sulfur-containing acrylate dendrimer has n equivalent number of acrylate groups, the added equivalent number of the thiol-containing modifier can be 0.8n equivalent number.

The chemical structure of the thiol-containing modifier is $R_7SH$. The $R_7$ group can be an aromatic group or a heterocyclic group having at least a double bond, preferably an aromatic group or a nitrogen-containing heterocyclic group having at least a double bond. Some examples of the thiol-containing modifier are listed in the table below.

| Chemical name | Chemical structure |
|---|---|
| 2-mercaptobenzothiazole | |
| 2-mercapto-2-thiazoline | |
| 2-mercapto-5-methyl-1,3,4-thiadiazole | |
| thiophenol | |

-continued

| Chemical name | Chemical structure |
|---|---|
| 4-methyl thiophenol | |
| triphenylmethyl mercaptan | |

Accordingly, the modified sulfur-containing acrylate oligomer and dendrimer both are obtained by performing at least two Michael addition reactions. Preferably, the modified sulfur-containing acrylate oligomer and dendrimer both are obtained by performing three Michael addition reactions with the monomer, which is molecular weight (M.W.) less than 500. The monomer could, for example, be selected from tri-mercaptoacetate (M1), diisocyanate-capped urethane (M2), diisocyanate-capped urethane (M3), diacrylate (ethylene glycol diacrylate) or thiophenol compound (4,4'-dimercapto-diphenyl sulfide or thiophenol) in the embodiments.

Cross-Linking Unmodified and Modified
Sulfur-Containing Acrylate Oligomer and Dendrimer A photoinitiator is added into the unmodified or modified sulfur-containing acrylate oligomer or dendrimer and then uniformly mixed. The mixture is coated on a substrate to form a thin film. The thin film is illuminated by UV light to cross link the sulfur-containing acrylate oligomer or dendrimer to form a hard and transparent thin film.

The photoinitiator above can be benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2, 4, 6-trimethylbenzoyl diphenyl phosphine oxide, or a mixture thereof. According to an embodiment, the photoinitiator can be benzophenone, 1-hydroxy cyclohexyl phenyl ketone, 2-hydroxy-2-methyl-1-phenyl-propan-1-one, or 2, 4, 6-trimethylbenzoyl diphenyl phosphine oxide. The added amount of the photoinitiator is about 0.1-5 wt %, such as 0.1-3 wt %, based on the total weight of the composition.

Embodiment 1

Synthesis of Monomer B1

The synthesis of the monomer B, especially B1, is disclosed. The synthesis scheme of the monomer B1, trimethylolpropane triacrylate (TMPTA), is shown below.

(Sinopharm Chemical Reagent Co. Ltd), and 1.4 g (3 wt %) of composite salt of 4-(methylamino) pyridine (Sinopharm Chemical Reagent Co. Ltd) and methylbenzenesulfonate (Sinopharm Chemical Reagent Co. Ltd) were added in a three-necked flask. Under conditions of mechanically stirring, nitrogen atmosphere, and 110° C., the reaction was undergone for 8 hours. Then, saturated NaHCO$_3$ and distilled water were used to wash the product. Next, the organic phase solution was dried by anhydrous sodium sulfate, and then distilled at a reduced pressure to obtain colorless liquid, i.e. trimethylol propane tri-mercaptoacetate (the intermediate M1). The esterification percentage of the product was 98%, and the yield of the product was 90%.

In a flask equipped with mechanical stirrer, thermometer, and a constant pressure dropping funnel, 20.4 g (0.12 mol) of ethylene glycol diacrylate (J&K Scientific LTD.) and 20 mL of tetrahydrofuran were added and mixed. A solution of 14.24 g (0.04 mol) of trimethylol propane tri-mercaptoacetate (the

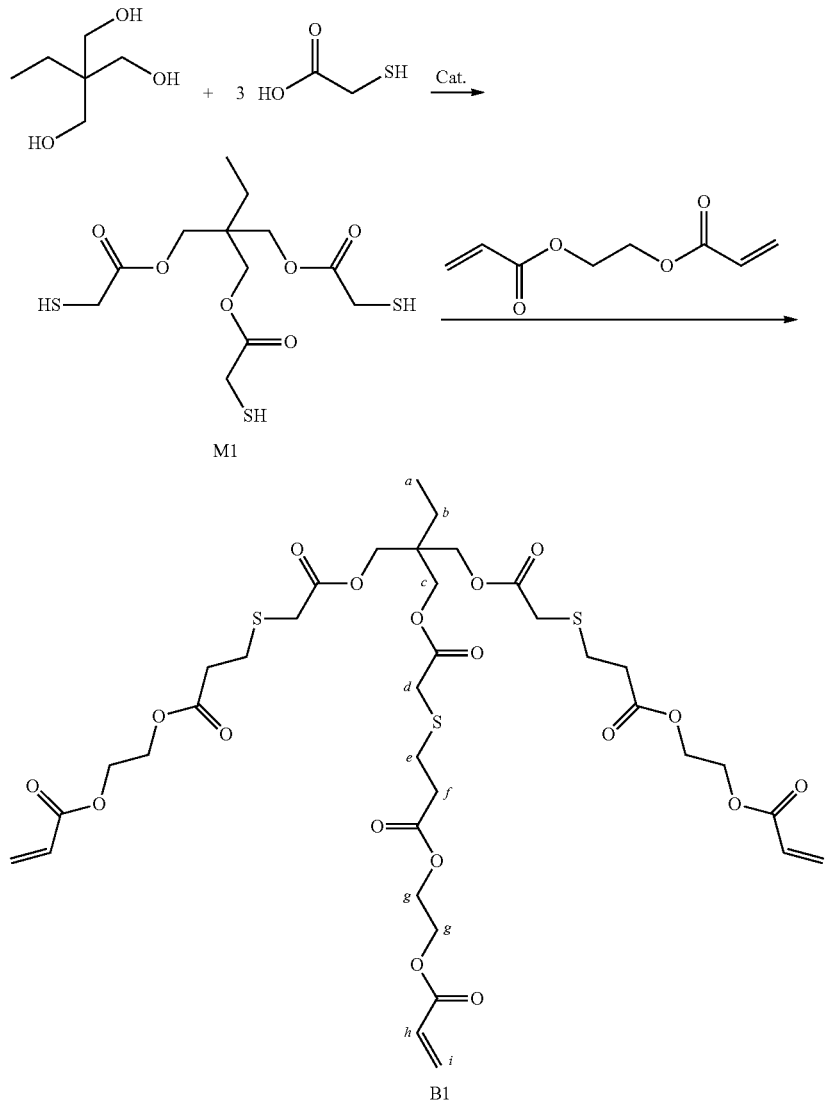

13.4 g (0.1 mol) of trimethoxypropane (Sinopharm Chemical Reagent Co. Ltd), 33.16 g (0.36 mol) of thioglycolic acid intermediate M1 above), 0.0364 g (0.1 wt %) of triethylamine, and 20 mL of tetrahydrofuran (THF) was dropwise added into the flask and reacted at room temperature until the vibrational peak of thiol group (2570 cm$^{-1}$) was disappeared in the IR spectrum. Next, the colorless transparent viscous liquid, i.e. the product of trimethylolpropane triacrylate, was obtained by distillation under a reduced pressure.

FIG. 1 is an infrared vibration spectrum of the monomer B1. In FIG. 1, the peaks at 1410 cm$^{-1}$ and 810 cm$^{-1}$ were the characteristic vibration peaks of the double bond of the acrylate group. The peak at 1732 cm$^{-1}$ was corresponding to the characteristic vibration peak of the carbonyl group of the acrylate group.

The twin peaks at 1100-1300 cm$^{-1}$ was corresponding to the characteristic vibration peaks of the thiol group.

Figure 2:
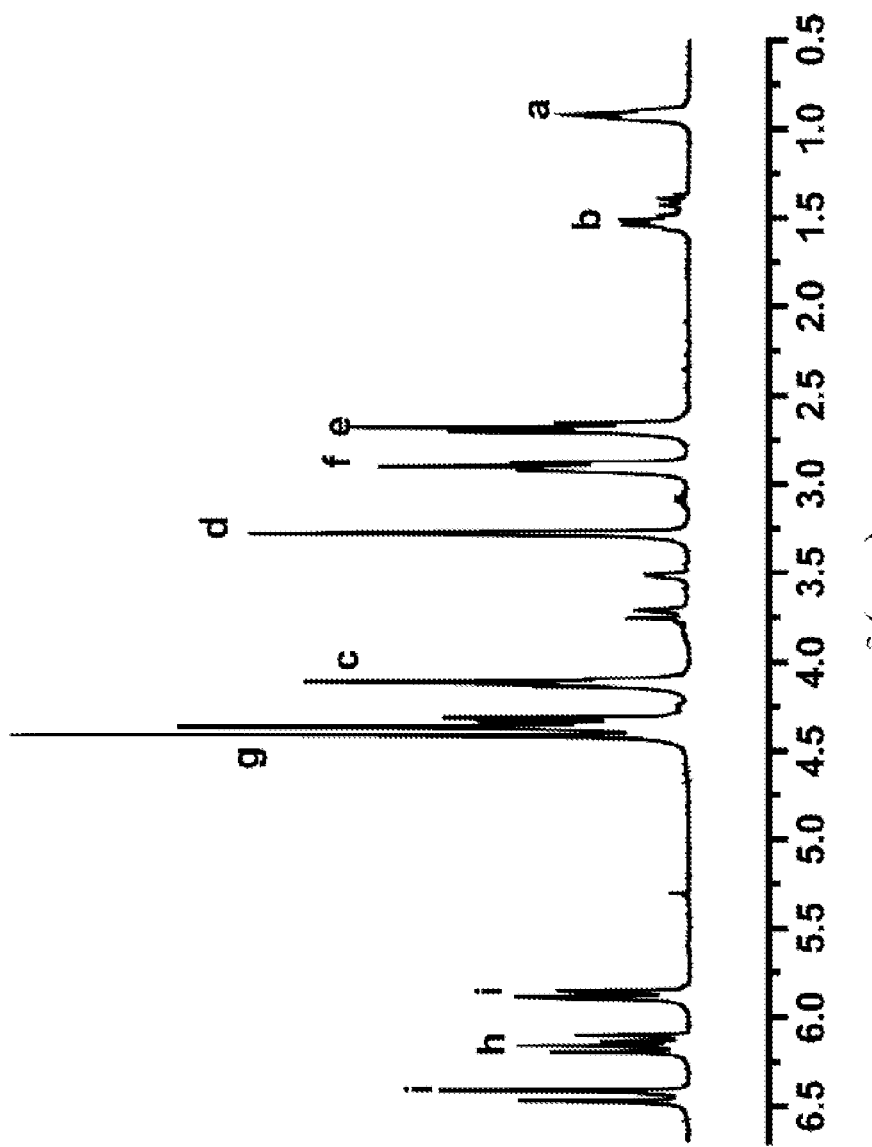
FIG. 2 is a $^1H$ nuclear magnetic resonance spectrum of the monomer B1.

FIG. 2 is a $^1$H nuclear magnetic resonance spectrum of the monomer B1. In FIG. 2, the chemical shifts at 5.90-6.60 ppm (marked by h, i) are the peaks of the acrylate group. The chemical shifts at 4.31-4.41 ppm (marked by g) are the peaks of the methylene group next to ester group (—CH$_2$—OCO—). The chemical shifts at 4.04-4.19 ppm (marked by c) and 3.27 ppm (marked by d) are the peaks of the methylene group next to the tertiary carbon and the ester group (—C(CH$_2$O)$_3$—OCO). The chemical shift at 3.27 ppm (marked by d) is the peak of the methylene group of the thioether group (—S—CH$_2$—COO—). The chemical shifts at 2.68 ppm (marked by e) and 2.90 ppm (marked by f) are the methylene group next to the thioether group (—S—CH$_2$—CH$_2$—). Therefore, it can be known that the product of this embodiment was trimethylolpropane triacrylate, the monomer B1.

Embodiment 2

Synthesis of Monomer A1

The synthesis of the monomer A, especially A1, is disclosed. The synthesis scheme of the monomer A1 is shown below.

17.4 g (0.1 mol) of 2,4-toluene diisocyanate (Sinopharm Chemical Reagent Co. Ltd) and 20 mL of THF were added into a flask equipped with mechanical stirrer, thermometer, and a constant pressure dropping funnel, and then mixed in an ice bath. Next, a solution of 4.5 g (0.05 mol) of 1,4-butanediol (Sinopharm Chemical Reagent Co. Ltd), 0.022 g (0.1 wt %) of dibutyltin dilaurate (DBTL; Sinopharm Chemical Reagent Co. Ltd) and 10 mL of THF was added into the flask, and then stirred and reacted for 2 hours to obtain a diisocyanate-capped urethane (the intermediate M2).

25 g (0.1 mol) of 4,4'-dimercapto-diphenyl sulfide (Zhejiang Shou & Fu Chemical Co., Ltd.) and 100 mL of THF were added into a flask equipped with mechanical stirrer, thermometer, and a constant pressure dropping funnel, and mixed uniformly. The intermediate M2 above was then added into the flask to react at room temperature until the vibrational peak of isocyanate (2270 cm$^{-1}$) was disappeared. After distillation under a reduced pressure, a dimercapto-capped thiourethane prepolymer (the product A1) in white powder was obtained.

Figure 3:
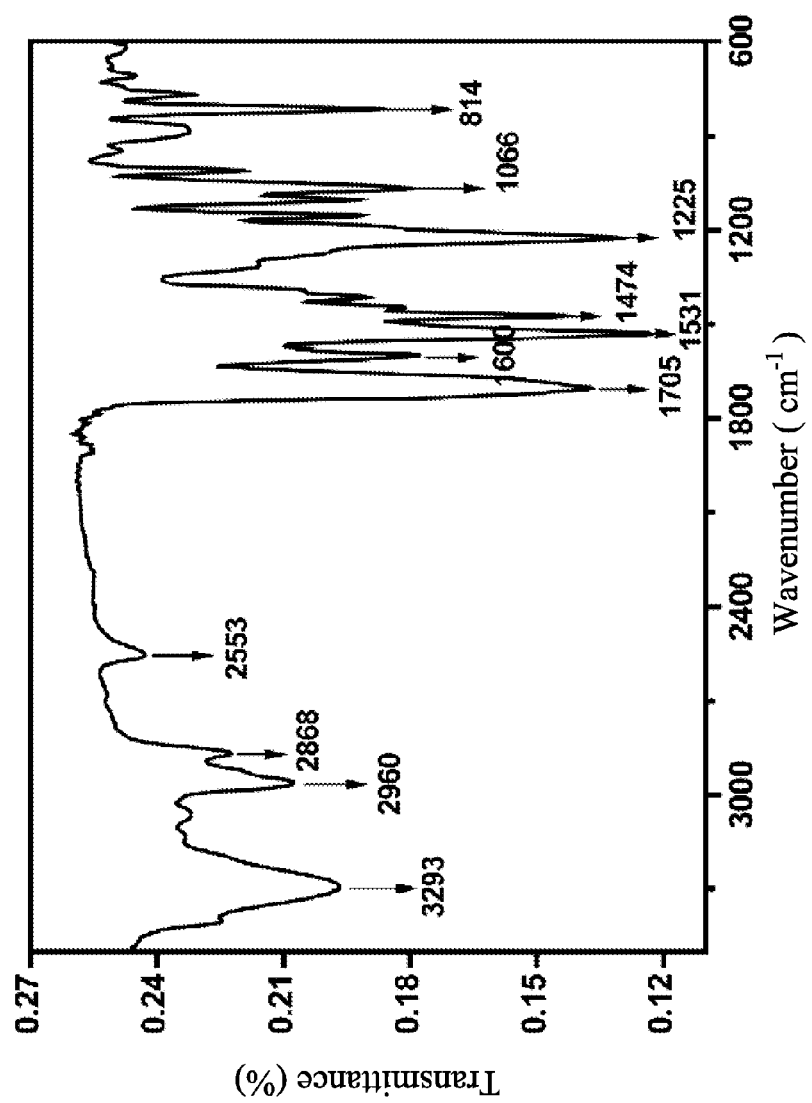
FIG. 3 is an infrared vibration spectrum of the monomer A1.

FIG. 3 is an infrared vibration spectrum of the monomer A1. In FIG. 3, the peaks at 3293 cm$^{-1}$ and 1705 cm$^{-1}$ are vibrational peaks of urethane group and thiourethane group

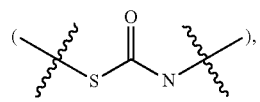

respectively. The peak at 2553 cm$^{-1}$ is the vibrational peaks of thiol group. The peaks of 1600 cm$^{-1}$, 1531 cm$^{-1}$ and 1474 cm$^{-1}$ are characteristic peaks of benzene ring. The peak at 814 cm$^{-1}$ is the bending vibrational peaks of hydrogen attached to substituted benzene. Therefore, it can be known that the dimercapto-capped thiourethane prepolymer A1 was synthesized.

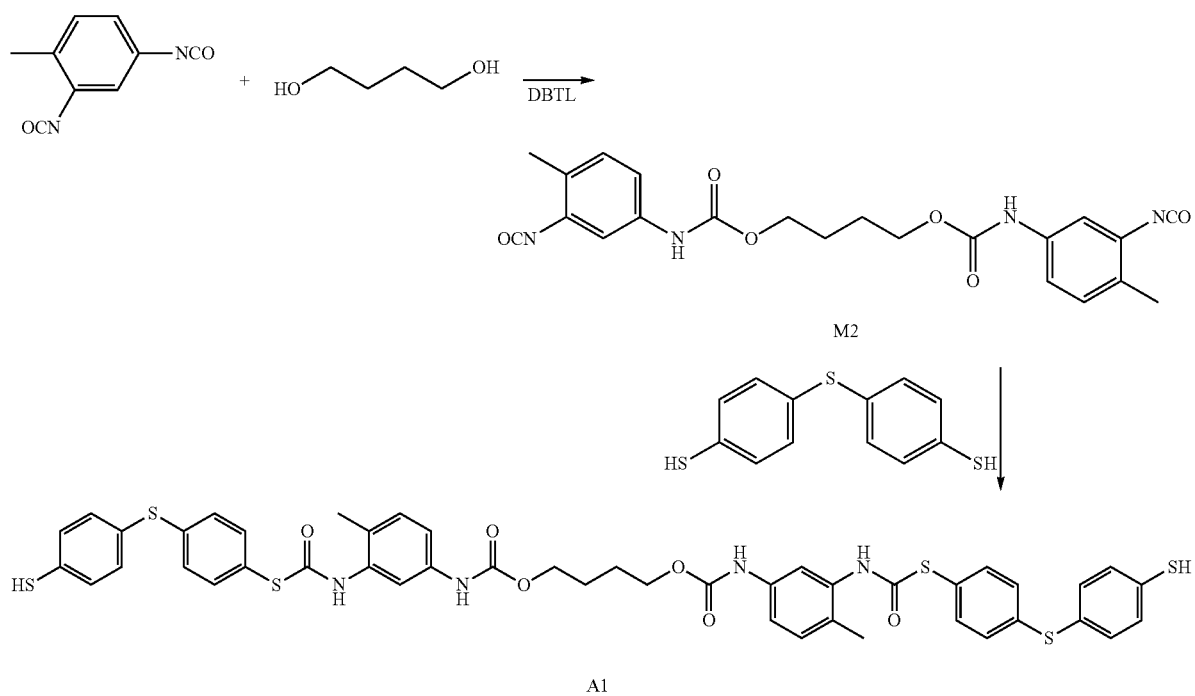

A1

Embodiment 3

Synthesis of Monomer A2

The synthesis of the monomer A, especially A2, is disclosed. The synthesis scheme of the monomer A2 is shown below.

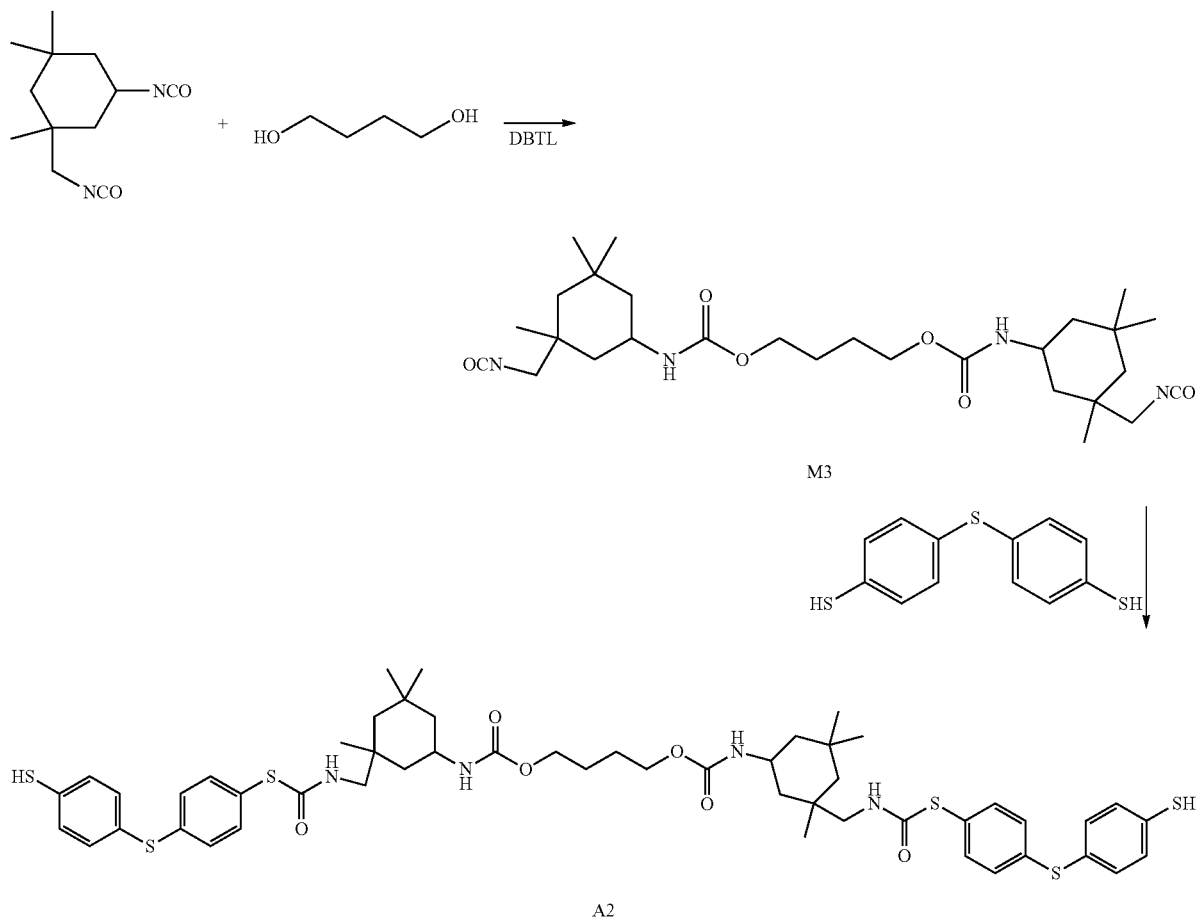

22.2 g (0.1 mol) of isophorone diisocyanate (Sinopharm Chemical Reagent Co. Ltd) and 30 mL of THF were added into a flask equipped with mechanical stirrer, thermometer, and a constant pressure dropping funnel, and then uniformly mixed in an ice bath. A solution of 4.5 g (0.05 mol) of 1,4-butanediol (Sinopharm Chemical Reagent Co. Ltd), 0.027 g (0.1 wt %) of DBTL (Sinopharm Chemical Reagent Co. Ltd), and 10 mL of THF was added and stirred for 2 hours to obtain a diisocyanate-capped urethane (the intermediate M3).

25 g (0.1 mol) of 4,4'-dimercapto-diphenyl sulfide (Zhejiang Shou & Fu Chemical Co., Ltd.) and 100 mL of THF were added into a flask equipped with mechanical stirrer, thermometer, and a constant pressure dropping funnel, and mixed uniformly. The intermediate M3 above was then added into the flask to react at room temperature until the vibrational peak of isocyanate (2270 cm$^{-1}$) was disappeared. After distillation under a reduced pressure, a dimercapto-capped thiourethane prepolymer (the product A2) in white powder was obtained.

Figure 4:
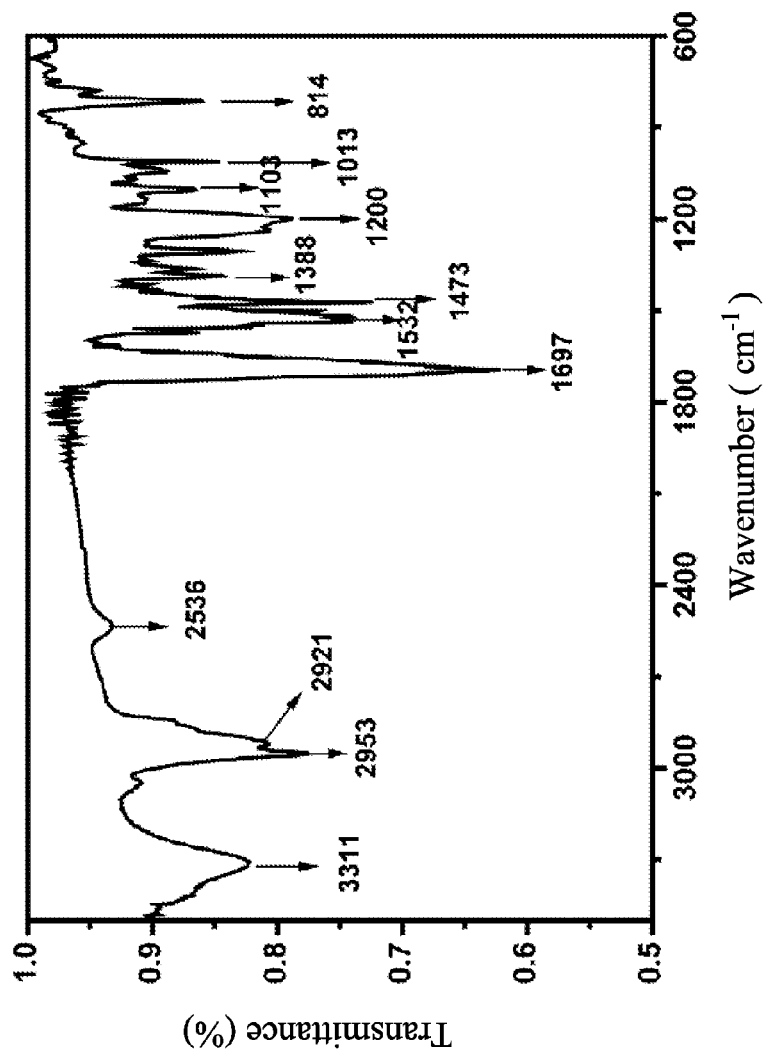
FIG. 4 is an infrared vibration spectrum of the monomer A2.

FIG. 4 is an infrared vibration spectrum of the monomer A2. In FIG. 4, the peaks at 3311 cm$^{-1}$ and 1697 cm$^{-1}$ are vibrational peaks of urethane group and thiourethane group, respectively. The peak at 2536 cm$^{-1}$ is the vibrational peaks of thiol group. The peaks of 1600 cm$^{-1}$, 1531 cm$^{-1}$ and 1474 cm$^{-1}$ are characteristic peaks of benzene ring. The peak at 814 cm$^{-1}$ is the bending vibrational peaks of hydrogen attached to substituted benzene. Therefore, it can be known that the dimercapto-capped thiourethane prepolymer A2 was synthesized.

Embodiment 4

Synthesising Sulfur-Containing Acrylate Oligomer C1 by A1→B1

16.8 g (0.02 mol) of the monomer B1 and 30 mL of THF was added in a flask equipped with a thermometer and a constant pressure dropping funnel. After uniformly mixing, a solution of 9.38 g (0.01 mol) of the monomer A1, 0.026 g (0.1 wt %) of triethyl amine, and 20 mL of THF was dropwise added into the flask. The reaction was performed at room temperature until the vibrational peak of thiol group at 2553 cm$^{-1}$ in the IR spectrum was disappeared. After distillation under a reduced pressure, a white semi-solid product (i.e. sulfur-containing acrylate oligomer C1) was obtained. The chemical structure of the sulfur-containing acrylate oligomer C1 is B1$^1$-A1$^2$-B1$^1$, wherein the A1$^2$ and B1$^1$ respectively have the chemical structure below.

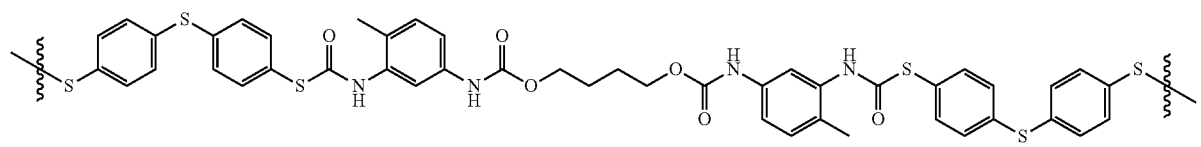

A1²

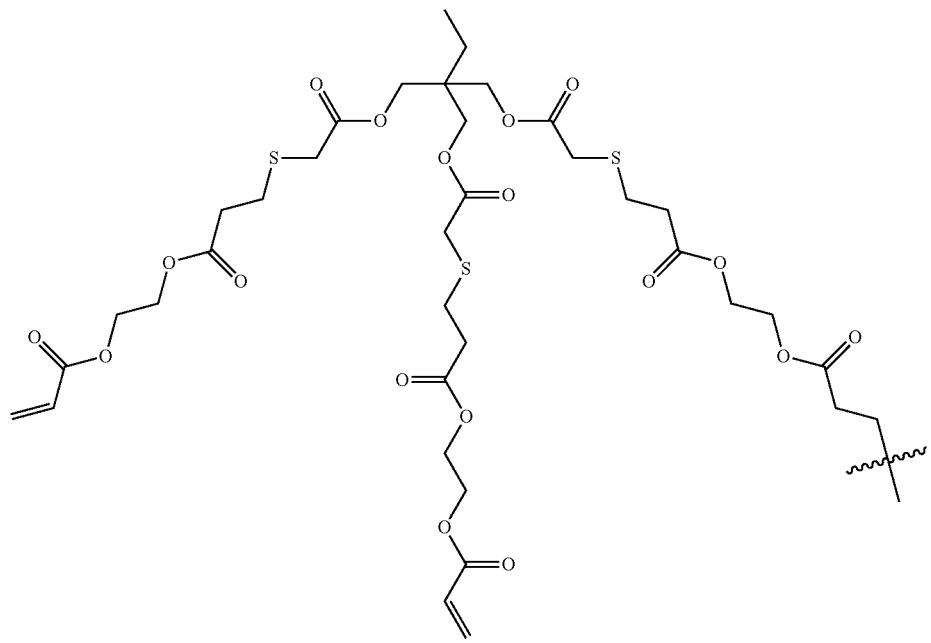

B1¹

Figure 5:
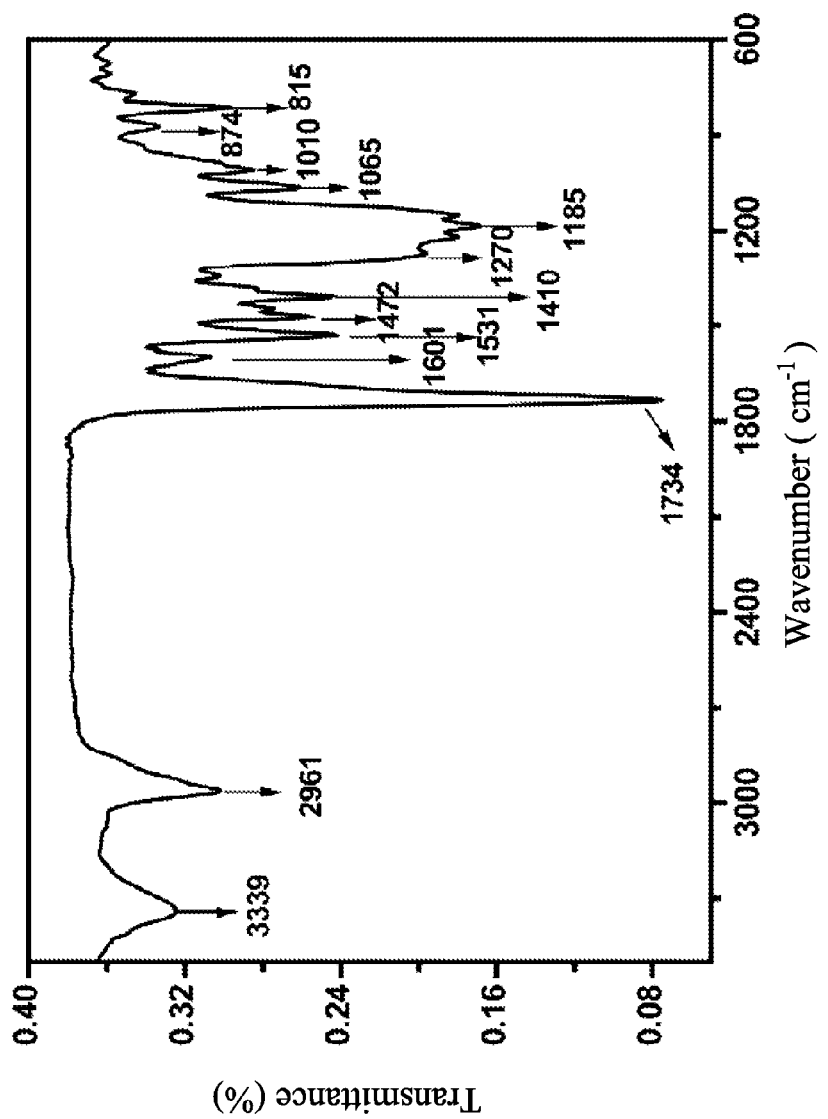
FIG. 5 is an infrared vibration spectrum of the sulfur-containing acrylate oligomer C1.

FIG. 5 is an infrared vibration spectrum of the sulfur-containing acrylate oligomer C1. In FIG. 5, the peaks at 3339 cm⁻¹ and 1734 cm⁻¹ are corresponding to the characteristic absorption peaks the urethane group, thiourethane group, and carbonyl group of the acrylate group. 1600 cm⁻¹, 1531 cm⁻¹ and 1474 cm⁻¹ are the characteristic skeleton vibrational peaks of benzene ring. The peak at 1410 cm⁻¹ is the characteristic absorption peak of the double bong of acrylate group. The peak at 815 cm⁻¹ is corresponding to the characteristic absorption peak of the acrylate double bond and the bending vibrational peaks of hydrogen attached to substituted benzene.

Figure 6:
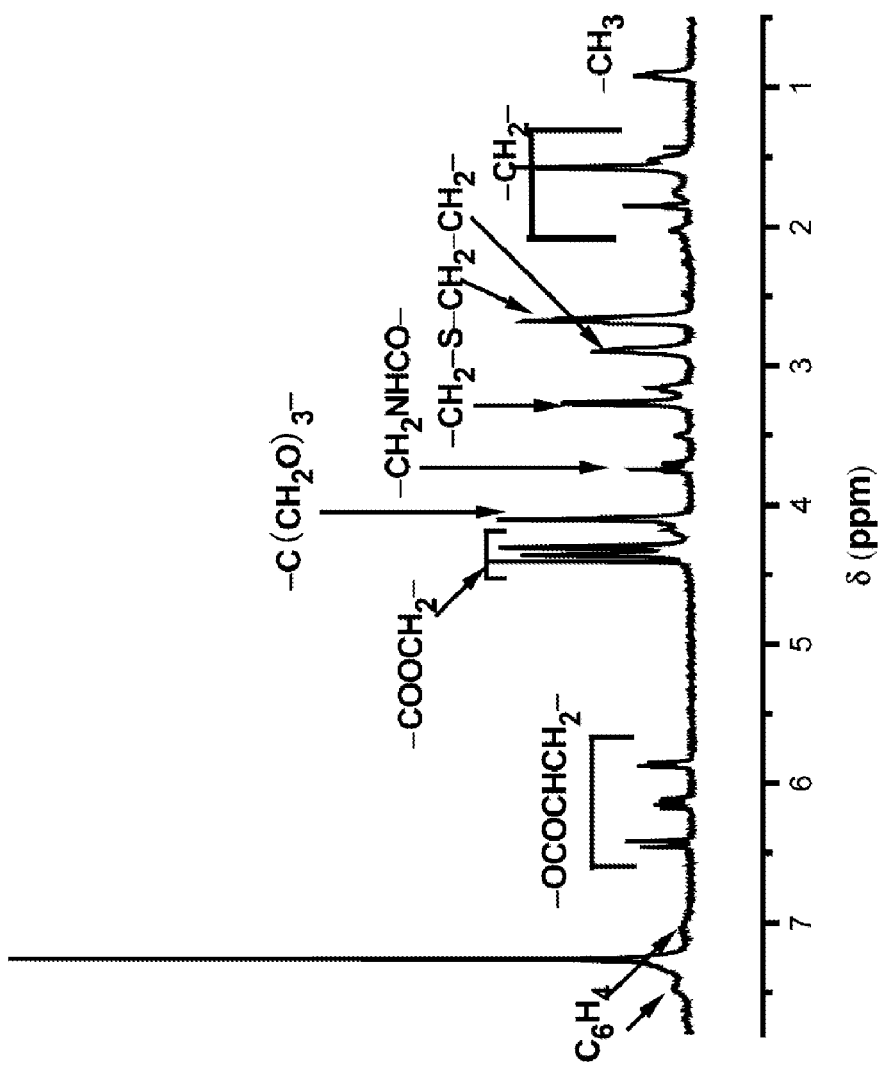
FIG. 6 is a $^1H$ nuclear magnetic resonance spectrum of the sulfur-containing acrylate oligomer C1.

FIG. 6 is a ¹H nuclear magnetic resonance spectrum of the sulfur-containing acrylate oligomer C1. The chemical shifts at 6.88-7.88 ppm are the peaks of hydrogen on benzene ring. The chemical shifts at 5.90-6.60 ppm are the peaks of the acrylate double bond. The chemical shifts at 4.31-4.41 ppm are the peaks of the methylene group next the ester group (—CH₂—OCO—). The chemical shifts at 4.04-4.19 ppm are the peaks of the methylene group next to the tertiary carbon and the ester group (—C(CH₂O)₃—OCO). The chemical shift at 3.27 ppm is the peak of the methylene group of the thioether group (—S—CH₂—COO—). The chemical shifts at 2.68 ppm and 2.90 ppm are the methylene group next to the thioether group (—S—CH₂—CH₂—CO—). Therefore, it can be known that the product of this embodiment is the sulfur-containing acrylate oligomer containing 4 acrylate groups.

Embodiment 5

Synthesizing sulfur-containing acrylate dendrimer D1 by A1→B1

The preparation method was basically the same as the embodiment 4. The only difference is the added amount of the monomer B1 is 12.6 g (0.015 mol).

Embodiment 6

Synthesizing Sulfur-Containing Acrylate Dendrimer D2 by A1→B1

The preparation method was basically the same as the embodiment 4. The only difference is the added amount of the monomer B1 is 10.08 g (0.012 mol).

Embodiment 7

Synthesizing Sulfur-Containing Acrylate Dendrimer D3 by B1→A1

In a flask equipped with a thermometer and a constant pressure dropping funnel, 9.38 g (0.01 mol) of monomer A1 and 30 mL of THF were added. After uniformly mixing, a solution of 16.8 g (0.02 mol) of monomer B1, 0.026 g (0.1 wt %) of triethyl amine, and 20 mL of THF was then added and reacted under room temperature until the thiol vibrational peak at 2553 cm$^{-1}$ was disappeared in the IR spectrum. A white semi-solid product (i.e. the dendrimer D3) was obtained by distillation under a reduced pressure.

Embodiment 8

Synthesizing Sulfur-Containing Acrylate Dendrimer D4 by B1→A1

The preparation method was basically the same as the embodiment 7. The only difference is the added amount of the monomer B1 was 12.6 g (0.015 mol).

Embodiment 9

Synthesizing Sulfur-Containing Acrylate Dendrimer D5 by B1→A1

The preparation method was basically the same as the embodiment 7. The only difference is the added amount of the monomer B1 was 10.08 g (0.012 mol).

Embodiment 10

Synthesizing Sulfur-Containing Acrylate Oligomer C2 by A2→B1

In a flask equipped with a thermometer and a constant pressure dropping funnel, 16.8 g (0.02 mol) of the monomer B1 and 20 mL of THF were added and mixed. Then, a solution of 10.34 g (0.01 mol) of the monomer A2, 0.027 g (0.1 wt %) of triethyl amine and 20 mL of THF was added and reacted at room temperature until the thiol vibrational peak at 2536 cm$^{-1}$ was disappeared in the IR spectrum. A white semi-solid product (i.e. the oligomer C2) was obtained by distillation under a reduced pressure. The chemical structure of the sulfur-containing acrylate oligomer C2 is B1$^1$-A2$^2$-B1$^1$, wherein the A2$^2$ and B1$^1$ respectively have the chemical structure shown below.

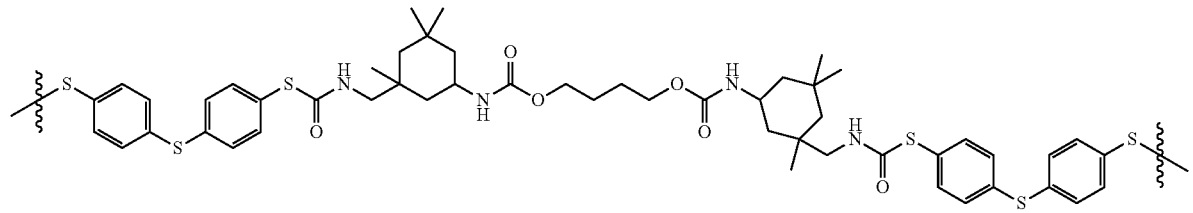

A2$^2$

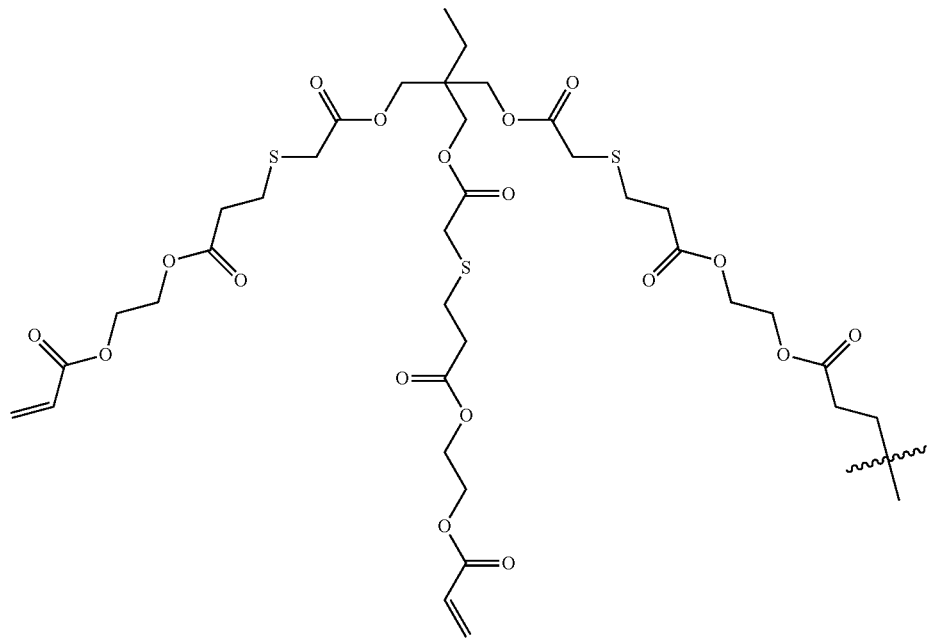

B1$^1$

Figure 7:
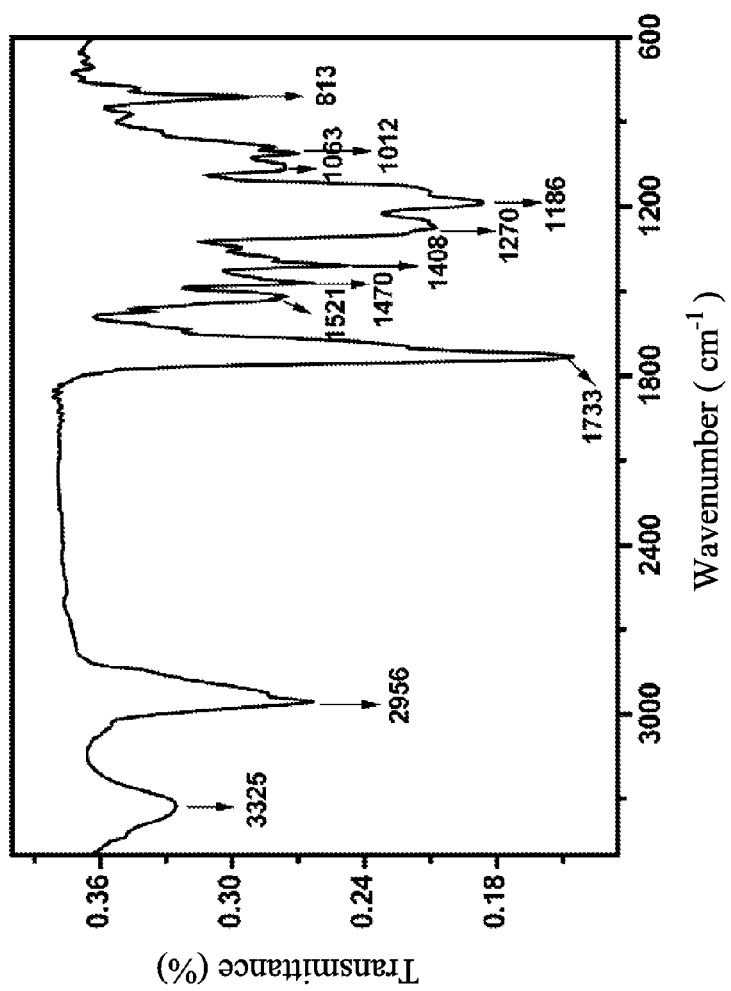
FIG. 7 is an infrared vibration spectrum of the sulfur-containing acrylate oligomer C2.

FIG. 7 is an infrared vibration spectrum of the sulfur-containing acrylate oligomer C2. In FIG. 7, the peaks at 3335 cm$^{-1}$ and 1733 cm$^{-1}$ are corresponding to the characteristic vibrational peaks of the urethane group, thiourethane group, and the carbonyl group of the acrylate group. 1521 cm$^{-1}$ and 1470 cm$^{-1}$ are the characteristic skeleton vibrational peaks of benzene ring. The peak at 1408 cm$^{-1}$ is the characteristic absorption peak of the double bong of acrylate group. The twin peaks at 1100-1300 cm$^{-1}$ are corresponding to the characteristic vibrational peak of the thioether group. The peak at 813 cm$^{-1}$ is corresponding to the characteristic absorption peak of the acrylate double bond and the bending vibrational peaks of hydrogen attached to substituted benzene.

Figure 8:
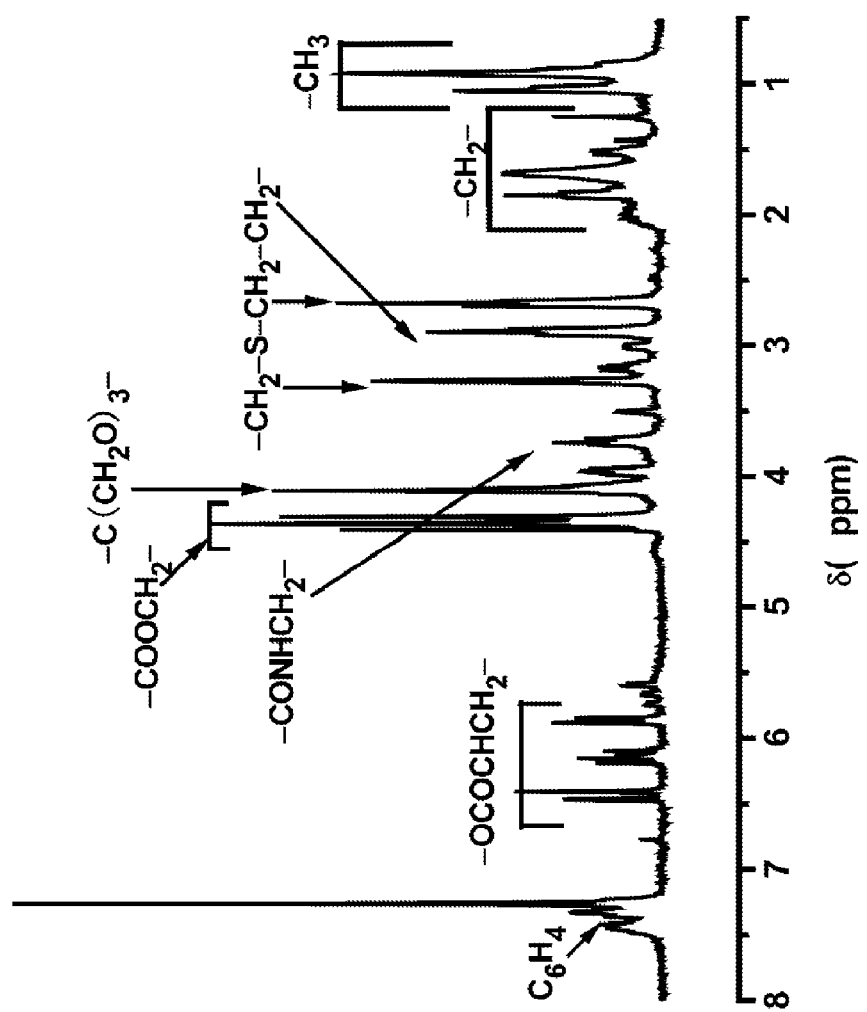
FIG. 8 is a $^1H$ nuclear magnetic resonance spectrum of the sulfur-containing acrylate oligomer C2.

FIG. 8 is a $^1$H nuclear magnetic resonance spectrum of the sulfur-containing acrylate oligomer C2. In FIG. 8, the chemical shifts at 6.88-7.88 ppm are the peaks of hydrogen on benzene ring. The chemical shifts at 5.90-6.60 ppm are the peaks of the acrylate double bond. The chemical shifts at 4.31-4.41 ppm are the peaks of the methylene group next the ester group (—CH$_2$—OCO—). The chemical shifts at 4.04-4.19 ppm are the peaks of the methylene group next to the tertiary carbon and the ester group (—C(CH$_2$O)$_3$—OCO). The chemical shift at 3.27 ppm is the peak of the methylene group of the thioether group (—S—CH$_2$—COO—). The chemical shifts at 2.68 ppm and 2.90 ppm are the methylene group next to the thioether group (—S—CH$_2$—CH$_2$—CO—). Therefore, it can be known that the product of this embodiment is the sulfur-containing acrylate oligomer containing 4 acrylate groups.

Embodiment 11

Synthesizing sulfur-containing acrylate dendrimer D6 by A2→B1

The preparation method was basically the same as the embodiment 10. The only difference is the added amount of the monomer B1 is 12.6 g (0.015 mol).

Embodiment 12

Synthesizing sulfur-containing acrylate dendrimer D7 by A2→B1

The preparation method was basically the same as the embodiment 10. The only difference is the added amount of the monomer B1 is 10.08 g (0.012 mol).

Embodiment 13

Synthesizing sulfur-containing acrylate dendrimer D8 by B1→A2

In a flask equipped with a thermometer and a constant pressure dropping funnel, 10.34 g (0.01 mol) of monomer A2 and 30 mL of THF were added. After uniformly mixing, a solution of 16.8 g (0.02 mol) of monomer B1, 0.026 g (0.1 wt %) of triethyl amine, and 20 mL of THF was then added and reacted under room temperature until the thiol vibrational peak at 2553 cm$^{-1}$ was disappeared in the IR spectrum. A white semi-solid product (i.e. the dendrimer D8) was obtained by distillation under a reduced pressure.

Embodiment 14

Synthesizing Sulfur-Containing Acrylate Dendrimer D9 by B1→A2

The preparation method was basically the same as the embodiment 13. The only difference is the added amount of the monomer B1 is 12.6 g (0.015 mol).

Embodiment 15

Synthesizing Sulfur-Containing Acrylate Dendrimer D10 by B1→A2

The preparation method was basically the same as the embodiment 13. The only difference is the added amount of the monomer B1 is 10.08 g (0.012 mol).

Embodiment 16

Cross-Linking the Sulfur-Containing Acrylate Oligomer and Dendrimer by UV Light

The sulfur-containing acrylate oligomer C1 and C2 above (embodiments 4 and 10) were respectively mixed with 1.5 wt % of a photoinitiator, 2-hydroxy-2-methyl-1-phenyl-propan-1-one (Iragcure 1173; RUNTEC Chemical Co. Ltd.). The mixture was then coated on a quartz glass (1 mm thick and with a refractive index of 1.514) or a tin plate (50 mm×120 mm×0.3 mm) to form a thin film having a thickness of 200 μm. A medium pressure mercury lamp (F300S-6 from Fusion UV Systems, US) was used to illuminate the thin films at a distance of 10 cm to cross link the oligomer C1 or C2. Finally, a hard transparent cross-linked thin film was obtained.

The sulfur-containing acrylate dendrimer D1-D10 (embodiments 5-9 and 11-15) was also cross-linked by the method described above.

The refractive index (on the quartz glass), pencil hardness (on the tin plate), flexibility (on the tin plate), impact toughness (on the tin pate) of the oligomers C1 and C2, and the dendrimers D1-D10 were respectively measured and then listed in the table 1 below.

TABLE 1

Physical properties of oligomers C1 and C2, and the dendrimers D1-D10

| samples | Addition method | Molar ratio B/A | Refractive index $^a$ | Pencil hardness $^b$ | Flexibility (mm) $^c$ | Impact toughness $^d$ |
|---|---|---|---|---|---|---|
| C1 | A1 →B1 | 2 | 1.5941 | 5H | <2 | ○ |
| D1 | | 1.5 | 1.6035 | 5H | <2 | ○ |
| D2 | | 1.2 | 1.6083 | 4H | <2 | ○ |
| D3 | B1 →A1 | 2 | 1.5924 | 5H | <2 | ○ |
| D4 | | 1.5 | 1.5966 | 5H | <2 | ○ |
| D5 | | 1.2 | 1.6037 | 4H | <2 | ○ |
| C2 | A2 →B1 | 2 | 1.5764 | 5H | <2 | ○ |
| D6 | | 1.5 | 1.5792 | 4H | <2 | ○ |
| D7 | | 1.2 | 1.5840 | 4H | <2 | ○ |
| D8 | B1 →A2 | 2 | 1.5753 | 5H | <2 | ○ |
| D9 | | 1.5 | 1.5786 | 4H | <2 | ○ |

TABLE 1-continued

Physical properties of oligomers C1 and C2, and the dendrimers D1-D10

| samples | Addition method | Molar ratio B/A | Refractive index [a] | Pencil hardness [b] | Flexibility (mm) [c] | Impact toughness [d] |
|---|---|---|---|---|---|---|
| D10 |  | 1.2 | 1.5840 | 4H | <2 | ○ |
| CE | — | — | 1.4900 | 3H | 5 | X |

[a] measured at 632.8 nm by a prism coupler (PRISM COUPLER SPA-4000, Korea)
[b] measured by a pencil hardness tester (model QHQ-A, Tinjinshi Jinkekecailiao shiyanjichang, China) and following the standard of GB6739-1996
[c] measured by a flexibility instrument (model QTX, Tinjinshi Jinkekecailiao shiyanjichang, China) and following the standard of GBT1731-1993
[d] measured by impact toughness instrument (model QCY, Tinjinshi Jinkekecailiao shiyanjichang, China) and following the standard of GBT1732-1993

Furthermore, a comparative example (CE) was also prepared. In this comparative example, a monomer of methylmethacrylate (EM31 from Eternal Chemical, Taiwan) was coated on the quartz glass and the tin plate, and then cross-linked by UV light by the method described above, respectively. Finally, a layer of polymethylmethacrylate (PMMA) was obtained. The refractive index, pencil hardness, flexibility, impact toughness of the PMMA layer was also measured.

According to the results shown in the table 1 above, the refractive index of the oligomers C1 and C2, and dendrimers D1-D10 were all above 1.5, and greater than the refractive index of the comparative example. Therefore, the oligomers C1 and C2, and dendrimers D1-D10 all have high refractive indexes.

Embodiment 17

Modification of the Sulfur-Containing Acrylate Oligomer

In a flask equipped with thermometer, and a constant pressure dropping funnel, n equivalent number of sulfur-containing acrylate oligomer C1 or C2, and THF were added and mixed. The n equivalent number of sulfur-containing acrylate oligomer C1 or C2 contains 4n equivalent number of unreacted acrylate group. A solution of 2n equivalent number of a thiol-containing modifier, 0.1 wt % of triethyl amine, and THF was then dropwise added to the flask and then underwent Michael addition at room temperature until the vibrational peak of thiol group (2528 cm$^{-1}$) was disappeared in the IR spectrum. A semi-solid white solid, i.e. the modified oligomer C1' or C2', was obtained after distilling under a reduced pressure. The thiol-containing modifier was 2-mercaptobenzothiazole, 2-mercapto-2-thiazoline, or 2-mercapto-5-methyl-1,3,4-thiadiazole, which are all from XiaoGan ShenYuan Chemical Co., LTD.

From the IR spectrum analysis of the modified sulfur-containing acrylate oligomer C1' or C2', it can be known that the thiol-containing modifiers had successfully modified the sulfur-containing acrylate oligomer C1 or C2.

Embodiment 18

Modification of the Sulfur-Containing Acrylate Dendrimer

In a flask equipped with thermometer, and a constant pressure dropping funnel, the sulfur-containing acrylate dendrimer D3 or D8, which contains 2 equivalent numbers of unreacted acrylate groups, and THF were added and mixed. A solution of 0.8n equivalent number of a thiol-containing modifier, 0.1 wt % of triethyl amine, and THF was then dropwise added to the flask and then underwent Michael addition at room temperature until the vibrational peak of thiol group (2528 cm$^{-1}$) was disappeared in the IR spectrum. A semi-solid white solid, i.e. the modified dendrimer D3' or D8', was obtained after distilling under a reduced pressure. The thiol-containing modifier was 2-mercaptobenzothiazole, 2-mercapto-2-thiazoline, or 2-mercapto-5-methyl-1,3,4-thiadiazole.

From the IR spectrum analysis of the modified sulfur-containing acrylate dendrimer D3' or D8', it can be known that the thiol-containing modifiers had successfully modified the sulfur-containing acrylate dendrimer D3 or D8.

Embodiment 19

Cross-Linking the Modified Sulfur-Containing Acrylate Oligomer or Dendrimer

The modified sulfur-containing acrylate oligomer C1' and C2', and the modified sulfur-containing acrylate dendrimer D3' and D8' were respectively added with a photoinitiator, 2-hydroxy-2-methyl-1-phenyl-propan-1-one (Iragcure 1173; RUNTEC Chemical Co. Ltd.). The mixture was then coated on a quartz glass (1 mm thick and with a refractive index of 1.514) to form a thin film having a thickness of 200 μm. A medium pressure mercury lamp (F300S-6 from Fusion UV Systems, US) was used to illuminate the thin films at a distance of 10 cm to cross link the oligomer C1 or C2. Finally, a hard transparent cross-linked thin film was obtained. The measured refractive index of the modified oligomers C1' and C2' and the modified dendrimer D3' and D8' are listed in the table 2 below.

From the results listed in table 2, it can be known that the refractive index of the sulfur-containing acrylate oligomer and dendrimer can be further increased by the thiol-containing modifier. In addition, since the number of the unreacted acrylate functional group was decreased, the storage stability and the thermal stability can be further increased. Therefore, the modified oligomers and dendrimers are especially suitable to be used in the high-temperature applications, such as thermal bonding and high-temperature coatings.

TABLE 2

Properties test of the modified sulfur-containing acrylate oligomer or dendrimer

| Molar ratio | Sample | modifier | Refractive index* |
|---|---|---|---|
| B1/A1 = 2 | Oligomer C1' | 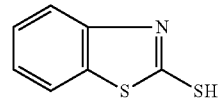 | 1.6085 |
|  |  | 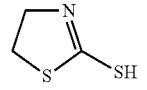 | 1.6032 |
|  |  | 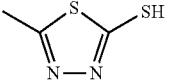 | 1.6013 |

TABLE 2-continued

Properties test of the modified sulfur-containing acrylate oligomer or dendrimer

| Molar ratio | Sample | modifier | Refractive index* |
|---|---|---|---|
| | Dendrimer D3' | 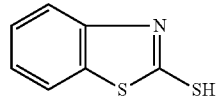 | 1.6198 |
| | | 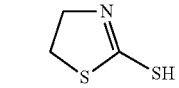 | 1.6065 |
| | | 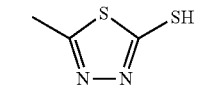 | 1.6027 |
| B1/A2 = 2 | Oligomer C2' | 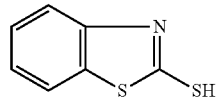 | 1.5910 |
| | | 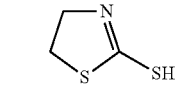 | 1.5855 |
| | | 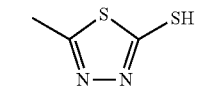 | 1.5832 |
| | Dendrimer D8' | 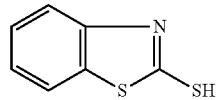 | 1.6062 |
| | | 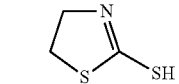 | 1.5935 |
| | | 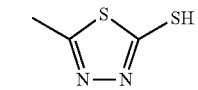 | 1.5920 |

*measured at 632.8 nm by a prism coupler (PRISM COUPLER SPA-4000, Korea)

From the disclosure above, the advantage of this invention include the followings.

1. The reaction materials of the sulfur-containing acrylate oligomers and dendrimers are cheap, easily obtained, and not strong corrosive and irritating.

2. The preparation conditions of the sulfur-containing acrylate oligomers and dendrimers are mild, and fewer side reaction and almost no byproducts. Therefore, the preparations are less pollution, high yield, and stable product quality. Hence, the preparation conditions are easy to be controlled, and easy to be applied in industry.

3. The viscosity of the obtained sulfur-containing acrylate dendrimers is small and hard to be gelled, and thus the dendrimers have advantages of better storage and coating. When using the composition containing the dendrimers as a coating material, the obtained sulfur-containing acrylate oligomers can be used as diluents of the sulfur-containing acrylate dendrimers. Therefore, if the viscosity of the sulfur-containing acrylate dendrimers is too large, only a small amount of a sulfur-containing acrylate oligomer is needed to be added into the dendrimer to effectively maintain the refractive index and the mechanical properties of the composition with dendrimers.

4. The cross-linking reaction of the sulfur-containing acrylate oligomers and dendrimers has the advantages of low energy consumption, fast cross-linking rate, low amount of organic volatiles, and good film-formation.

5. The cross-linked thin film of the sulfur-containing acrylate oligomers and dendrimers have higher refractive index, better transparency, higher hardness, better flexibility and stronger impact toughness.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A sulfur-containing acrylate oligomer having a chemical structure of $B^1$-$A^2$-$B^1$, wherein $A^2$ and $B^1$ respectively have chemical structures below:

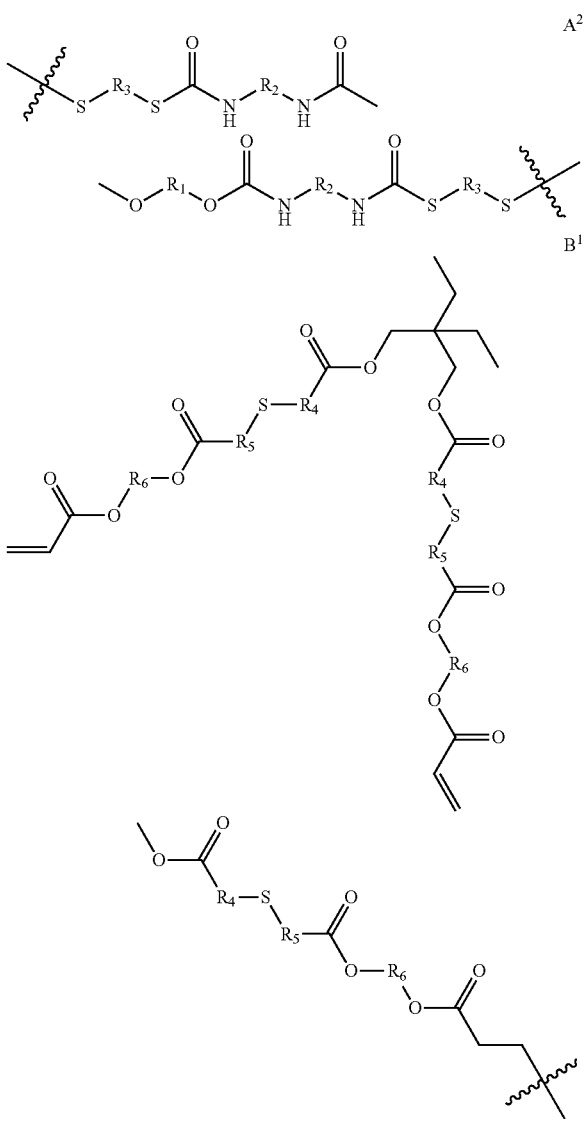

and wherein $R_1$, $R_4$, $R_5$ and $R_6$ are respectively an alkyl group with 1-6 carbons, and $R_2$ and $R_3$ are respectively an aromatic or a cycloalkyl group.

2. The sulfur-containing acrylate oligomer of claim 1, wherein the $R_2$ and the $R_3$ respectively have a chemical structure of

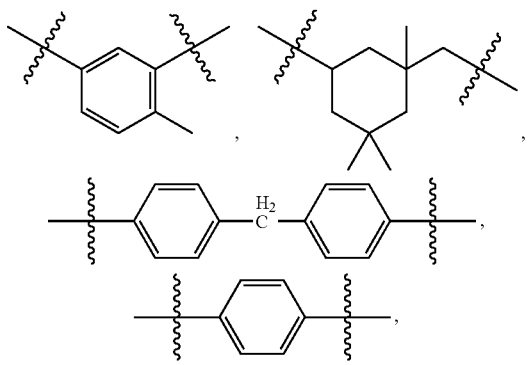

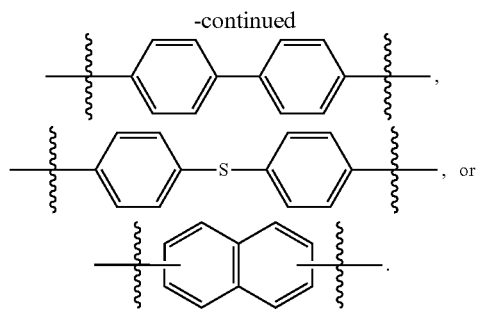

3. The sulfur-containing acrylate oligomer of claim 1, wherein the $R_1$ and $R_4$ are respectively a straight chain alkyl group having 1-4 carbons.

4. The sulfur-containing acrylate oligomer of claim 1, wherein the $R_5$ and $R_6$ are respectively a straight chain alkyl group having 2, 4, or 6 carbons.

5. The sulfur-containing acrylate oligomer of claim 1, wherein $A^2$ is

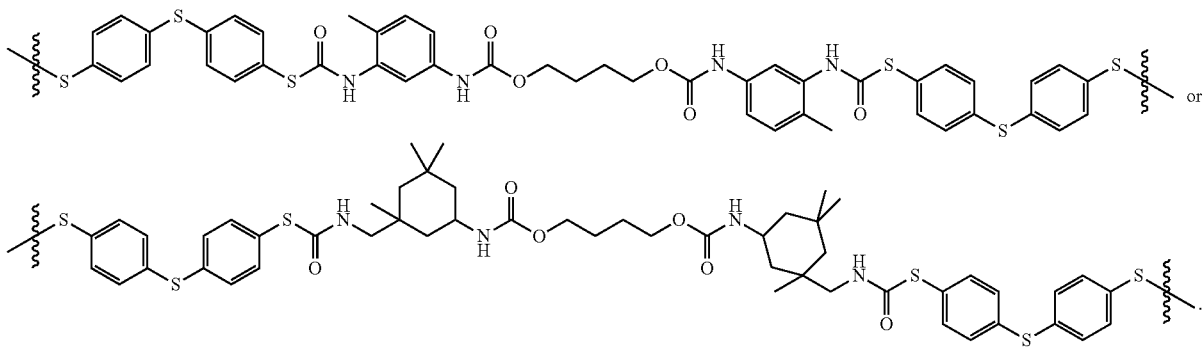

6. The sulfur-containing acrylate oligomer of claim 1, wherein $B^1$ is

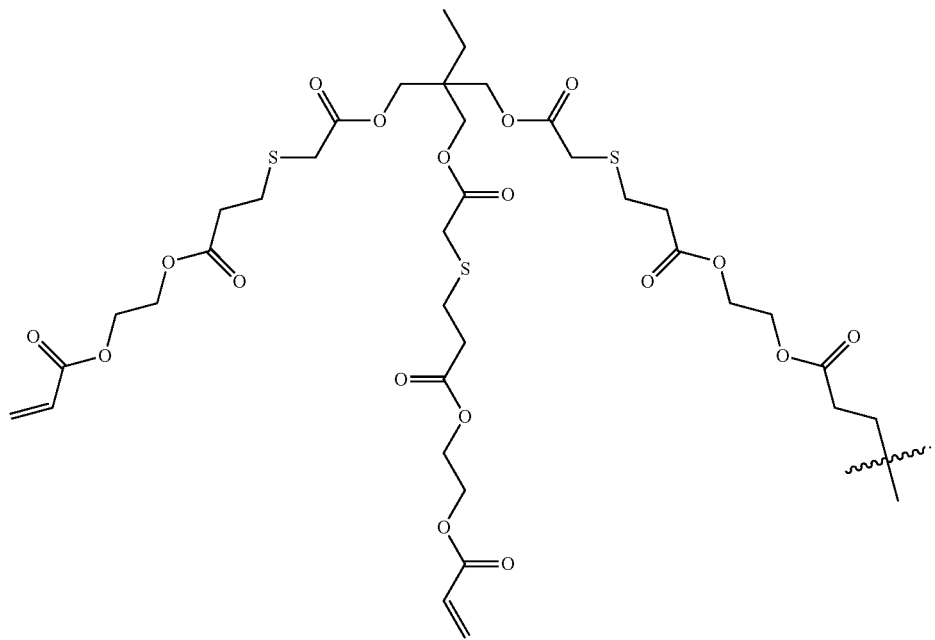 [SMILES: *CCC(=O)OCCOC(=O)CCSCC(=O)OCC(CC)(COC(=O)CSCCC(=O)OCCOC(=O)C=C)COC(=O)CSCCC(=O)OCCOC(=O)C=C]

7. A modified sulfur-containing acrylate oligomer having a chemical structure of $B^{1\prime}-A^2-B^{1\prime}$, $B^{1\prime}-A^2-B^{1\prime\prime}$ or $B^{1\prime\prime}-A^2-B^{1\prime\prime}$, wherein $A^2$, $B^{1\prime}$ and $B^{1\prime\prime}$ respectively have the chemical structures below:
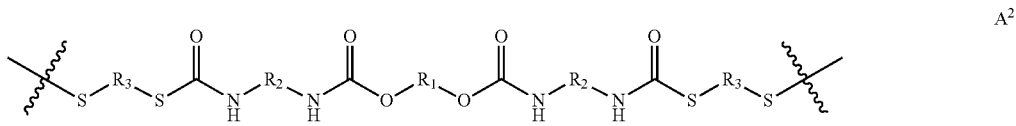
$A^2$
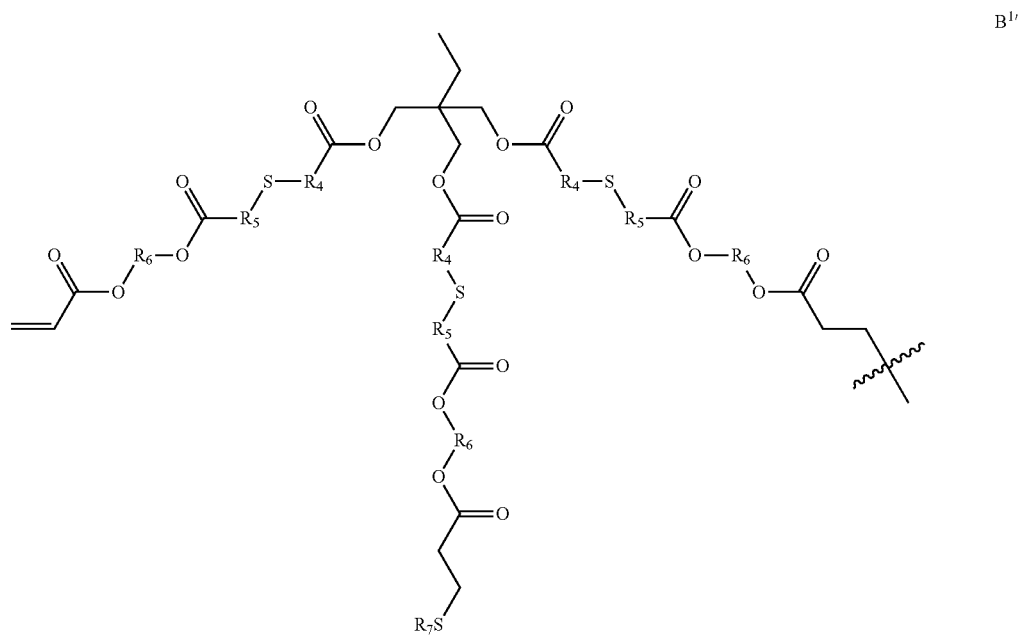
$B^{1\prime}$
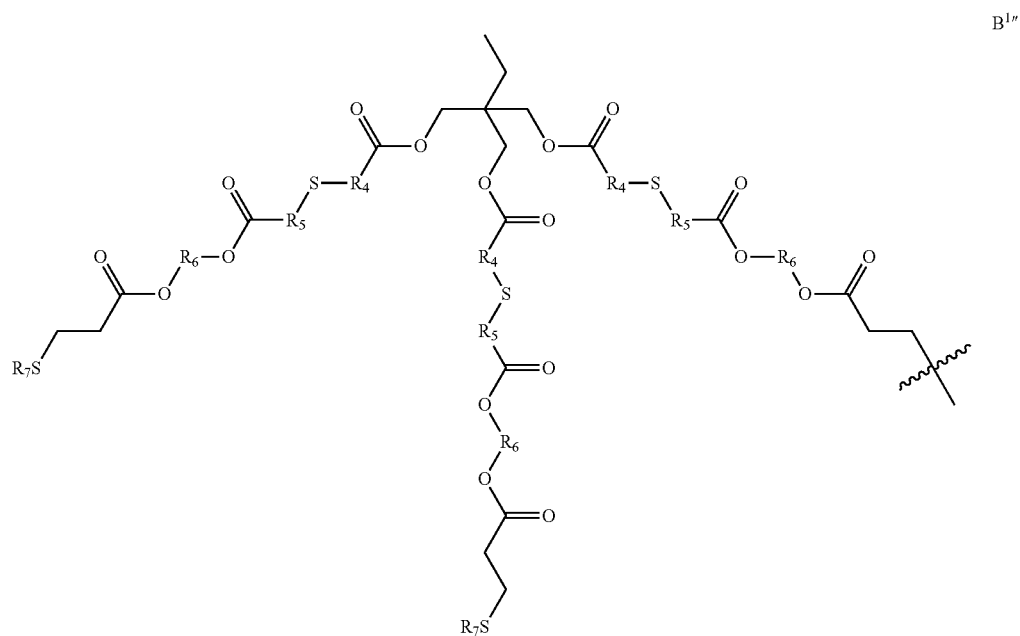
$B^{1\prime\prime}$ and wherein $R_1$, $R_4$, $R_5$ and $R_6$ are respectively an alkyl group with 1-6 carbons, $R_2$ and $R_3$ are respectively an aromatic or a cycloalkyl group, and $R_7$ is an aromatic group or a heterocyclic group having at least a double bond.

8. A method of preparing a sulfur-containing acrylate oligomer, the method comprising:
dropwise adding a monomer A into an aprotic solvent containing a monomer B to perform Michael addition to obtain a sulfur-containing acrylate oligomer, wherein the molar ratio of A to B is 1:2, and A and B respectively have chemical structures below:

A

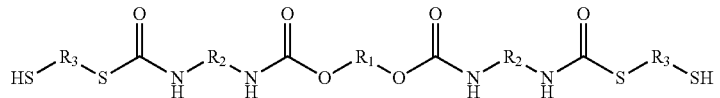

B

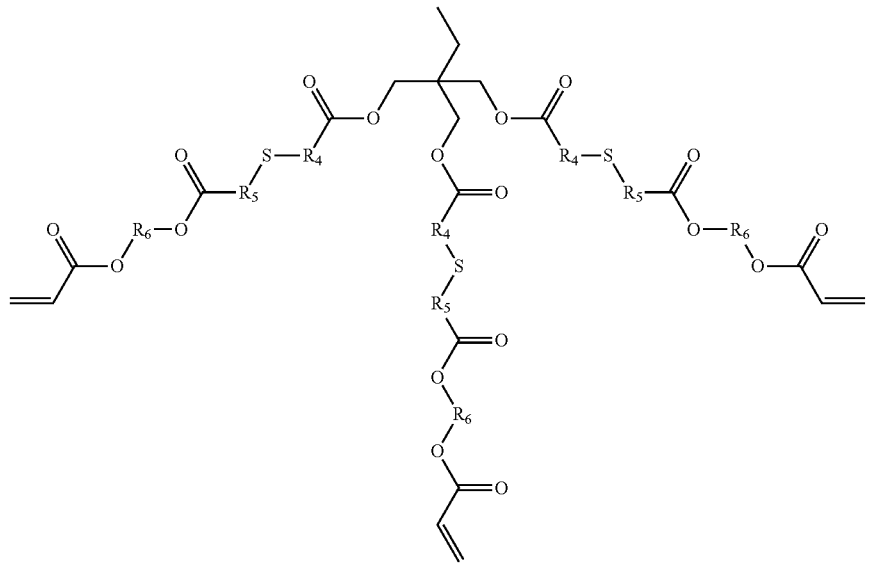

wherein the sulfur-containing acrylate oligomer having a chemical structure of $B^1$-$A^2$-$B^1$, wherein $A^2$ and $B^1$ respectively have chemical structures below, and $R_1$, $R_4$, $R_5$ and $R_6$ are respectively an alkyl group with 1-6 carbons, and $R_2$ and $R_3$ are respectively an aromatic or a cycloalkyl group.

$A^2$

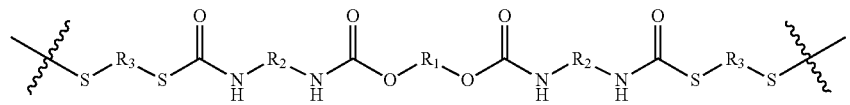

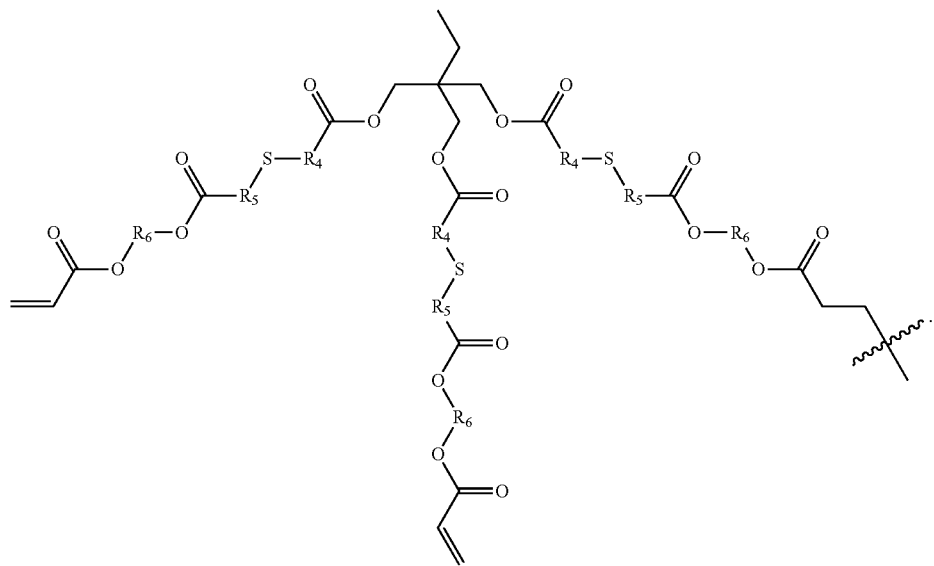

9. The method of claim 8, further comprising adding a catalyst to the aprotic solvent to catalyze the Michael addition.

10. A method of preparing a modified sulfur-containing acrylate oligomer, the method comprising:
dropwise adding a monomer A into an aprotic solvent containing a monomer B to perform Michael addition to obtain a sulfur-containing acrylate oligomer, wherein the molar ratio of A to B is 1:2, and A and B respectively have chemical structures below:

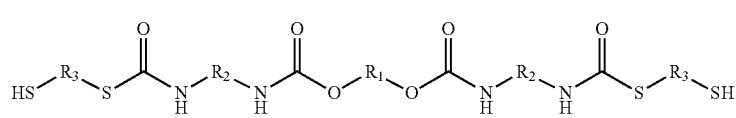

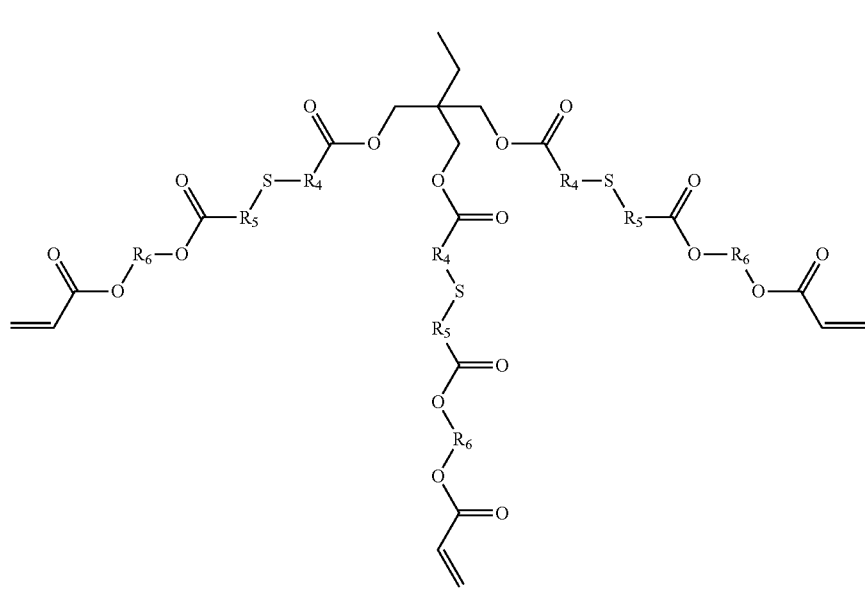

wherein the sulfur-containing acrylate oligomer having a chemical structure of $B^1$-$A^2$-$B^1$, wherein $A^2$ and $B^1$ respectively have chemical structures below, and $R_1$, $R_4$, $R_5$ and $R_6$ are respectively an alkyl group with 1-6 carbons, and $R_2$ and $R_3$ are respectively an aromatic or a cycloalkyl group; and

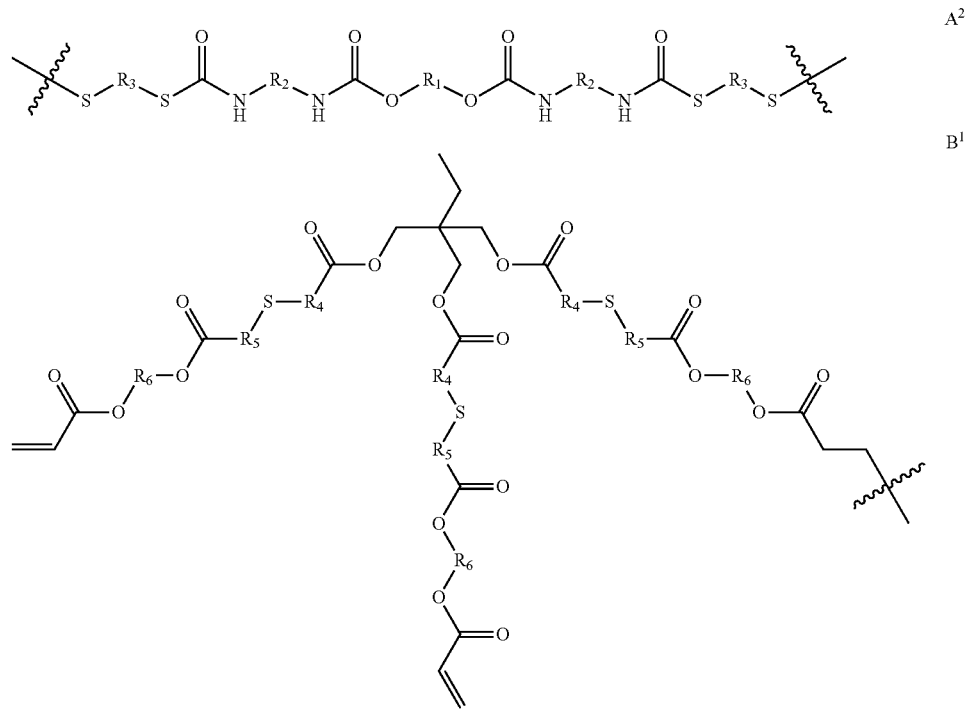

adding a thiol-containing modifier ($R_7SH$) to perform Michael addition with the sulfur-containing acrylate oligomer to obtain a modified sulfur-containing acrylate oligomer having a chemical structure of $B^{1\prime}$-$A^2$-$B^{1\prime}$, $B^{1\prime}$-$A^2$-$B^{1\prime\prime\prime}$, or $B^{1\prime\prime\prime}$-$A^2$-$B^{1\prime\prime\prime}$, wherein $B^{1\prime}$ and $B^{1\prime\prime\prime}$ respectively have the chemical structures below, and $R_7$ is an aromatic group or a heterocyclic group having at least a double bond.

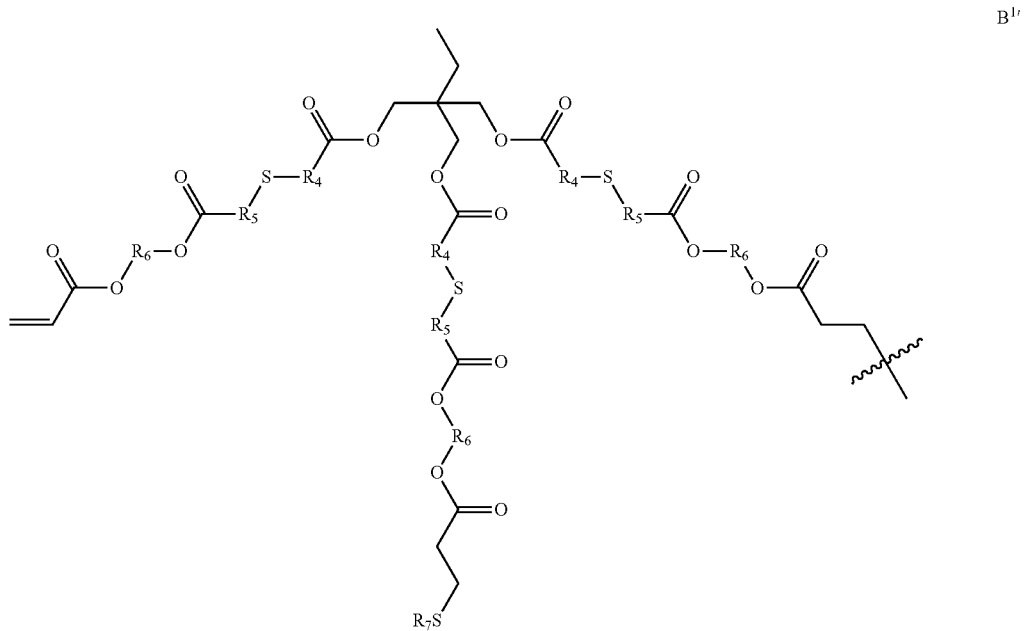

-continued
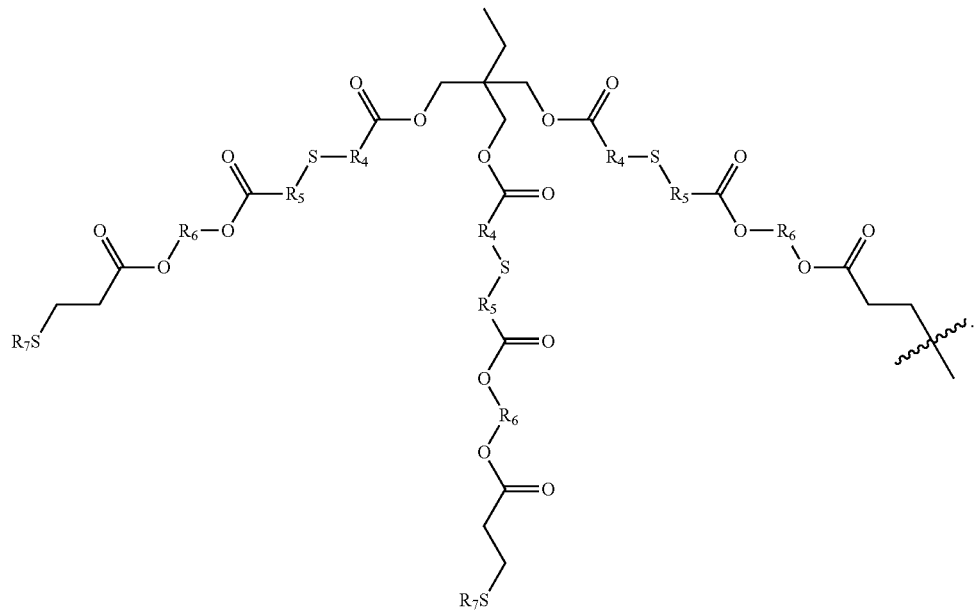
B¹″
11. A sulfur-containing acrylate dendrimer having a chemical structure of
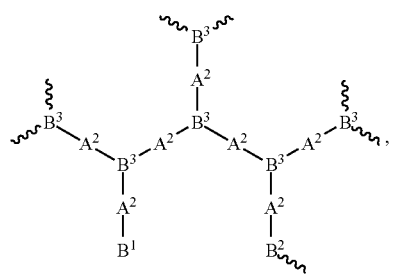
wherein B¹ and B² are randomly distributed on terminals of the sulfur-containing acrylate dendrimer, and the chemical structures of A², B¹, B² and B³ are shown below:
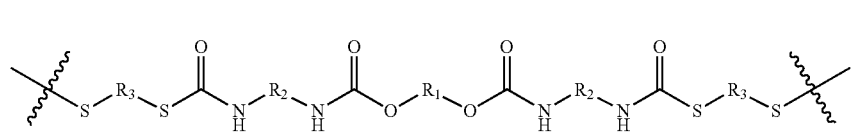
A²

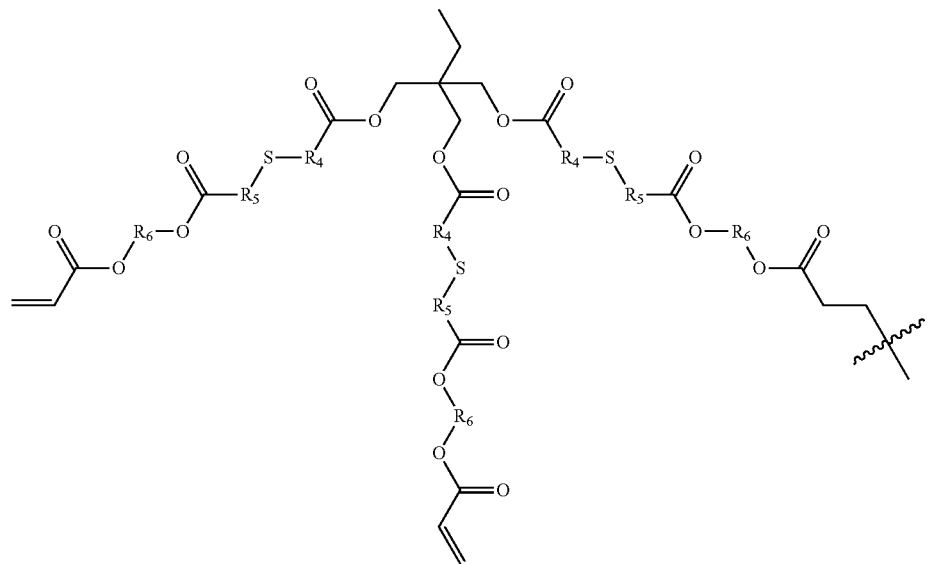
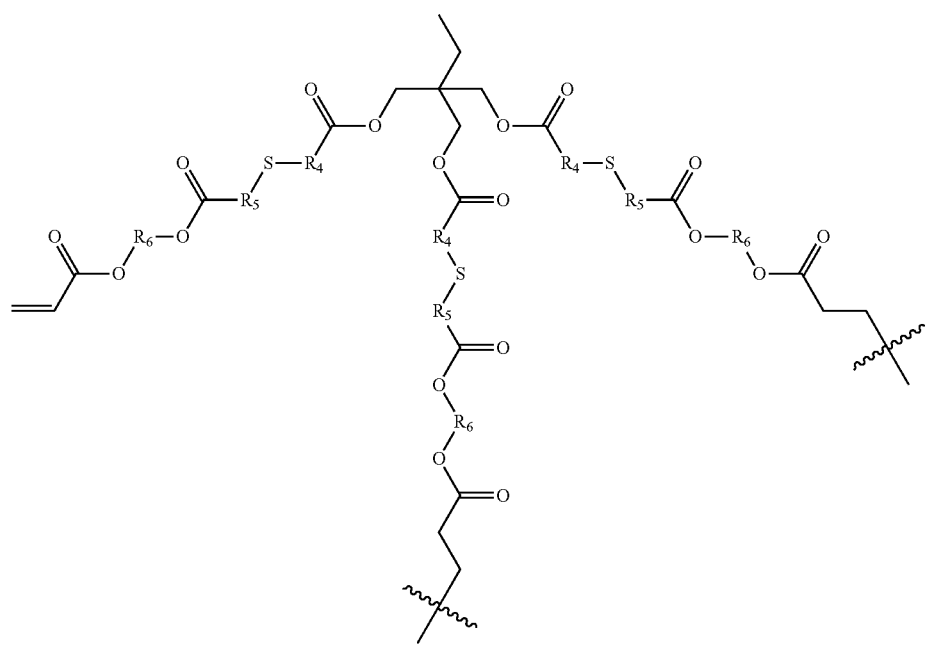

-continued

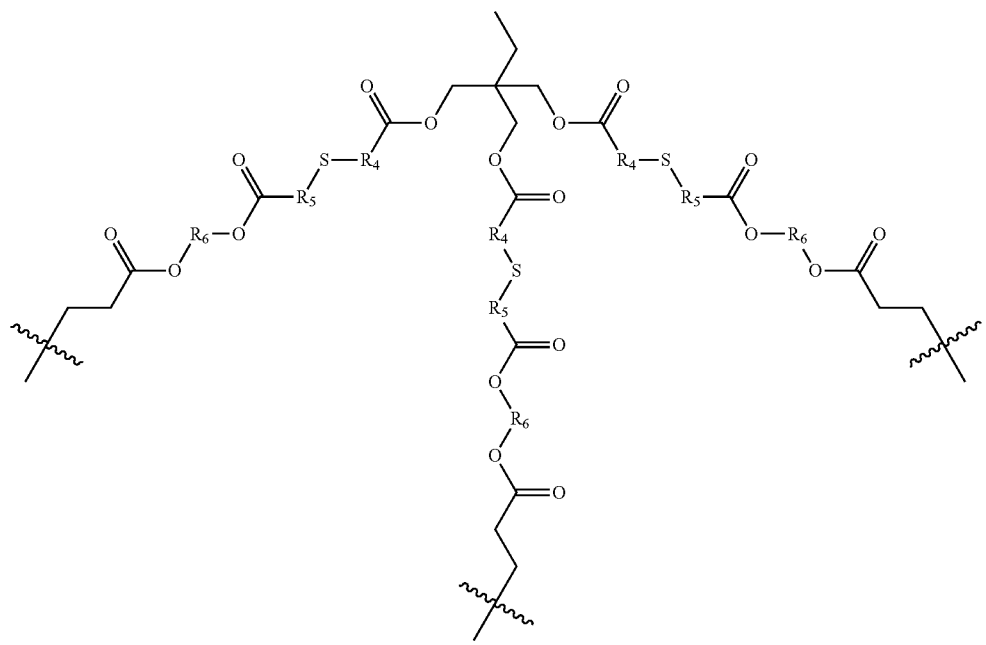

and wherein $R_1$, $R_4$, $R_5$ and $R_6$ are respectively an alkyl group with 1-6 carbons, and $R_2$ and $R_3$ are respectively an aromatic or a cycloalkyl group.

12. The sulfur-containing acrylate dendrimer of claim 11, wherein the $R_2$ and the $R_3$ respectively have a chemical structure of

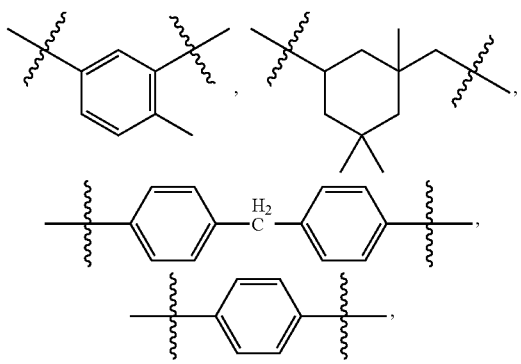

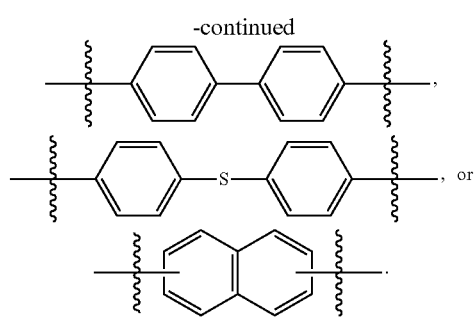

13. The sulfur-containing acrylate dendrimer of claim 11, wherein the $R_1$ and $R_4$ are respectively a straight chain alkyl group having 1-4 carbons.

14. The sulfur-containing acrylate dendrimer of claim 11, wherein the $R_5$ and $R_6$ are respectively a straight chain alkyl group having 2, 4, or 6 carbons.

15. The sulfur-containing acrylate dendrimer of claim 11, wherein $A^2$ is

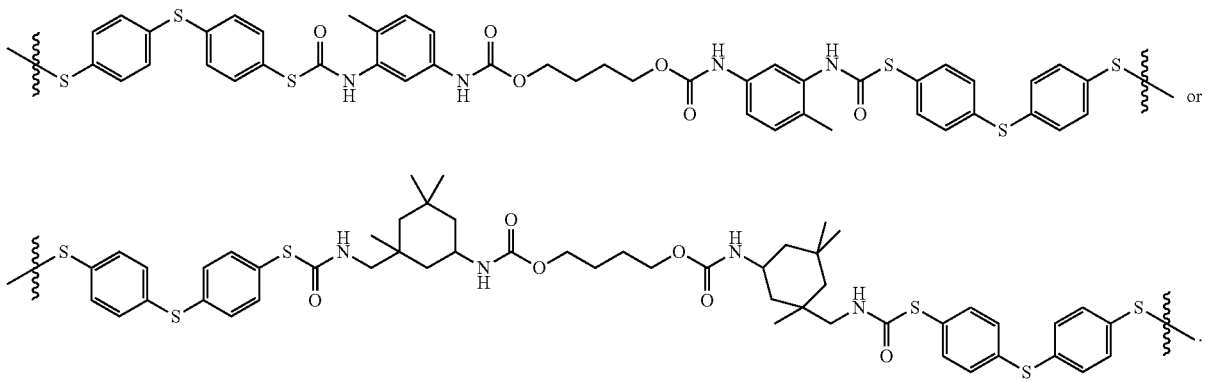

16. The sulfur-containing acrylate dendrimer of claim 11, wherein $B^1$, $B^2$ and $B^3$ are
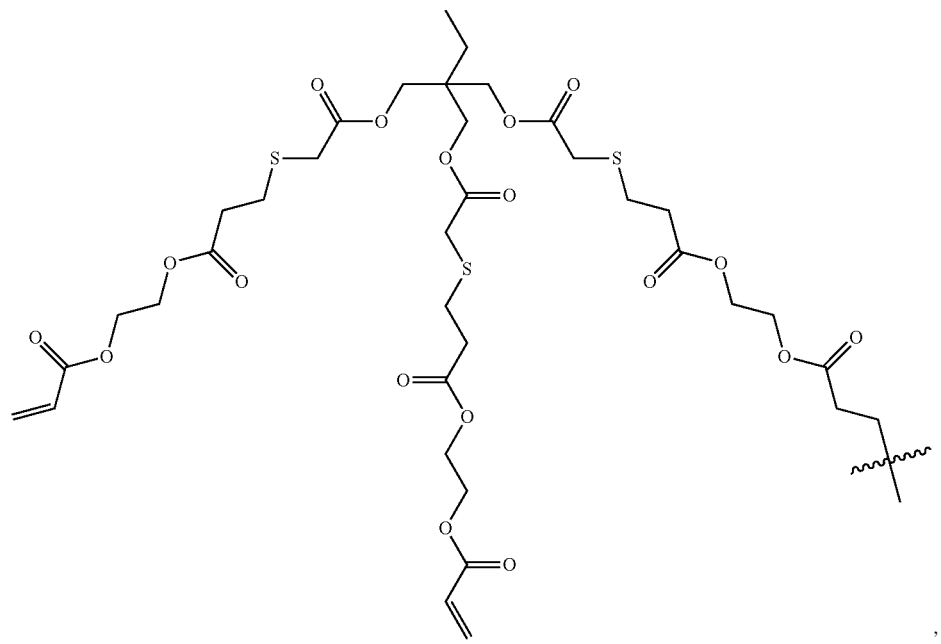
,
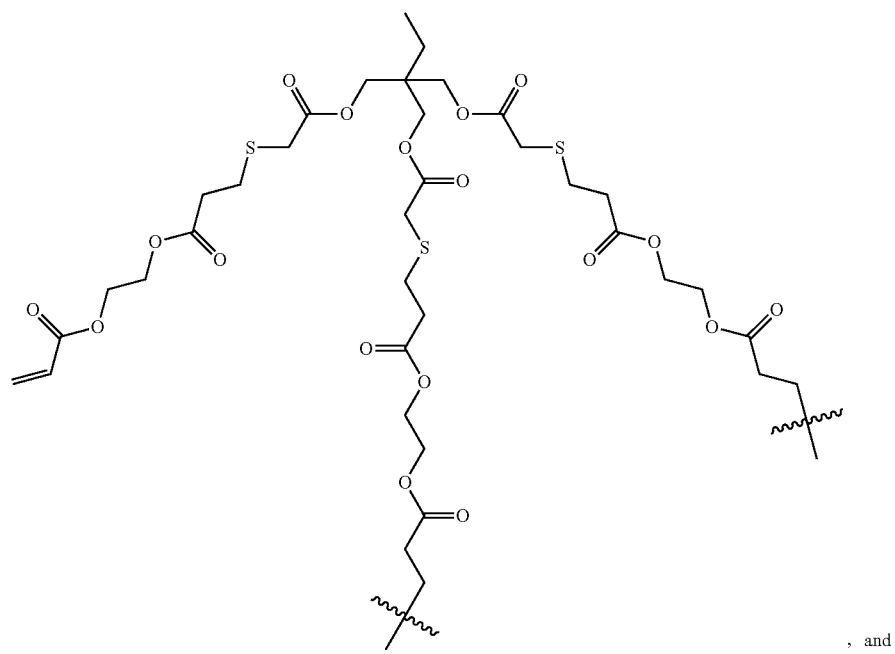
, and -continued
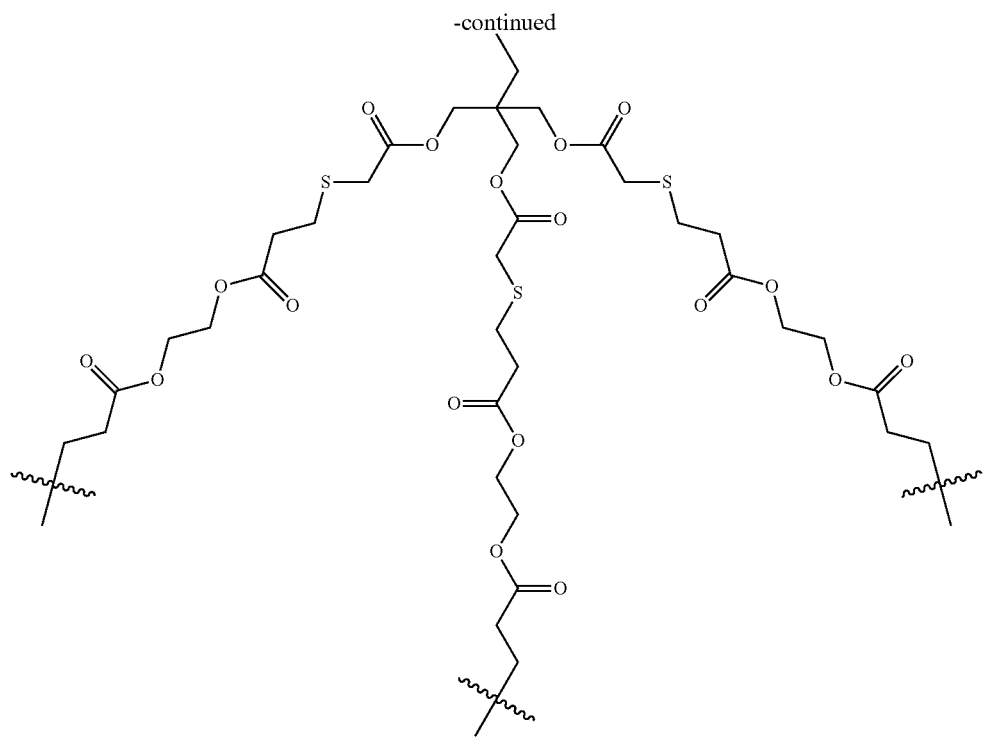
respectively.
17. A modified sulfur-containing acrylate dendrimer having a chemical structure of
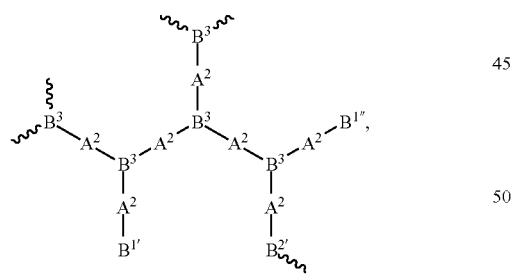
wherein $A^2$, $B^{1\prime}$, $B^{1\prime\prime\prime}$, $B^{2\prime}$ and $B^3$ respectively have chemical structures below:
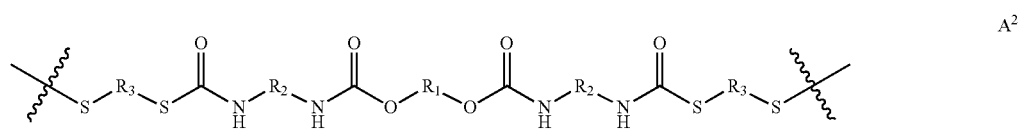

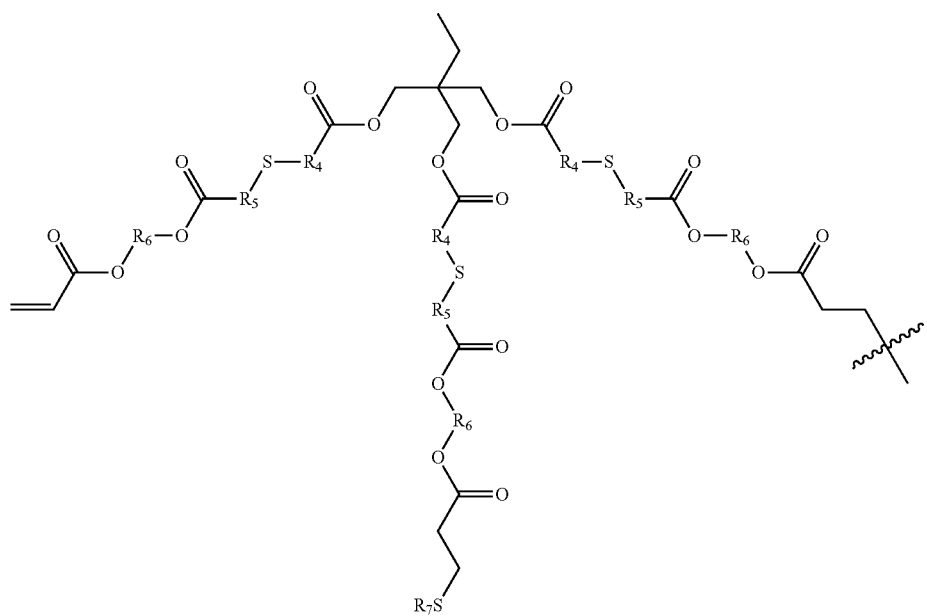
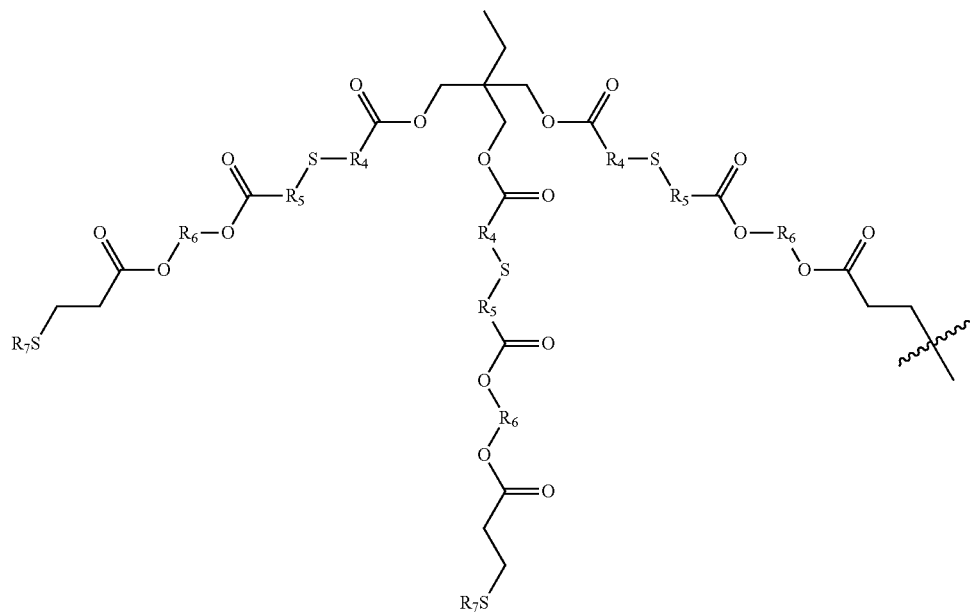

-continued

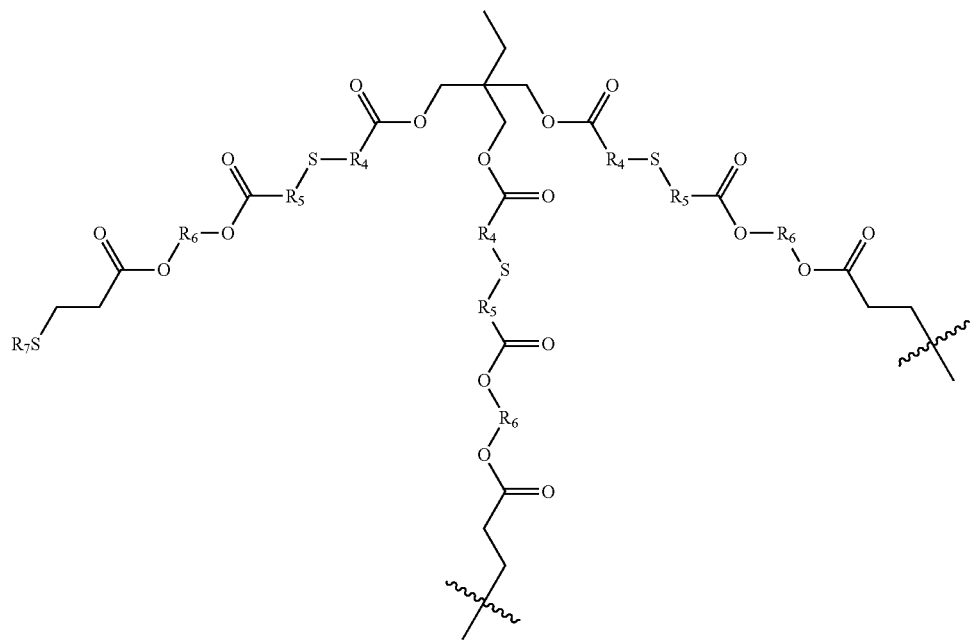

B²'

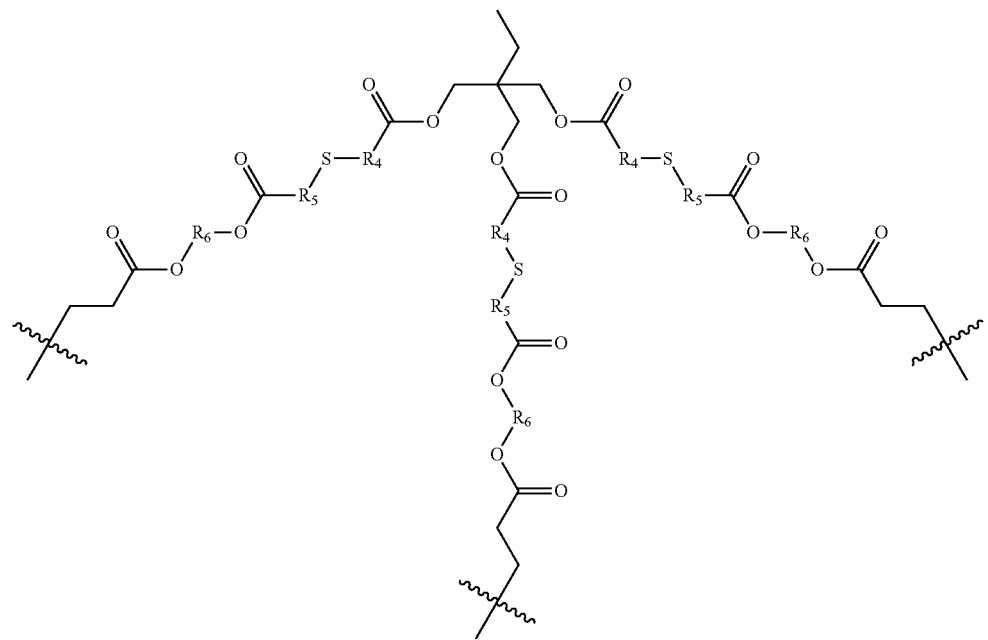

B³ and wherein $R_1$, $R_4$, $R_5$ and $R_6$ are respectively an alkyl group with 1-6 carbons, $R_2$ and $R_3$ are respectively an aromatic or a cycloalkyl group, and $R_7$ is an aromatic group or a heterocyclic group having at least a double bond.

18. A method of preparing a sulfur-containing acrylate dendrimer, the method comprising:

reacting a monomer A and a monomer B in an aprotic solvent to obtain a sulfur-containing acrylate dendrimer having a chemical structure of

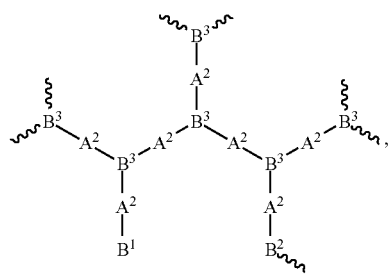

wherein $B^1$ and $B^2$ are randomly distributed on terminals of the sulfur-containing acrylate dendrimer, wherein the molar ratio of monomer A to monomer B is 1:0.25-4, but not 1:2 when the monomer A is added to the aprotic solvent containing the monomer B, and the monomer A, monomer B, $A^2$, $B^1$, $B^2$ and $B^3$ respectively have chemical structures below:
A
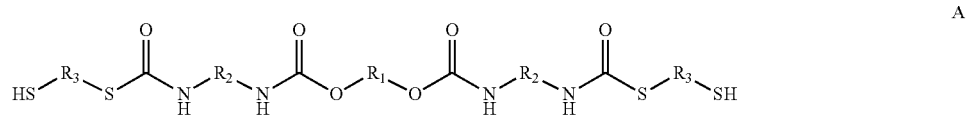
B
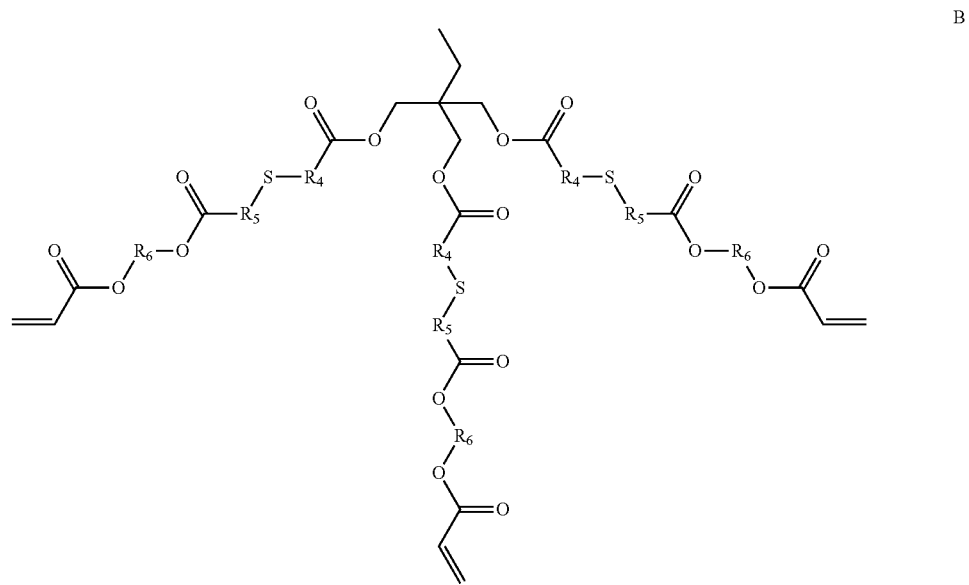
$A^2$
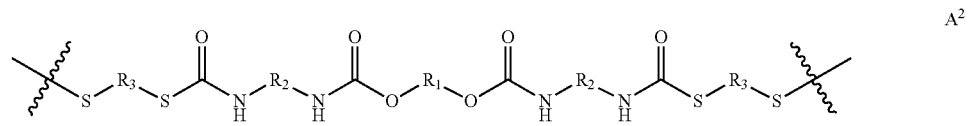
$B^1$
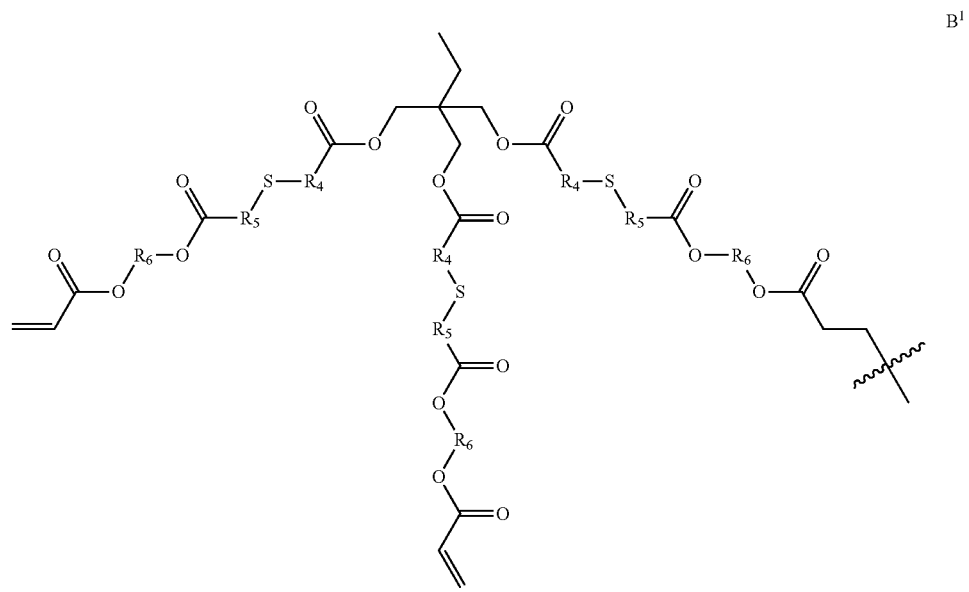

-continued

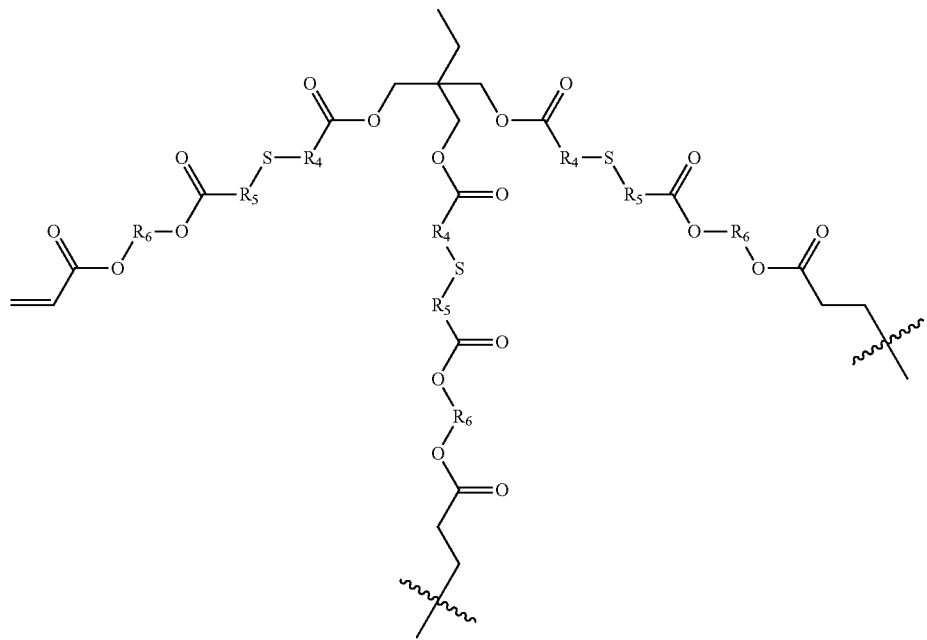

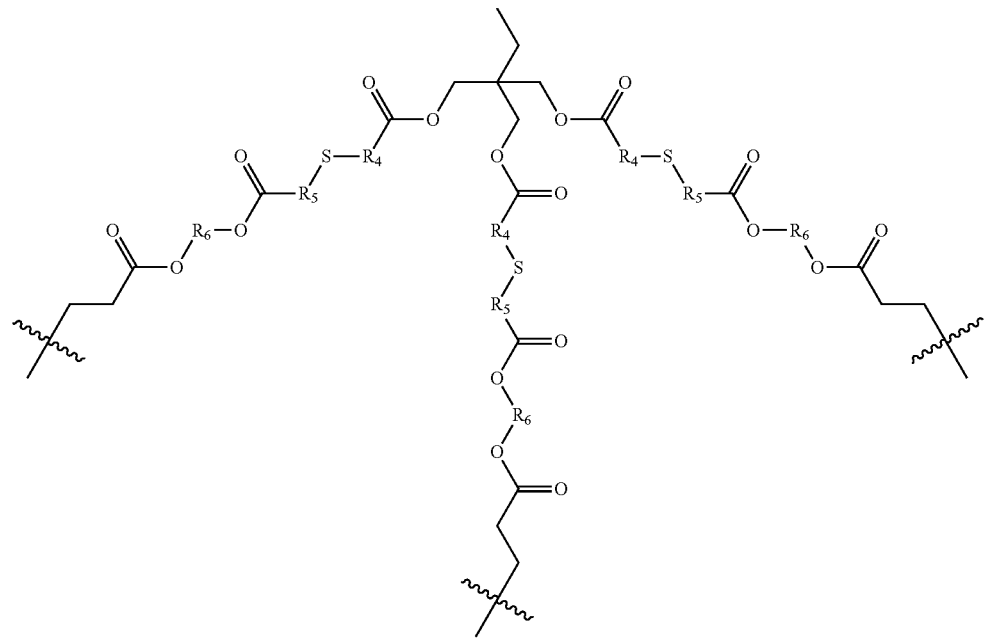

wherein $R_1$, $R_4$, $R_5$ and $R_6$ are respectively an alkyl group with 1-6 carbons, and $R_2$ and $R_3$ are respectively an aromatic or a cycloalkyl group.

19. The method of claim 18, further comprising adding a catalyst to the aprotic solvent to catalyze the reaction.

20. A method of preparing a modified sulfur-containing acrylate dendrimer, the method comprising:

reacting a monomer A and a monomer B in an aprotic solvent to obtain a sulfur-containing acrylate dendrimer having a chemical structure of

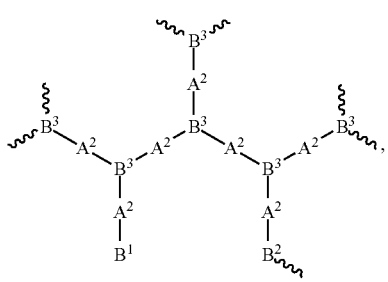

wherein $B^1$ and $B^2$ are randomly distributed on terminals of the sulfur-containing acrylate dendrimer, wherein the molar ratio of monomer A to monomer B is 1:0.25-4, but not 1:2 when the monomer A is added to the aprotic solvent containing the monomer B, and the monomer A, monomer B, $A^2$, $B^1$, $B^2$ and $B^3$ respectively have chemical structures below:
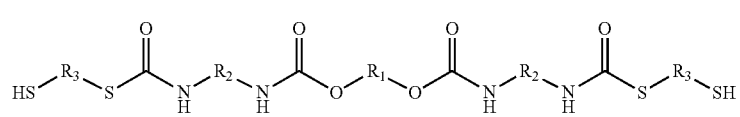
A
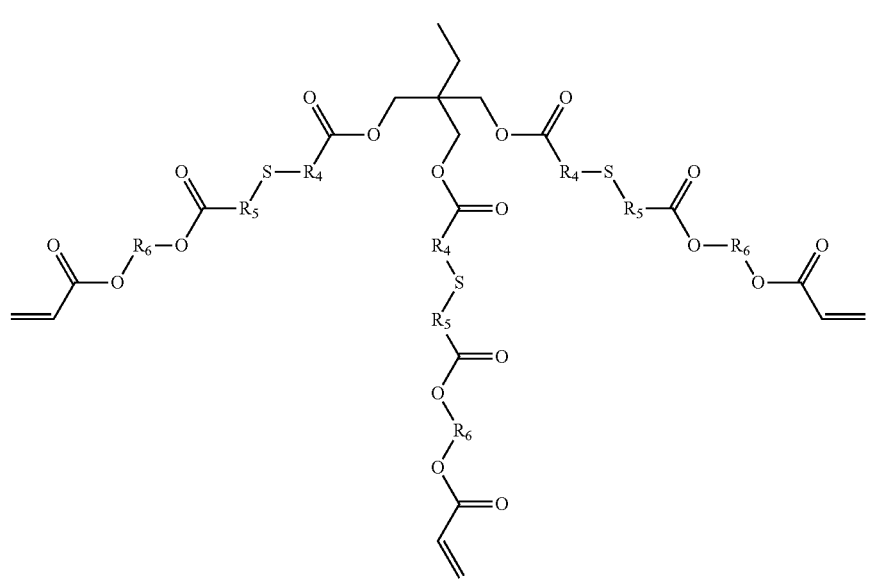
B
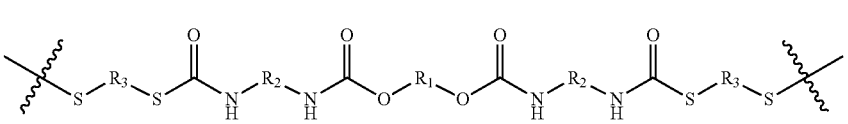
$A^2$
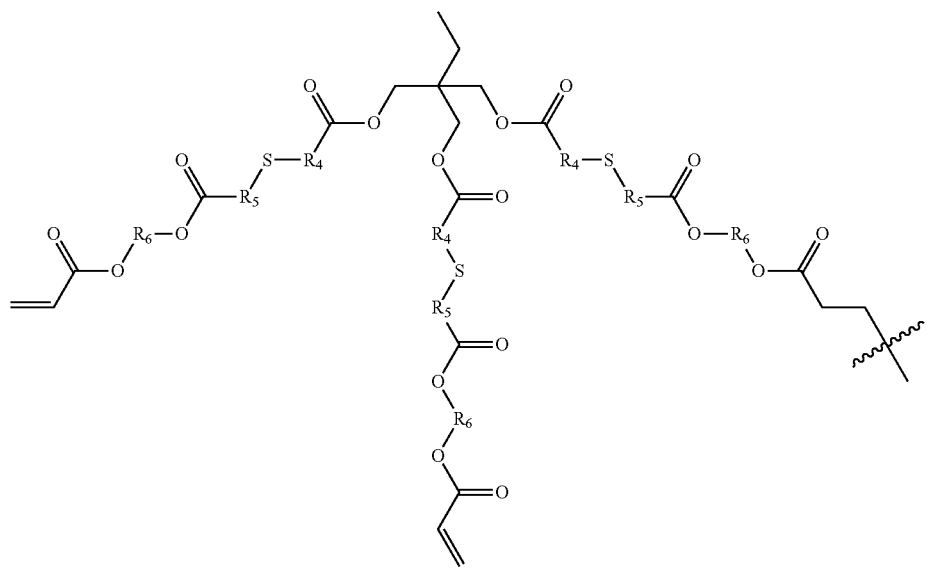
$B^1$

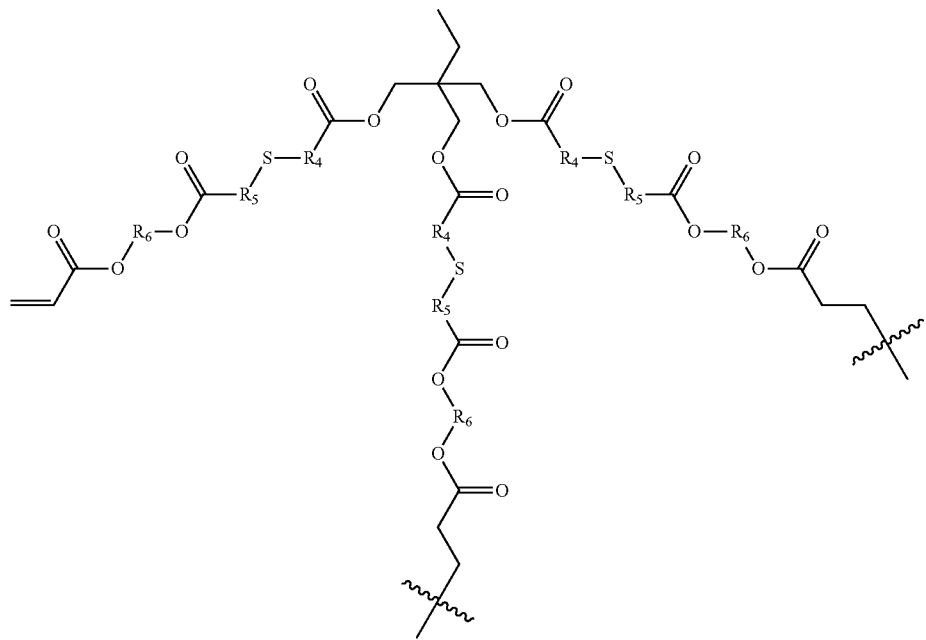
B²
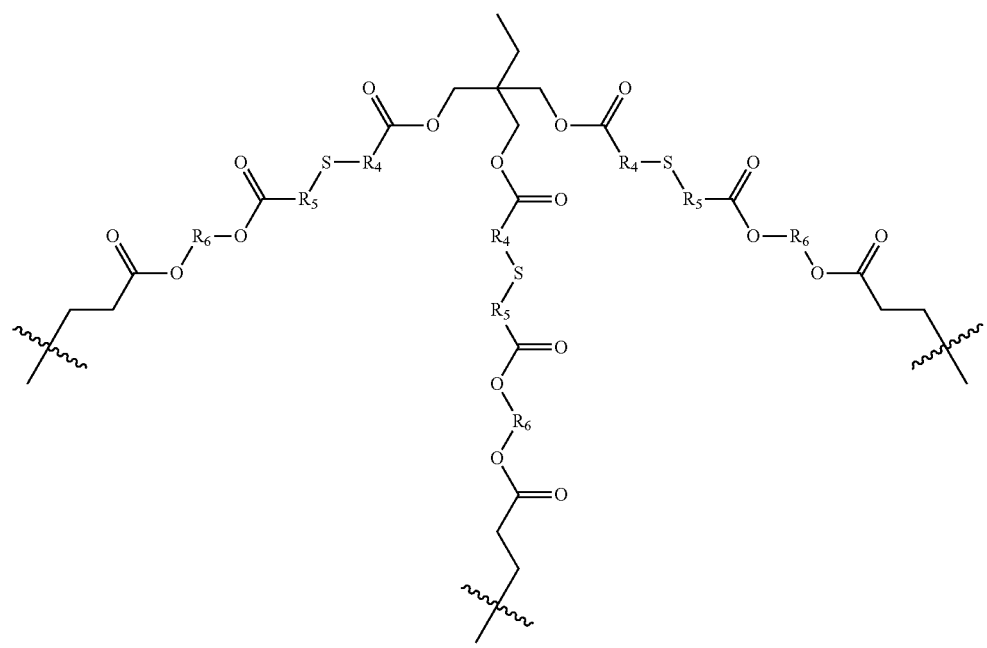
B³
wherein $R_1$, $R_4$, $R_5$ and $R_6$ are respectively an alkyl group with 1-6 carbons, and $R_2$ and $R_3$ are respectively an aromatic or a cycloalkyl group; and
adding a thiol-containing modifier ($R_7SH$) to perform Michael addition with the sulfur-containing acrylate dendrimer to obtain a modified sulfur-containing acrylate dendrimer having a chemical structure of
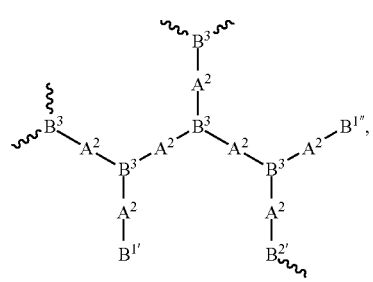

wherein $B^{1\prime}$, $B^{1\prime\prime\prime}$, and $B^{2\prime}$ respectively have chemical structures below:
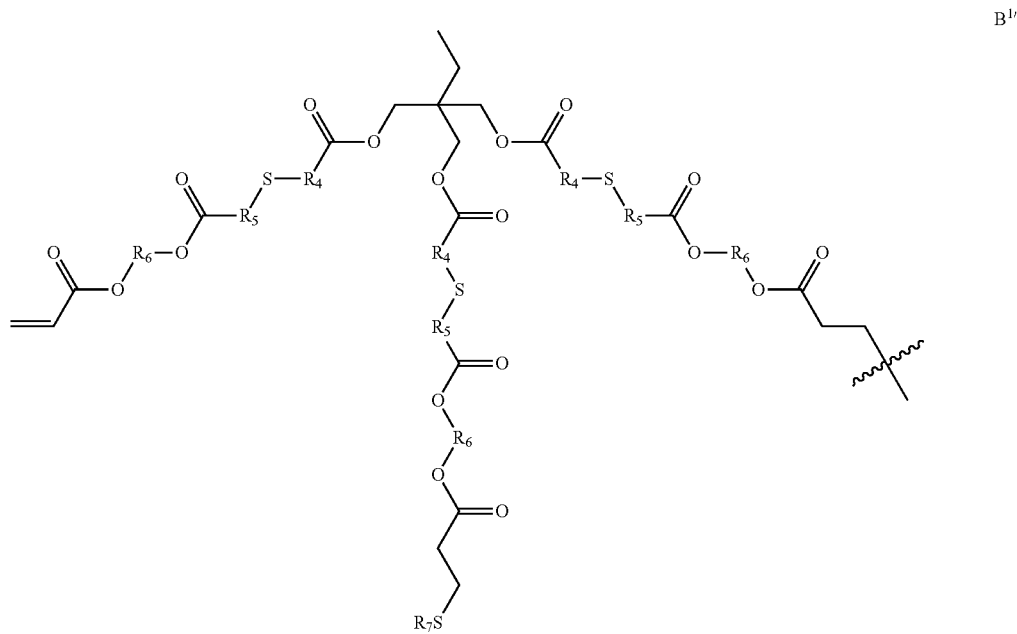
$B^{1\prime}$
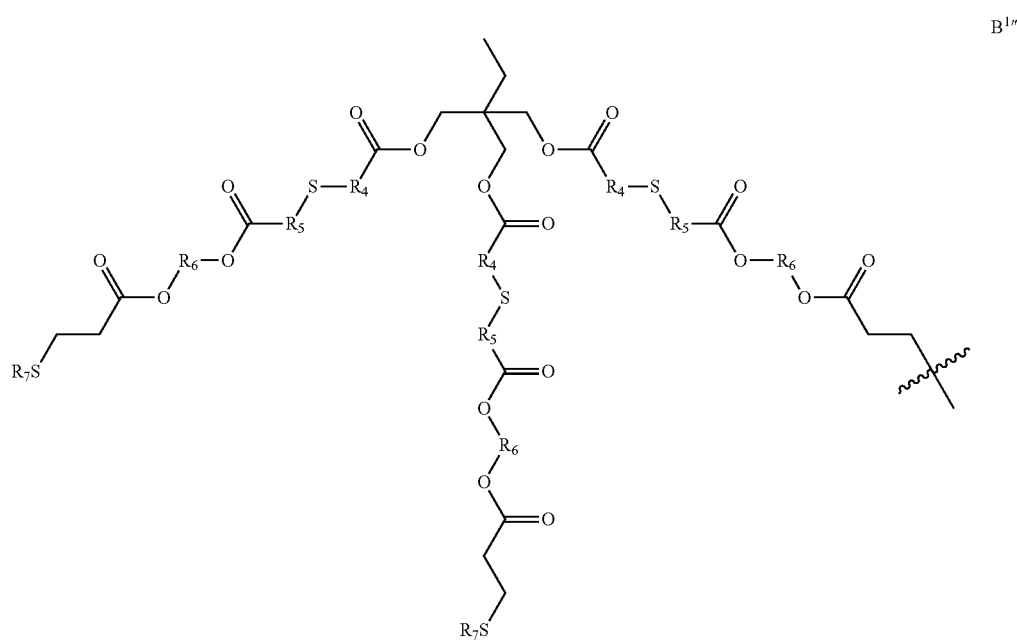
$B^{1\prime\prime}$ -continued
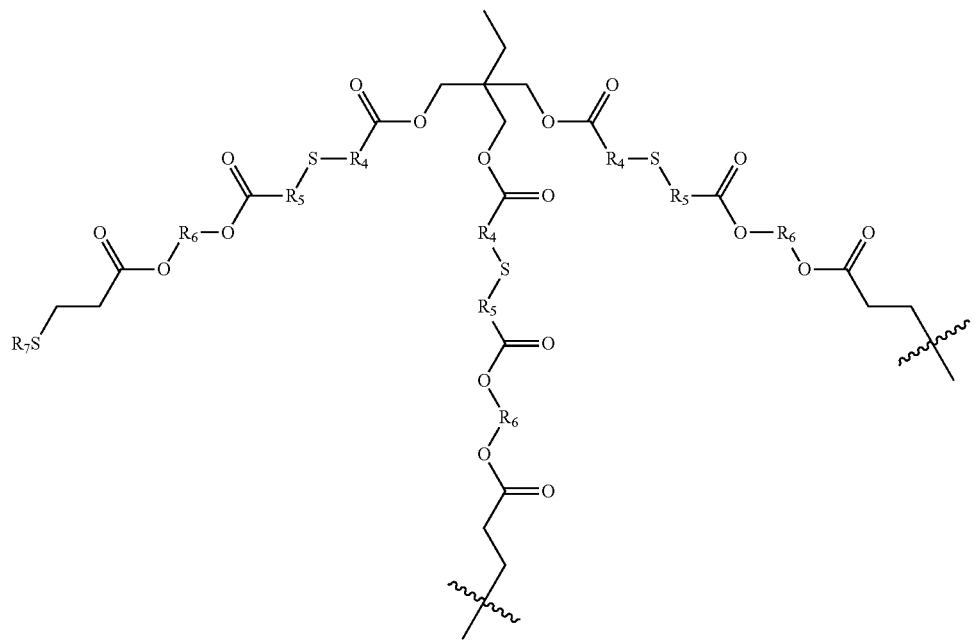
B²'
and wherein $R_7$ is an aromatic group or a heterocyclic group having at least a double bond.
* * * * *